(12) United States Patent
Mili

(10) Patent No.: US 12,503,695 B2
(45) Date of Patent: Dec. 23, 2025

(54) RAB13 AND NET1 ANTISENSE OLIGONUCLEOTIDES TO TREAT METASTATIC CANCER

(71) Applicant: The U.S.A., as represented by the Secretary, Department of Health and Human Services, Bethesda, MD (US)

(72) Inventor: Stavroula Mili, Bethesda, MD (US)

(73) Assignee: The United States of America, as represented by the Secretary, Department of Health and Human Services, Bethesda, MD (US)

( * ) Notice: Subject to any disclaimer, the term of this patent is extended or adjusted under 35 U.S.C. 154(b) by 785 days.

(21) Appl. No.: 17/792,507

(22) PCT Filed: Jan. 26, 2021

(86) PCT No.: PCT/US2021/015053
§ 371 (c)(1),
(2) Date: Jul. 13, 2022

(87) PCT Pub. No.: WO2021/154705
PCT Pub. Date: Aug. 5, 2021

(65) Prior Publication Data
US 2023/0057461 A1    Feb. 23, 2023

Related U.S. Application Data

(60) Provisional application No. 62/966,204, filed on Jan. 27, 2020.

(51) Int. Cl.
| | | |
|---|---|---|
| C12N 15/113 | (2010.01) | |
| A61K 45/06 | (2006.01) | |
| A61P 35/04 | (2006.01) | |

(52) U.S. Cl.
CPC ............ *C12N 15/113* (2013.01); *A61K 45/06* (2013.01); *A61P 35/04* (2018.01); *C12N 2310/11* (2013.01)

(58) Field of Classification Search
CPC ............. C12N 15/113; C12N 2310/11; C12N 2310/14; C12N 2310/3233; C12N 15/1135; A61K 45/06; A61K 31/7125; A61K 31/712; A61K 31/7088; A61P 35/04
See application file for complete search history.

(56) References Cited

U.S. PATENT DOCUMENTS

2005/0118625 A1    6/2005    Mounts

FOREIGN PATENT DOCUMENTS

| EP | 2311530 | 4/2011 | |
|---|---|---|---|
| WO | WO 2010/040571 | 4/2010 | |
| WO | WO-2014028884 A2 * | 2/2014 | .............. G06N 5/01 |

OTHER PUBLICATIONS

GenBank: BC000799.1. *Homo sapiens* RAB13, member RAS oncogene family, mRNA (cDNA clone MGC:5074 Image:3451945), complete cds. PRI Jul. 15, 2006. (Year: 2006).*
Buck et al. Design Strategies and Performance of Custom DNA Sequencing Primers. (1999) BioTechniques, 27:3, 528-536. (Year: 1999).*
Mayr. What Are 3' UTRs Doing? Cold Spring Harb Perspect Biol 2019; 11:a034728. (Year: 2019).*
NCBI Reference Sequence: NM_001047160.3. *Homo sapiens* neuroepithelial cell transforming 1 (NET1), transcript variant 1, mRNA. (Year: 2019).*
NCBI Reference Sequence: NM_002870.5. *Homo sapiens* RAB13, member RAS oncogene family (RAB13), transcript variant 1, mRNA (Year: 2019).*
Carr et al., "Regulation of Focal Adhesion Kinase Activation, Breast Cancer Cell Motility, and Amoeboid Invasion by the RhoA Guanine Nucleotide Exchange Factor Net1," *Mol. Cell Biol.*, vol. 33:2773-2786, 2013.
Chrisafis and Mili, "Polarized Distribution of Rab13 and Net1 mRNAs During Collective Invasion," poster presentation, FASEB conference, Sep. 2018.
Chrisafis et al., "Collective Cancer Cell Invasion requires RNA Accumulation at the Invasive Front," *PNAS*, vol. 117:27423-27434, 2020.
Diao et al., "Rab13 Silencing Causes Inhibition of Growth and Induction of Apoptosis in Human Glioma Cells," *Int. J. Clin. Exp. Pathol.*, vol. 9:3007-3014, 2016.
Havens and Hastings, "Splice-switching antisense oligonucleotides as therapeutic drugs," *Nucleic Acids Res* vol. 44(14):6549-6563, 2016.
International Search Report and Written Opinion of PCT/US2021/015053, mailed May 20, 2021 (15 pages).
Ioannou et al., "DENND2B Activates Rab13 at the Leading Edge of Migrating Cells and Promotes Metastatic Behavior," *J. Cell Biol.*, vol. 208:629-648, 2015.
Ioannou et al., "Regulation of Cancer Cell Behavior by the Small GTPase Rab13," *J. Biol. Chem.*, vol. 291:9929-9937, 2016.
Jakobsen et al., Direct RNA Sequencing Mediated Identification of mRNA Localized in Protrusions of Human MDA-MB-231 Metastatic Breast Cancer Cells, *J. Mol. Signal.*, vol. 8, 2013 (14 pages).
Juliano, "The delivery of therapeutic oligonucleotides," *Nucleic Acids Res* vol. 44(14):6518-6548, 2016.
Mili et al., "Genome-Wide Screen Identifies Localized RNAs Anchored at Cell Protrusions Through Microtubules and APC," *Nature*, vol. 453:115-119, 2008.
Mili, "Regulation of cell migration and GTPase function through mechanical control of RNA localization," Presentation at Signaling by Adhesion Receptors Gordon Research Conference, Jun. 25, 2018.
Moissoglu et al., "Translational Regulation of Protrusion-Localized RNAs Involves Silencing and Clustering after Transport," *eLIFE*, vol. 8:44752, 2019 (31 pages).

(Continued)

*Primary Examiner* — Brian Whiteman
*Assistant Examiner* — Amanda M Zahorik
(74) *Attorney, Agent, or Firm* — Klarquist Sparkman, LLP

(57) ABSTRACT

Provided herein are antisense oligonucleotides (ASOs) specific for Rab13 and Net1, for example specific for a GA-rich region of the 3'-UTR. In some examples, the ASOs are modified. Methods of using these ASOs to reduce the migration of metastatic cancer cells are provided, for example as a use to treat metastatic cancer.

20 Claims, 37 Drawing Sheets
Specification includes a Sequence Listing.

(56) References Cited

OTHER PUBLICATIONS

Moissoglu et al., "Translational regulation of protrusion-localized RNAs involves silencing and clustering after transport," poster presentation, EMBO Conference, Jun. 2019.

Moissoglu et al., "RNA Localization and Co-Translational Interactions Control RAB13 GTPase Function and Cell Migration," *EMBO J.*, vol. 39:E104958, 2020 (19 pages).

Murray et al., "NET I-mediated RhoA Activation Facilitates Lysophosphatidic Acid-Induced Cell Migration and Invasion in Gastric Cancer," *Br. J. Cancer*, vol. 99:1322-1329, 2008.

Sahgal et al., "GGA2 and RAB13 Promote Activity-Dependent β1-integrin Recycling," *J. Cell Sci.*, vol. 132, 2019 (17 pages).

Wang et al., "Extracellular Matrix Stiffness and Cell Contractility Control RNA Localization to Promote Cell Migration," *Nat. Comm.*, vol. 8:896, 2017 (16 pages).

Zuo et al., "Contributions of the RhoA Guanine Nucleotide Exchange Factor Net1 to Polyoma Middle T Antigen-Mediated Mammary Gland Tumorigenesis and Metastasis," *Breast Cancer Res.*, vol. 20, 2018 (16 pages).

\* cited by examiner

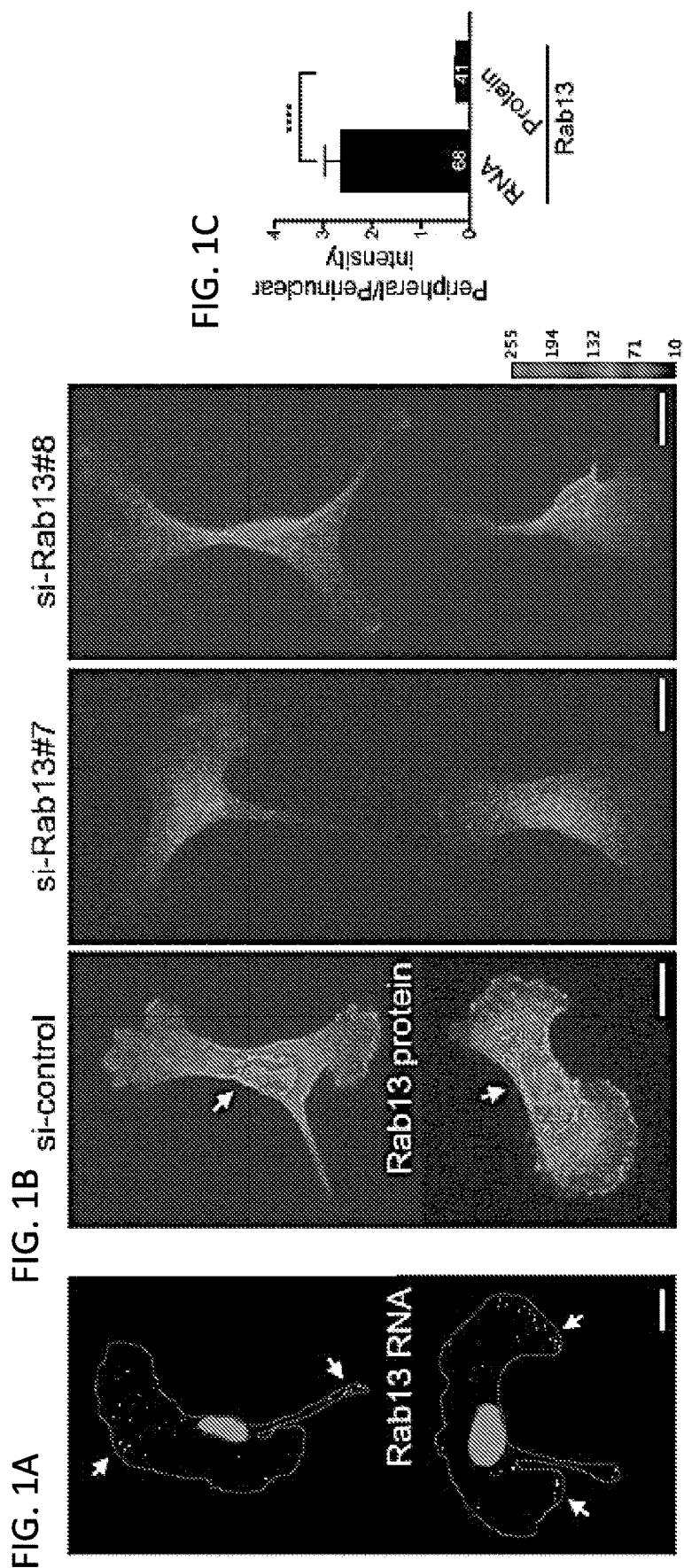

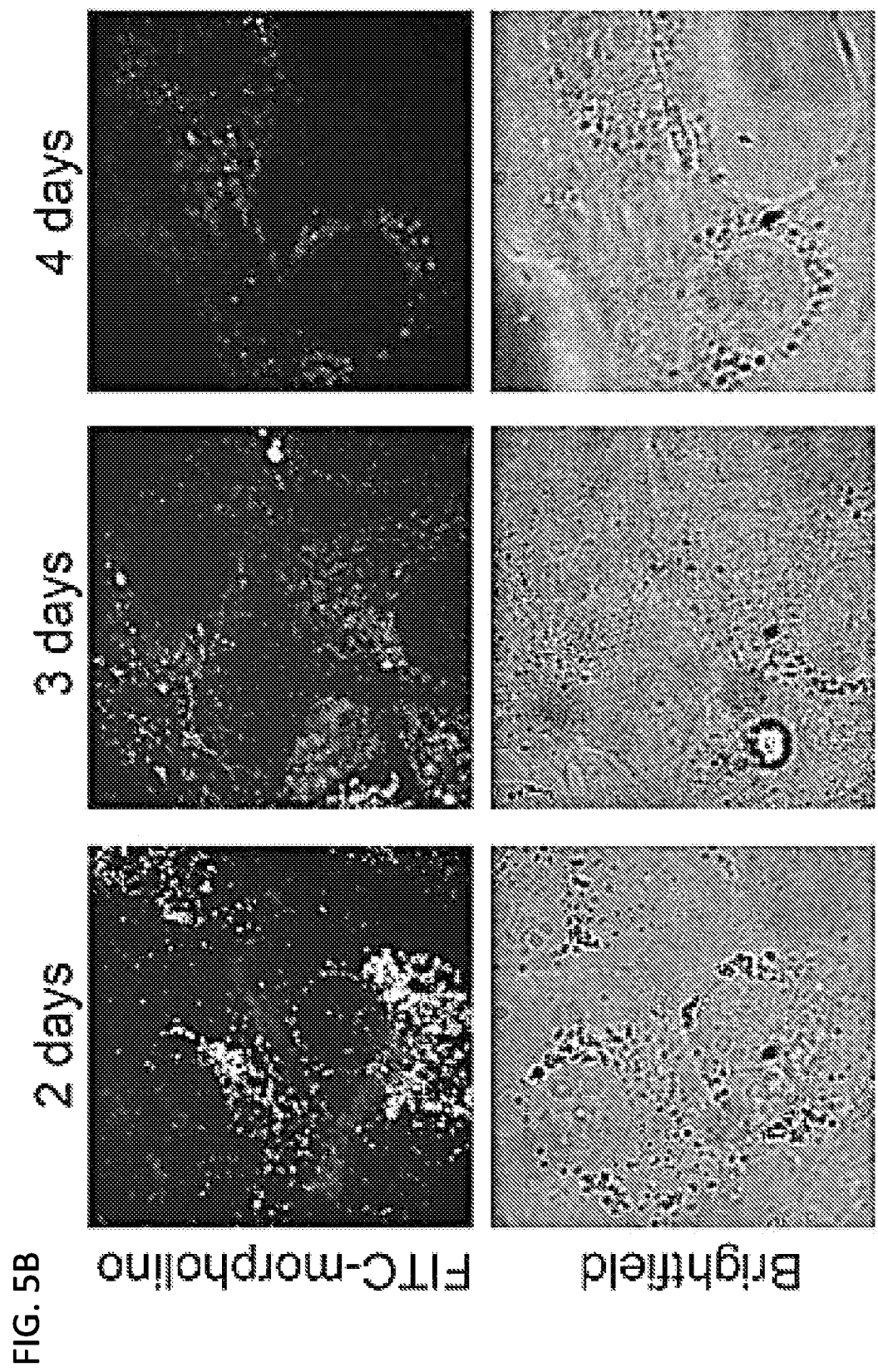

FIG. 7A     ▮:RGAAGRR motif
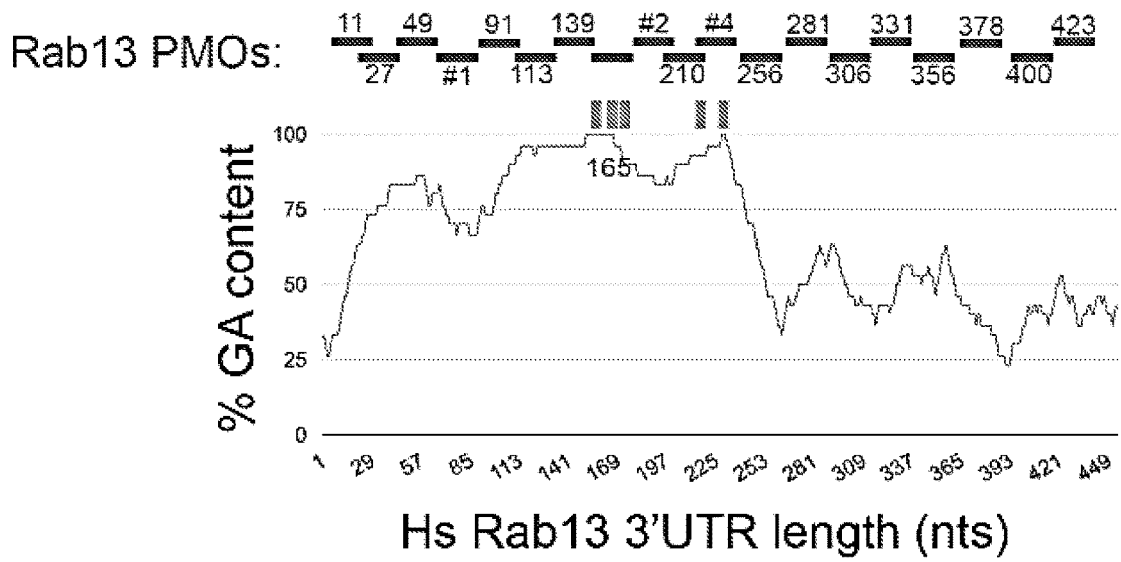
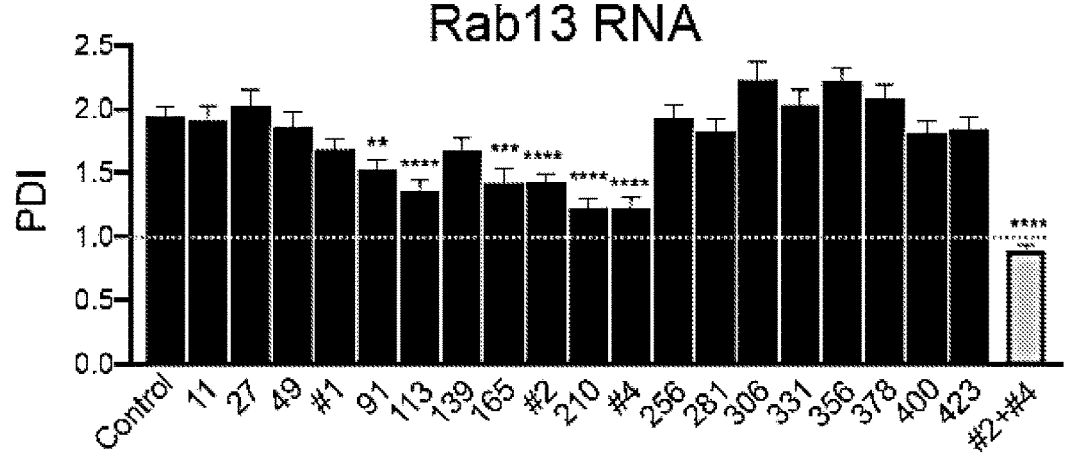
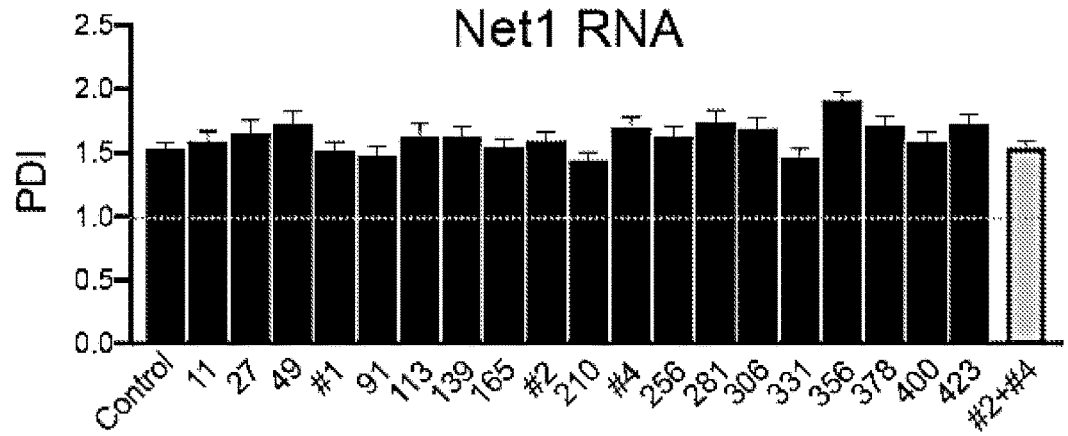

In vivo invasion/metastasis model

SEQUENCE LISTING

<160> NUMBER OF SEQ ID NOS: 32

<210> SEQ ID NO 1
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 1
ttcacatcct tggttcctcc ccctc                    25

<210> SEQ ID NO 2
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 2
ctgttcacct ttcacatcct tggtt                                   25

<210> SEQ ID NO 3
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 3
cttctcaaat cccttctgtt cacct                                   25

<210> SEQ ID NO 4
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 4
actaacaaag accttgtaga gtgag                                   25

<210> SEQ ID NO 5
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 5
gaacccacag tggaaacagg atgtc                                   25

<210> SEQ ID NO 6
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 6
ccaagcccct ctgctatttc tcccc                                   25

<210> SEQ ID NO 7
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 7
tctttcactt cctcaattca ttcct                                   25

<210> SEQ ID NO 8
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 8
ccttcctttc ctcctccctc tcttc                                          25

<210> SEQ ID NO 9
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 9
tccctcttgc atttcagaca acact                                          25

<210> SEQ ID NO 10
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 10
gacaaaacta ctctcttttc ctctc                                          25

<210> SEQ ID NO 11
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 11
ttcagcttcc ggggtgggga ggcaa                                          25

<210> SEQ ID NO 12
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 12
cgttgtctcc ctcaggttca gcttc                                          25

<210> SEQ ID NO 13
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 13
ctcccctgct cactccctct gccgt                                          25

<210> SEQ ID NO 14
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 14
ttaccatcta cctatgtgac cctcc                                          25

<210> SEQ ID NO 15

```
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 15
ctcctttttc tcctcattct cttta                                            25

<210> SEQ ID NO 16
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 16
tttttccctt tctgcttttc cctttt                                           25

<210> SEQ ID NO 17
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 17
tcccttctcc cttcctctct cttcc                                            25

<210> SEQ ID NO 18
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 18
tcttcctacc tccttgcctt ctttc                                            25

<210> SEQ ID NO 19
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 19
taaggtctga agcctgaggc atctc                                            25

<210> SEQ ID NO 20
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 20
tttatgtttg ccctgaaaac ccagg                                            25

<210> SEQ ID NO 21
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 21
```
aacagaataa atcagtgtat ttaca                                         25

<210> SEQ ID NO 22
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 22
gcaggaccct aaaacctgat ctagt                                         25

<210> SEQ ID NO 23
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 23
tagtgtagtg ccgagctagc ctttt                                         25

<210> SEQ ID NO 24
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 24
gacagaacag gagcaaattc cctag                                         25

<210> SEQ ID NO 25
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 25
accaagaaag accatgacaa gtgac                                         25

<210> SEQ ID NO 26
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 26
ttgtgcaaat ggtggccttt aatac                                         25

<210> SEQ ID NO 27
<211> LENGTH: 64
<212> TYPE: DNA
<213> ORGANISM: Mus musculus

<400> SEQUENCE: 27
gggaaaggag ggggaggaac caaggatgtg aaggtgaac agaagggatt tgagaagagg    60
aaag                                                                64

<210> SEQ ID NO 28
<211> LENGTH: 20
<212> TYPE: DNA

```
<213> ORGANISM: Artificial Sequence
<220> FEATURE:
<223> OTHER INFORMATION: Synthetic oligonucleotide

<400> SEQUENCE: 28
agggcaaaca taaatgtaaa                                                      20

<210> SEQ ID NO 29
<211> LENGTH: 21
<212> TYPE: DNA
<213> ORGANISM: Artificial Sequence
<220> FEATURE:
<223> OTHER INFORMATION: Synthetic oligonucleotide

<400> SEQUENCE: 29
atggtctttc ttggtattaa a                                                    21

<210> SEQ ID NO 30
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 30
cttggtttca cttggtaaaa ttaat                                                25

<210> SEQ ID NO 31
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 31
ttctacaact tactacacgc cctca                                                25

<210> SEQ ID NO 32
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 32
aaggcaaata agtccacgtc ccctc                                                25
```

RAB13 AND NET1 ANTISENSE OLIGONUCLEOTIDES TO TREAT METASTATIC CANCER

CROSS REFERENCE TO RELATED APPLICATIONS

This application is the U.S. National Stage of International Application No. PCT/US2021/015053, filed Jan. 26, 2021, which was published in English under PCT Article 21(2), which claims the benefit of U.S. Provisional Application No. 62/966,204, filed Jan. 27, 2020. The above-listed applications are herein incorporated by reference in their entirety.

FIELD

This disclosure provides antisense oligonucleotides specific for Rab13 and Net1, and methods of their use to treat metastatic cancer.

BACKGROUND

Numerous RNAs become localized to a variety of subcellular destinations in several cell types (Buxbaum et al., 2015, Medioni et al., 2012, Meignin and Davis, 2010). RNA accumulation can be accompanied by a corresponding increase in protein concentration at the same location. Such local protein gradients can be reinforced through translationally silencing RNAs prior to their arrival at their destination (Besse and Ephrussi, 2008). Activating translation only at particular locations or at specific times ensures spatial and temporal control of protein production and prevents deleterious effects of premature or ectopic translation (Buxbaum et al., 2015, Jung et al., 2014).

This type of regulation has been extensively described in highly polarized cells, such as neurons. For example, translational activation of RNAs localized at growth cones, and the consequent increase in local protein abundance, underlie axonal pathfinding decisions (Colak et al., 2013, Leung et al., 2006b, Wong et al., 2017). Similarly, activation of dendritic synapses upregulates translation of localized transcripts and is important for synaptic plasticity (Holt et al., 2019, Rangaraju et al., 2017, Yoon et al., 2016). In agreement with these, a genome-wide view identified RNA localization as a potential key determinant of approximately half of the neurite-enriched proteome (Zappulo et al., 2017). A similar significant correlation between steady-state RNA and protein localization has been described in epithelial cells for proteins associated with organelles, such as mitochondria and the endoplasmic reticulum (Fazal et al., 2019).

Nevertheless, a concordance between RNA localization and protein distribution is not always observed. One case in point concerns events occurring at dynamic protrusions extended by mesenchymal migrating cells. Numerous RNAs are enriched in such protrusive regions and the degree of their enrichment is at least partly controlled by dynamic interactions with the extracellular environment (Mili et al., 2008, Wang et al., 2017). RNA localization at protrusions and local translation is important for protrusion stability and cell migration (Mardakheh et al., 2015, Wang et al., 2017). Interestingly, however, global analysis has revealed little correlation between RNA and protein distribution for transcripts enriched at peripheral protrusions (Mardakheh et al., 2015). For a subset of these RNAs, which are localized through a pathway regulated by the APC tumor suppressor, they are subject to a different mode of translational regulation than the one described above. Specifically, APC-regulated RNAs are not silenced prior to arrival at the final destination. Instead these RNAs are translated similarly in both internal and peripheral locations (Moissoglu et al., 2019).

SUMMARY

It is shown herein that Rab13 RNA and protein distributions are discordant, with the Rab13 RNA being enriched in the periphery while the Rab13 protein assumes mostly a perinuclear distribution. To assess any functional role of peripheral RNA localization, methods are provided to specifically reduce (e.g., prevent) localization of the Rab13 RNA at peripheral protrusions without affecting its translation, stability or the localization of other co-regulated RNAs. It is shown that peripheral Rab13 translation does not affect the overall distribution of the protein or its ability to associate with membranes but is required for activation of the GTPase and for efficient cell migration. These results indicate that translation of Rab13 in specific subcellular environments imparts the protein with distinct properties, thus highlighting a means of controlling protein function through local RNA translation. Similar results were obtained when peripheral translation of the Net1 RNA was prevented. Based on the observation that Rab13 and Net1 antisense oligonucleotides (ASOs) can reduce migration of cancer cells, methods of using Rab13 and Net1 ASOs to reduce or prevent peripheral translation of Rab13 and Net1 RNAs to treat metastatic cancer are provided. In some examples, peripheral translation of Rab13 or Net1 RNA by the ASO is reduced by at least 20%, at least 50%, at least 75%, at least 80%, at least 85%, at least 90%, at least 95%, at least 99%, or even 100% (i.e., peripheral translation prevented), relative to the peripheral translation observed without treatment with one or more Rab13 ASOs and/or Net1 ASOs (such as one or more of SEQ ID NOs: 7, 8, 9, 10, 14, 15, 17, 18 and 30-32, wherein in some examples such sequences are PMOs), such as before such treatment.

Based on these observations, provided herein are Rab13 and Net1 antisense oligonucleotides (ASOs), which are specific for a GA-rich motif having the consensus sequence RGAAGRR (where R is a purine), or an adjacent GA-rich region. In some examples, a Rab13 ASO, comprises or consists of the sequence of any one of SEQ ID NO: 7, 8, 14, 15, 17 and 18. In some examples, a Net1 ASO comprises or consists of the sequence of any one of SEQ ID NO: 9, 10, 30, 31 and 32. The ASOs provided herein can include one or more chemical modifications, such as at least one phosphorothioate, at least one 2'-fluoro, at least one 2'-O-methyl, at least one 2'-O-methoxy-ethyl, at least one morpholino, at least one 2',4'-constrained ethyl nucleic acid, and/or at least one locked nucleic acid (LNA).

The disclosed Rab13 and Net1 ASOs can be covalently attached to other molecules, such as a detectable label, for example a fluorophore or radionuclide. In some examples, a disclosed Rab13 or Net1 ASO is covalently attached to a nanoparticle, such as a polymeric nanoparticle, nanosphere, nanocapsule, liposome, dendrimer, polymeric micelle, or niosome.

Also provided are cells, such as a bacterial cell, yeast cell, insect cell, or mammalian cell, which includes one or more of the disclosed Rab13 and Net1 ASOs. Also provided are vectors, such as a viral vector (e.g., adenovirus, lentivirus, or AAV) or plasmid, which includes one or more of the disclosed Rab13 and Net1 ASOs.

Also provided are compositions that include one or more Rab13 and/or Net1 ASOs (or vectors or cells containing such), and a pharmaceutically acceptable carrier (such as water or saline). Such compositions can be present in a vial, such as a glass or plastic container. In some examples such compositions are lyophilized or frozen.

Methods of treating a metastatic tumor using one or more Rab13 and/or Net1 ASOs provided herein are disclosed. In one example, such a method includes administering a therapeutically effective amount of one or more of the Rab13 and/or Net1 ASOs provided herein (such as a composition including such), to a subject with the metastatic tumor, thereby treating the metastatic tumor. Such a method can be used to reduce a number of metastases of the metastatic tumor, reduce the size of a metastasis, reduce the volume of a metastasis, or combinations thereof. In some examples, the administration is intratumoral, for example into a metastasis.

Also provided are methods of reducing migration of a cell, such as a metastatic tumor cell. In one example, such a method includes contacting a cell with a therapeutically effective amount of one or more of the Rab13 and/or Net1 ASOs provided herein (such as a composition including such), thereby reducing migration of the cell. In some examples, the contacting includes administration to a subject where the cell is located (e.g., in vivo method). In some example the contacting occurs ex vivo. In some examples, such a method reduces a migration speed of the cell, protrusion velocity of the cell, retraction velocity of the cell, or combinations thereof.

Exemplary metastatic tumors or cancers that can be treated using the disclosed methods, or whose migration can be reduced, include a metastatic tumor or tumor cell of the breast, lung, colon, pancreas, ovary, uterus, cervix, skin, prostate, bone, central nervous system, kidney, or head and neck.

The disclosed methods can be used in combination with additional anti-cancer therapies. For example, the disclosed methods can further include administering a therapeutically effective amount of one or more additional anti-cancer agents to the subject (or contacting with the metastatic cancer cell), such as a chemotherapeutic, radiation therapy, and/or a biologic.

The foregoing and other objects and features of the disclosure will become more apparent from the following detailed description, which proceeds with reference to the accompanying figures.

BRIEF DESCRIPTION OF THE DRAWINGS

FIGS. 1A-1D: Rab13 RNA and protein exhibit distinct subcellular distributions. (FIG. 1A) Representative FISH images showing Rab13 RNA distribution in MDA-MB-231 cells. Nuclei and cell outlines are shown. Arrows point to Rab13 RNA concentrated at protrusive regions. (FIG. 1B) Representative immunofluorescence images of Rab13 protein in cells transfected with the indicated siRNAs. Arrows point to perinuclear Rab13 protein. Calibration bar shows intensity values. (FIG. 1C) Ratios of peripheral/perinuclear intensity calculated from images as shown in FIG. 1A and FIG. 1B. Values within each bar represent number of cells observed in 3 independent experiments. (FIG. 1D) Protrusions (Ps) and cell bodies (CB) of cells induced to migrate towards LPA were isolated and analyzed to detect the indicated proteins (by Western blot; left panels) or RNAs (by RT-ddPCR; right panel). Ps/CB enrichment ratios from two independent experiments are shown. P-values: <0.01; **<0.0001 by student's t-test (FIG. 1C) or analysis of variance with Dunnett's multiple comparisons test (FIG. 1D). Scale bars: 10 µm.

(FIG. 2A) Schematic showing the % GA content along the mouse Rab13 3'UTR using a 30 nt window size. Occurrences of the consensus GA-rich motif are indicated by a rectangle. The exact sequence between nucleotides 153-216 (SEQ ID NO: 27) is shown with deleted regions indicated by black bars. (FIG. 2B) FISH images of mouse fibroblasts expressing the β-globin coding sequence followed by the indicated UTRs. β-globin RNA is indicated by punctate staining. Nuclei and cell outlines are also shown. Arrows point to β-globin RNA concentrated at protrusive regions. Δ1 and Δ1+2 indicate deletions of the regions shown in (FIG. 2A). Scale bars: 10 µm. (FIG. 2C) Distribution of β-globin RNA, or of Ddr2 RNA detected in the same cells, quantified by measuring a Peripheral Distribution Index (PDI). N=35-55 cells observed in 3 independent experiments. ****:p<0.0001 by analysis of variance with Dunnett's multiple comparisons test.

(FIG. 4A) Schematic showing positions along the mouse Rab13 3'UTR (SEQ ID NO: 27) targeted by the indicated antisense phopshorodiamidate morpholino oligos (PMOs, SEQ ID NOS: 1-3). Rectangles and text indicate the location of the GA-rich motifs. (FIG. 4B) FISH images and corresponding PDI measurements of mouse fibroblast cells treated with the indicated PMOs. Cyb5r3 is an APC-dependent RNA also enriched at protrusions. Arrows point to locations of Rab13 RNA accumulation. Rab13 RNA becomes perinuclear in cells treated with PMOs against the GA-rich region. Scale bars: 10 µm. **: p<0.0001 by analysis of variance with Dunnett's multiple comparisons test. N=40-90 cells observed in 3-6 independent experiments. (FIG. 4C) Protrusion (Ps) and cell body (CB) fractions were isolated from cells treated with control-PMO or Rab13-PMO #2. The indicated RNAs were detected through nanoString analysis to calculate Ps/CB enrichment ratios (n=3; error bars: standard error). Only the distribution of the Rab13 RNA is affected. : p=0.01 by two-way ANOVA with Bonferroni's multiple comparisons test against the corresponding control. (FIG. 4D) Levels of the indicated RNAs were determined using nanoString analysis from control- or Rab13 PMO #2-treated cells. N=4. No significant differences were detected by two-way ANOVA against the corresponding controls.

FIGS. 5A-5B: Uptake and persistence of PMOs. (FIG. 5A) FITC-labeled PMOs were delivered into the indicated cell lines and fluorescence uptake was assessed after 24 hrs by live cell imaging. >90% of cells had visible fluorescence in intracellular vesicles or diffusely in the cytoplasm. (FIG. 5B) Mouse fibroblast cells were treated with FITC-labeled PMOs. Persistence of PMOs in cells was assessed daily for four days by live-cell imaging After four days, signal is still detectable in >90% of cells.

FIGS. 7A-7C: The human Rab13 3'UTR exhibits a functionally conserved GA-rich region required for peripheral localization. (FIG. 7A) Schematic showing % GA content and positions along the human Rab13 3'UTR targeted by the indicated antisense PMOs. Rectangles indicate the location of GA-rich motifs. Graphs present PDI measurements of Rab13 RNA (upper panel) or Net1 RNA (bottom panel) detected in MDA-MB-231 cells treated with the indicated PMOs. PDI=1 indicates a diffuse distribution. p-values: <0.01, *<0.001, ****<0.0001 by analysis of variance with Dunnett's multiple comparisons test. n.s.: non-significant. N=30-73 cells observed in 3-5 independent experiments. (FIG. 7B) Representative FISH images of cells treated with the indicated PMOs. Arrows point to locations of RNA accumulation. Rab13 RNA becomes perinuclear in cells treated with PMOs against the GA-rich region (SEQ ID NOS: 7 and 8), while Net1, another APC-dependent RNA, remains localized at protrusions. Scale bars: 10 μm. (FIG. 7C) Rab13 protein levels were measured by quantitative Western blot and normalized to total tubulin or GAPDH levels. Relative levels in Rab13 PMO-treated compared to control are shown. No significant differences were detected by Kruskal-Wallis test with Dunn's multiple comparisons test.

(FIG. 8A) Transwell migration of MDA-MB-231 cells treated with control PMOs or Rab13 PMOs (#2+#4; SEQ ID NOs: 7 and 8, respectively). Cells reaching the bottom surface after 4 hours were counted. n=25 fields of view in each of 6 independent experiments. (FIG. 8B) Cells expressing Cherry-NLS and treated with the indicated PMOs were tracked every 5 minutes for 10 hours to derive average migration speed. n=65 cells. (FIG. 8C) PMO-treated cells were induced to invade through a Matrigel plug. Cell staining intensity was used to quantify relative invasion from n=4 independent experiments. (FIG. 8D) Lifeact-GFP-expressing cells were treated with the indicated PMOs and imaged every minute over 1 hour. Sequential image frames highlight edge retraction (arrowheads at top/left) or protrusion (arrowheads at bottom/right). Corresponding edge velocity is shown, with negative values indicating retraction and positive values indicating extension. Average protrusion and retraction speeds were calculated from n=11-13 cells. (FIG. 8E) Cells treated with the indicated PMOs or siRNAs were analyzed by Western blot to detect Rab13 and GAPDH protein levels. Migration speed was assessed as in FIG. 8B from n=55-78 cells. (FIG. 8F) Protrusion and retraction speed of cells treated with the indicated PMOs or siRNAs was assessed as in FIG. 8D. Graphs show average normalized values from n=10-13 cells imaged for 1 hour. p-values: *<0.05; <0.01, *<0.001, ****<0.0001, by Student's t-test (FIGS. 8A, 8B, 8C, 8D) or analysis of variance with Dunnett's multiple comparisons test (FIGS. 8E, 8F). n.s.: not significant.

(FIG. 9A) Schematics depict GFP or GFP-Rab13 constructs stably expressed in MDA-MB-231 cells. Rab13 coding sequence is followed either by the wild type Rab13 UTR or the Rab13 UTR carrying a 52 nt deletion corresponding to the region targeted by PMOs #2 and #4 (APMO UTR). Exogenous RNA is detected by FISH against the GFP sequence. Arrows point to RNA localized at protrusions. Scale bars: 10 Graphs show PDI measurements of GFP or Net1 RNA from multiple cells. n=42-54 cells in 4 independent experiments (for GFP); n=27 cells in 2 experiments (for Net1). ****: p<0.0001 by analysis of variance with Dunnett's multiple comparisons test. (FIG. 9B) Levels of GFP RNA from the indicated cells lines were assessed by RT-ddPCR and normalized to housekeeping control RNAs. n=6. (FIG. 9C) The indicated cell lines were analyzed by flow cytometry to assess GFP intensity per cell. (FIG. 9D) GFP-Rab13 protein levels of the indicated cell lines were assessed by quantitative Western and normalized to tubulin levels. n=7. n.s.: not significant.

(FIG. 10A) Rab13 immunofluorescence of MDA-MB-231 cells treated with control or Rab13 (#2+#4) PMOs and ratios of peripheral/perinuclear intensity. n=45-50 cells. Similar results were observed in two additional independent experiments. (FIG. 10B) Fluorescence images of cells expressing GFP-Rab13 with the indicated UTRs. In both cases, the protein assumes indistinguishable distribution. Scale bars: 10 (FIG. 10C) Soluble/particulate fractionation of the indicated cell lines followed by Western blot to detect the indicated proteins. RhoGDI and TfRc serve as soluble and particulate markers, respectively. Graph shows quantitation from n=3 independent experiments. (FIGS. 10D and 10E) Active Rab13 (Rab13-GTP) was pulled-down using MICAL-L1-RBD-GST from the indicated PMO-treated cells (FIG. 10D) or GFP-Rab13 expressing lines (FIG. 10E). The amount of endogenous or exogenous Rab13 was measured by quantitative Western and relative levels of active Rab13 are plotted. n=8 (FIG. 10D), n=4 (FIG. 10E). p-values: *<0.05, **<0.01 by Kruskal-Wallis test.

(FIG. 11A) Cells treated with the indicated PMOs were fractionated into soluble and particulate fractions and the indicated proteins were detected by Western blot. RhoGDI and TfRc serve as soluble and particulate markers, respectively. (FIG. 11B) Lysates from the indicated GFP or GFP-Rab13 expressing cell lines were immunoprecipitated with anti-GFP antibodies and blotted to detect the indicated proteins. Relative REP-1 and RabGDI binding is quantified in the graphs from n=3 (REP-1) and n=5 (RabGDI) independent experiments. No significant differences were detected.

FIGS. 16A-16F: Antisense oligonucleotides that disrupt Net1 RNA localization and migration. (FIG. 16A) Schematic showing % GA content and positions along the human NET1 3'UTR targeted by the indicated antisense morpholino oligonucleotides (PMOs). Oligos numbered 761 (SEQ ID NO: 30), 921 (SEQ ID NO: 9), 975 (SEQ ID NO: 10), 1067 (SEQ ID NO: 31) and 1097 (SEQ ID NO: 32) significantly decreased the peripheral localization of the NET1 RNA. Graphs present PDI measurements of NET1 RNA (upper panel) or RAB13 RNA (used as a control; bottom panel) detected in MDA-MB-231 cells treated with the indicated PMOs. PDI=1 indicates a diffuse distribution. p-values: ***<0.001 by analysis of variance with Dunnett's multiple comparisons test. (FIG. 16B) Representative FISH images of cells treated with the indicated control or NET1 (921+ 975, SEQ ID NO: 9+SEQ ID NO: 10) PMOs. Arrows point to peripheral RNA. Arrowheads point to perinuclear RNA. NET1 RNA becomes perinuclear in cells treated with NET1 PMOs, while RAB13 remains localized at protrusions. Scale bars: 10 µm. (FIG. 16C) Cells treated with the indicated PMOs as in FIG. 16A were analyzed by Western blot to detect total NET1 protein levels. No significant differences were observed. (FIG. 16D) Cell treated with the indicated PMOs as in FIG. 16A were analyzed by RT-ddPCR to detect total NET1 RNA levels. No significant differences were observed. (FIG. 16E) Cells treated with the indicated control or NET1 PMOs (921+975, SEQ ID NO: 9+SEQ ID NO: 10; 1067, SEQ ID NO: 31) were analyzed to assess the level of active NET1, through binding to a nucleotide-free RhoA mutant that exhibits high affinity for GEFs. Mislocalization of NET1 RNA leads to reduced NET1 protein activity. (FIG. 16F) Cells treated with the indicated control or NET1 PMOs were tracked over time to assess the speed of their migration. Mislocalization of NET1 RNA leads to reduced migration speed. P-values: *<0.05, ***<0.001 by analysis of variance with Dunnett's multiple comparisons test.

SEQUENCE LISTING

Figure 1D:
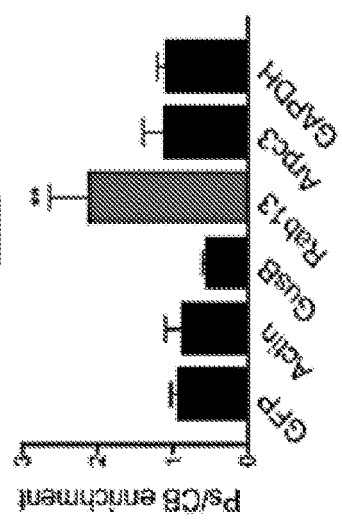
Figure 1D:
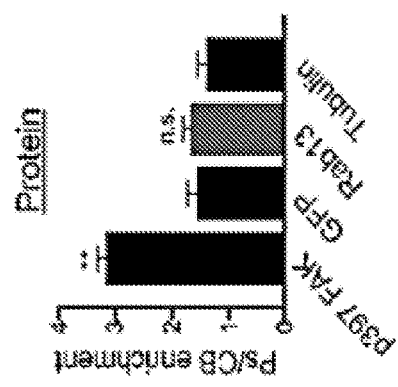
Figure 1D:
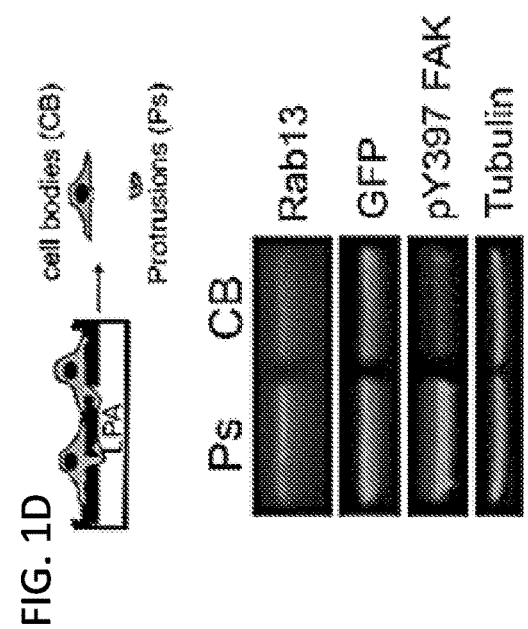

The nucleic and amino acid sequences are shown using standard letter abbreviations for nucleotide bases, and three letter code for amino acids, as defined in 37 C.F.R. 1.822. Only one strand of each nucleic acid sequence is shown, but the complementary strand is understood as included by any reference to the displayed strand. The Sequence Listing is submitted as an ASCII text file, created on Jul. 10, 2022. 6.6 KB, which is incorporated by reference herein. In the accompanying sequence listing:

SEQ ID NOs: 1-5 are exemplary antisense molecules specific for mouse Rab13.

SEQ ID NOs: 6-8 are exemplary antisense molecules specific for human Rab13.

SEQ ID NOs: 9-10 are exemplary antisense molecules specific for human Net1.

SEQ ID NOs: 11-26 are exemplary antisense molecules specific for human Rab13.

SEQ ID NO: 27 is s nucleotide sequence of a portion of the Rab13 3'UTR.

SEQ ID NOs: 28 and 29 are siRNA sequences.

SEQ ID NOs: 30-32 are exemplary antisense molecules specific for human Net1.

DETAILED DESCRIPTION

Unless otherwise noted, technical terms are used according to conventional usage. Definitions of common terms in molecular biology may be found in Benjamin Lewin, Genes VII, published by Oxford University Press, 2000 (ISBN 019879276X); Kendrew et al. (eds.), *The Encyclopedia of Molecular Biology*, published by Blackwell Publishers, 1994 (ISBN 0632021829); Robert A. Meyers (ed.), *Molecular Biology and Biotechnology: a Comprehensive Desk Reference*, published by Wiley, John & Sons, Inc., 1995 (ISBN 0471186341); and George P. Rédei, *Encyclopedic Dictionary of Genetics, Genomics, and Proteomics*, 2nd Edition, 2003 (ISBN: 0-471-26821-6).

The singular forms "a," "an," and "the" refer to one or more than one, unless the context clearly dictates otherwise. For example, the term "comprising a cell" includes single or plural cells and is considered equivalent to the phrase "comprising at least one cell." The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements.

It is further to be understood that all base sizes or amino acid sizes, and all molecular weight or molecular mass values, given for nucleic acids or polypeptides are approximate, and are provided for description. Although methods and materials similar or equivalent to those described herein can be used in the practice or testing of the present disclosure, suitable methods and materials are described below. All publications, patent applications, patents, and other references mentioned herein are incorporated by reference in their entirety, as are the GenBank® Accession numbers (for the sequence present on Jan. 27, 2020). In case of conflict, the present specification, including explanations of terms, will control. In addition, the materials, methods, and examples are illustrative only and not intended to be limiting.

Except as otherwise noted, the methods and techniques of the present disclosure are generally performed according to conventional methods and as described in various general and more specific references that are cited and discussed throughout the present specification. See, e.g., Sambrook et al., *Molecular Cloning: A Laboratory Manual*, 2d ed., Cold Spring Harbor Laboratory Press, 1989; Sambrook et al.,

*Molecular Cloning: A Laboratory Manual,* 3d ed., Cold Spring Harbor Press, 2001; Ausubel et al., *Current Protocols in Molecular Biology,* Greene Publishing Associates, 1992 (and Supplements to 2000); Ausubel et al., *Short Protocols in Molecular Biology: A Compendium of Methods from Current Protocols in Molecular Biology,* 4th ed., Wiley & Sons, 1999; Harlow and Lane, *Antibodies: A Laboratory Manual,* Cold Spring Harbor Laboratory Press, 1990; and Harlow and Lane, *Using Antibodies: A Laboratory Manual,* Cold Spring Harbor Laboratory Press, 1999.

Administration: To provide or give a subject an agent, such as one or more Rab13 ASOs and/or Net1 ASOs (such as one or more of SEQ ID NOs: 7, 8, 9, 10, 14, 15, 17, 18 and 30-32, wherein in some examples such sequences are PMOs) by any effective route. Exemplary routes of administration include, but are not limited to, oral, injection (such as subcutaneous, intramuscular, intradermal, intraperitoneal, intravenous, intraosseous, and intratumoral), sublingual, rectal, transdermal, intranasal, ocular, vaginal and inhalation routes. In one example, administration is injection into a tumor.

Anti-microtubule agent: A type of drug that blocks cell growth by stopping mitosis. Anti-microtubule agents, also referred to as "anti-mitotic agents," are used to treat cancer. Such agents can be used in combination with the disclosed Rab13 ASOs and/or Net1 ASOs (such as one or more of SEQ ID NOs: 7, 8, 9, 10, 14, 15, 17, 18 and 30-32, wherein in some examples such sequences are PMOs) to treat a metastatic cancer.

Antisense oligonucleotide (ASO): A synthetic, single-stranded nucleic acid-based oligomer that is complementary to a target nucleic acid molecule, such as a target RNA, such as Rab13 or Net1 RNA. Typical ASOs are 15-30 bp in length. An antisense oligonucleotide can include one or more chemical modifications to the sugar, base, and/or internucleoside linkages. Exemplary modifications to the sugar include, but are not limited to, bridged nucleic acids (such as locked nucleic acid (LNA) and 2',4'-constrained ethyl nucleic acid ((S)-cET)), 2'-O-methyl (OMe), 2'-O-methoxy-ethyl (MOE), 2'-fluoro, cEt and tc-DNA. Modifications to the internucleoside linkages include, for example, phosphorothioate and phosphoramidate. One example of a modified base is 5-methylcytosine. In one example, ASOs include phosphorodiamidate morpholino (PMO) modifications, that is, includes bases bound to methylenemorpholine rings linked through phosphorodiamidate groups instead of phosphates. The ASOs provided herein are specific for Rab13 or Net1, such as human Rab13 or human Net1. In some examples, ASOs are covalently bound to a carrier or ligand, such as lipid particles, liposomes, nanoparticles, N-acetyl galactosamine.

Cancer: A malignant tumor characterized by abnormal or uncontrolled cell growth. Other features often associated with cancer include metastasis, interference with the normal functioning of neighboring cells, release of cytokines or other secretory products at abnormal levels and suppression or aggravation of inflammatory or immunological response, invasion of surrounding or distant tissues or organs, such as lymph nodes, etc. "Metastatic cancer" refers to cancer cells that have left the original tumor site (e.g., a lung) and migrate to other parts of the body (e.g., a lung cancer cell migrating to the liver, brain, or bone) for example via the bloodstream or lymph system.

Chemotherapeutic agent: A chemical agent with therapeutic usefulness in the treatment of diseases characterized by abnormal cell growth. Such diseases include tumors, neoplasms, and cancer. In one embodiment, a chemotherapeutic agent is an agent of use in treating cancer, such as a metastatic cancer. In one embodiment, a chemotherapeutic agent is a radioactive compound. Exemplary chemotherapeutic agents that can be used with the methods provided herein are disclosed in Slapak and Kufe, *Principles of Cancer Therapy,* Chapter 86 in Harrison's Principles of Internal Medicine, 14th edition; Perry et al., *Chemotherapy,* Ch. 17 in Abeloff, Clinical Oncology $2^{nd}$ ed., 2000 Churchill Livingstone, Inc; Baltzer, L., Berkery, R. (eds.): *Oncology Pocket Guide to Chemotherapy,* 2nd ed. St. Louis, Mosby-Year Book, 1995; Fischer, D. S., Knobf, M. F., Durivage, H. J. (eds): *The Cancer Chemotherapy Handbook,* 4th ed. St. Louis, Mosby-Year Book, 1993). Combination chemotherapy is the administration of more than one agent to treat cancer. One example is the administration of one or more Rab13 ASOs and/or Net1 ASOs (such as one or more of SEQ ID NOs: 7, 8, 9, 10, 14, 15, 17, 18 and 30-32, wherein in some examples such sequences are PMOs) used in combination with a radioactive or chemical compound (such as a biologic). In one example, a chemotherapeutic agent is a biologic, such as a therapeutic antibody (e.g., therapeutic monoclonal antibody), such as anti-PD1 or anti-PDL1 (e.g., pembrolizumab and nivolumab), anti-EGFR (e.g., cetuximab and panitumumab), anti-CTLA-4 (e.g., ipilimumab), anti-CD52 (e.g., alemtuzumab), anti-HER-2 (e.g., trastuzumab), anti-CD20 (e.g., rituximab, ofatumumab, ibritumomab tiuxetan, tositumomab), anti-CEA (e.g., arcitumomab), and/or anti-VEGF (e.g., bevacizumab).

Contact: Placement in direct physical association, including a solid or a liquid form. Contacting can occur in vitro or ex vivo, for example, by adding a reagent to a sample (such as one containing metastatic cancer cells), or in vivo by administering to a subject.

Decrease or Reduce: To reduce the quality, amount, or strength of something. In one example, a therapeutic composition that includes one or more Rab13 ASOs and/or Net1 ASOs (such as one or more of SEQ ID NOs: 7, 8, 9, 10, 14, 15, 17, 18 and 30-32, wherein in some examples such sequences are PMOs) decreases the migration of a metastatic cancer cell, for example as compared to the migration in the absence of the one or more such ASOs. In some examples such a decrease is evidenced by the reduction of migration speed, migration distance, protrusion velocity, and/or retraction velocity of metastatic cancer cells. In some examples, the decrease in the migration of metastatic cancer cells is at least 20%, at least 50%, at least 75%, at least 80%, at least 85%, at least 90%, at least 95%, or even at least 99%, relative to the migration (e.g, migration speed, migration distance, protrusion velocity, and/or retraction velocity) observed without treatment with one or more Rab13 ASOs and/or Net1 ASOs (such as one or more of SEQ ID NOs: 7, 8, 9, 10, 14, 15, 17, 18 and 30-32, wherein in some examples such sequences are PMOs), such as before such treatment. In other examples, decreases are expressed as a fold change, such as a decrease in the cell viability by at least 2-fold, at least 3-fold, at least 4-fold, at least 5-fold, at least 8-fold, at least 10-fold, or even at least 15 or 20-fold, relative to the migration observed without treatment with one or more Rab13 ASOs and/or Net1 ASOs (such as one or more of SEQ ID NOs: 7, 8, 9, 10, 14, 15, 17, 18 and 30-32, wherein in some examples such sequences are PMOs), such as before such treatment. Such decreases can be measured using the methods disclosed herein.

Detect: To determine if a particular agent is present or absent, and in some example further includes quantification of the agent if detected.

Host cells: Cells in which an exogenous nucleic acid molecule is introduced, such as one or more Rab13 ASOs and/or Net1 ASOs (such as one or more of SEQ ID NOs: 7, 8, 9, 10, 14, 15, 17, 18 and 30-32, wherein in some examples such sequences are PMOs). The cell may be prokaryotic or eukaryotic. The term also includes any progeny of the subject host cell. It is understood that all progeny may not be identical to the parental cell since there may be mutations that occur during replication. However, such progeny are included when the term "host cell" is used. Thus, host cells can be transgenic, in that they include nucleic acid molecules that have been introduced into the cell, such as one or more Rab13 ASOs and/or Net1 ASOs (such as one or more of SEQ ID NOs: 7, 8, 9, 10, 14, 15, 17, 18 and 30-32, wherein in some examples such sequences are PMOs). Exemplary host cells include mammalian cells (e.g., an immortal cell line), bacterial cells (e.g., *E. coli*), insect cells, and yeast cells.

Hybridization or hybridize: The binding of a nucleic acid molecule to another nucleic acid molecule, for example the binding of an ASO to another nucleic acid, such as a Rab13 RNA or Net1 RNA, thereby forming a duplex molecule. The ability of one nucleic acid molecule to bind to another nucleic acid molecule can depend upon the complementarity between the nucleotide sequences of two nucleic acid molecules, and the stringency of the hybridization conditions.

Methods of performing hybridization are known (such as those described in sections 7.39-7.52 of Sambrook et al., (1989) Molecular Cloning, second edition, Cold Spring Harbor Laboratory, Plainview, NY.). For example, Southern or Northern analysis can be used to determine if one nucleic acid sequence hybridizes to another nucleic acid sequence.

ASOs are disclosed herein, such as SEQ ID NOs: 1-26 and 30-32. However, the present disclosure encompasses other Rab13 or Net1 ASOs that can hybridize to a Rab13 RNA or Net1 RNA molecule, such as to a GA-rich motif having consensus sequence RGAAGRR (where R is a purine) or an adjacent GA-rich region, under moderate or high stringent conditions.

Moderately stringent hybridization conditions are when the hybridization is performed at about 42° C. in a hybridization solution containing 25 mM $KPO_4$ (pH 7.4), 5×SSC, 5× Denhart's solution, 50 µg/mL denatured, sonicated salmon sperm DNA, 50% formamide, 10% Dextran sulfate, and 1-15 ng/mL probe (about 5×107 cpm/µg), while the washes are performed at about 50° C. with a wash solution containing 2×SSC and 0.1% sodium dodecyl sulfate.

Highly stringent hybridization conditions are when the hybridization is performed at about 42° C. in a hybridization solution containing 25 mM $KPO_4$ (pH 7.4), 5×SSC, 5× Denhart's solution, 50 µg/mL denatured, sonicated salmon sperm DNA, 50% formamide, 10% Dextran sulfate, and 1-15 ng/mL probe (about 5×107 cpm/µg), while the washes are performed at about 65° C. with a wash solution containing 0.2×SSC and 0.1% sodium dodecyl sulfate.

Isolated: An "isolated" biological component (such as an ASO, such as any of SEQ ID NOs: 1-26 and 30-32, such as any of SEQ ID NOs: 7, 8, 9, 10, 14, 15, 17, 18 and 30-32) has been substantially separated, produced apart from, or purified away from other biological components in a cell, such as other chromosomal and extrachromosomal DNA and RNA, and proteins. Nucleic acids molecules and proteins which have been "isolated" thus include nucleic acids and proteins purified by standard purification methods. The term also embraces nucleic acid molecules and proteins prepared by recombinant expression in a host cell as well as chemically synthesized nucleic acids and proteins. A purified or isolated cell, protein, or nucleic acid molecule can be at least 70%, at least 80%, at least 90%, at least 95%, at least 96%, at least 97%, at least 98%, or at least 99% pure.

Label: A detectable compound or composition that is conjugated directly or indirectly to another molecule, such as an ASO, to facilitate detection of that molecule. Specific, non-limiting examples of labels include fluorescent tags, enzymatic linkages, and radioactive isotopes. In one example, a "labeled ASO" refers to attachment of another molecule to the ASO, for example by covalent attachment. Various methods of labeling nucleic acid molecules are known and may be used. Examples of labels that can be attached to a Rab13 or Net1 ASO disclosed herein include, but are not limited to, radioisotopes or radionucleotides (such as $^{35}S$, $^{11}C$, $^{13}N$, $^{15}O$, $^{18}F$, $^{19}F$, $^{99m}Tc$, $^{131}I$, $^{3}H$, $^{14}C$, $^{15}N$, $^{90}Y$, $^{99}Tc$, $^{111}In$ and $^{125}I$), fluorescent labels (such as fluorescein isothiocyanate (FITC), rhodamine, lanthanide phosphors), enzymatic labels (such as horseradish peroxidase, beta-galactosidase, luciferase, alkaline phosphatase), chemiluminescent markers, biotinyl groups, or magnetic agents, such as gadolinium chelates.

Locked nucleic acid (LNA): A modified RNA nucleotide. The ribose moiety of an LNA nucleotide is modified with an extra bridge connecting the 2' oxygen and the 4' carbon.

Morpholino oligonucleotides: A type of ASO. Morpholino oligonucleotides have standard nucleic acid bases, but the bases are bound to morpholino rings instead of deoxyribose rings, and are linked through phosphorodiamidate groups instead of phosphates. Replacement of anionic phosphates with the uncharged phosphorodiamidate groups eliminates ionization in the usual physiological pH range, thus morpholinos in organisms or cells are uncharged molecules. Unlike many other types of antisense compounds, morpholino oligonucleotides do not promote degradation of target mRNAs, but rather act by steric blocking. The structure and preparation of morpholino oligonucleotides is detailed in U.S. Pat. Nos. 5,698,685, 5,217,866, 5,142,047, 5,034,506, 5,166,315, 5,185,444, 5,521,063, and 5,506,337, and U.S. Patent Application Publication No. 2009/0171075, each of which is herein incorporated by reference.

Mammal: This term includes both human and non-human mammals. Similarly, the term "subject" includes both human and veterinary subjects (such as cats, dogs, cows, and pigs) and rodents (such as mice and rats).

Neuroepithelial cell-transforming gene 1 (Net1): (e.g., OMIM 606450) A part of the family of Rho guanine nucleotide exchange factors, which activate Rho proteins by catalyzing the exchange of GDP for GTP. Net1 interacts with RhoA within the cell nucleus. Alternative splicing results in multiple transcript variants that encode different protein isoforms.

Net1 sequences are publically available, for example from the GenBank® sequence database (e.g., Accession Nos. NP_001040625.1, NP_062645.2, and NP_001040624.1 provide exemplary Net1 protein sequences, while Accession Nos. NM_001047160.3, NM_019671.3 and NM_001047159.2 provide exemplary Net1 nucleic acid sequences). One of ordinary skill in the art can identify additional Net1 nucleic acid and protein sequences, including Net1 variants having Net1 activity.

Operably linked: A first nucleic acid sequence is operably linked with a second nucleic acid sequence when the first nucleic acid sequence is placed in a functional relationship with the second nucleic acid sequence. For instance, a promoter is operably linked to an ASO if the promoter affects the transcription or expression of the ASO (such as one or more of SEQ ID NOs: 7, 8, 9, 10, 14, 15, 17, 18 and 30-32). Generally, operably linked DNA sequences are contiguous and, where necessary to join two protein coding regions, in the same reading frame.

Pharmaceutically acceptable carriers: The pharmaceutically acceptable carriers useful in this invention are conventional. Remington's Pharmaceutical Sciences, by E. W. Martin, Mack Publishing Co., Easton, PA, 15th Edition (1975), describes compositions and formulations suitable for pharmaceutical delivery of one or more Rab13 ASOs and/or Net1 ASOs (such as one or more of SEQ ID NOs: 7, 8, 9, 10, 14, 15, 17, 18 and 30-32, wherein in some examples such sequences are PMOs). In a specific example, the carrier is water or physiological saline.

In general, the nature of the carrier will depend on the particular mode of administration being employed. For instance, parenteral formulations usually comprise injectable fluids that include pharmaceutically and physiologically acceptable fluids such as water, physiological saline, balanced salt solutions, aqueous dextrose, glycerol or the like as a vehicle. For solid compositions (e.g., powder, pill, tablet, or capsule forms), conventional non-toxic solid carriers can include, for example, pharmaceutical grades of mannitol, lactose, starch, or magnesium stearate. In addition to biologically-neutral carriers, pharmaceutical compositions to be administered can contain minor amounts of non-toxic auxiliary substances, such as wetting or emulsifying agents, preservatives, and pH buffering agents and the like, for example sodium acetate or sorbitan monolaurate.

Promoter: An array of nucleic acid control sequences which direct transcription of a nucleic acid, such as an ASO. A promoter includes necessary nucleic acid sequences near the start site of transcription, such as, in the case of a polymerase II type promoter, a TATA element. A promoter also optionally includes distal enhancer or repressor elements which can be located as much as several thousand base pairs from the start site of transcription. Exemplary promoters include constitutive and activatable promoters.

Ras related in brain 13 (Rab13): (e.g., OMIM 602672) A member of the Rab family of small G proteins, which play important roles in vesicle-mediated membrane trafficking (Ioannou and McPherson, 2016, Pfeffer, 2017). It is amplified in the majority of cancers and its levels inversely correlate with prognosis (Ioannou and McPherson, 2016). Activation of Rab13 at the plasma membrane is required for cell migration and invasion (Ioannou et al., 2015). Rab13 can contribute to cell migration potentially through multiple mechanisms, including activity-dependent recycling of integrins or modulation of actin-binding proteins at the leading edge (Sahgal et al., 2019, Sakane et al., 2012, Sakane et al., 2013). The Rab13 RNA is prominently localized at protrusive regions of multiple cell types (Feltrin et al., 2012, Mili et al., 2008, Moissoglu et al., 2019). It belongs to a co-regulated group of RNAs whose localization at cell protrusions is promoted by APC and detyrosinated microtubules and depends on signals within the 3'UTR (Wang et al., 2017). The endogenous Rab13 transcript is translated in actively extending protrusions but is not silenced at internal locations. It is rather translated similarly in both perinuclear and peripheral regions (Moissoglu et al., 2019).

Rab13 sequences are publically available, for example from the GenBank® sequence database (e.g., Accession Nos. AAH73168.2, EDL15159.1, and EDM00580.1 provide exemplary Rab13 protein sequences, while Accession Nos. BC073168.1, BC027214.1, and NM_031092.1 provide exemplary Rab13 nucleic acid sequences). One of ordinary skill in the art can identify additional Rab13 nucleic acid and protein sequences, including Rab13 variants having Rab13 activity.

Recombinant: A recombinant nucleic acid molecule is one that has a sequence that is not naturally occurring (e.g., Rab13 PMOs and/or Net1 PMOs, such as one or more of SEQ ID NOs: 7, 8, 9, 10, 14, 15, 17, 18 and 30-32, wherein such sequences are PMOs) or has a sequence that is made by an artificial combination of two otherwise separated segments of sequence. This artificial combination can be accomplished by routine methods, such as chemical synthesis or by the artificial manipulation of isolated segments of nucleic acids, such as by genetic engineering techniques. Similarly, a recombinant protein is one encoded for by a recombinant nucleic acid molecule. Similarly, a recombinant or transgenic cell is one that contains a recombinant nucleic acid molecule or expresses a recombinant protein.

Sequence identity of amino acid sequences: The similarity between amino acid (or nucleotide) sequences is expressed in terms of the similarity between the sequences, otherwise referred to as sequence identity. Sequence identity is frequently measured in terms of percentage identity (or similarity or homology); the higher the percentage, the more similar the two sequences are. Homologs or variants of a polypeptide will possess a relatively high degree of sequence identity when aligned using standard methods.

Methods of alignment of sequences for comparison are known. Various programs and alignment algorithms are described in: Smith and Waterman, Adv. Appl. Math. 2:482, 1981; Needleman and Wunsch, J. Mol. Biol. 48:443, 1970; Pearson and Lipman, Proc. Natl. Acad. Sci. U.S.A. 85:2444, 1988; Higgins and Sharp, Gene 73:237, 1988; Higgins and Sharp, CABIOS 5:151, 1989; Corpet et al., Nucleic Acids Research 16:10881, 1988; and Pearson and Lipman, Proc. Natl. Acad. Sci. U.S.A. 85:2444, 1988. Altschul et al., Nature Genet. 6:119, 1994, presents a detailed consideration of sequence alignment methods and homology calculations.

The NCBI Basic Local Alignment Search Tool (BLAST) (Altschul et al., J. Mol. Biol. 215:403, 1990) is available from several sources, including the National Center for Biotechnology Information (NCBI, Bethesda, MD) and on the internet, for use in connection with the sequence analysis programs blastp, blastn, blastx, tblastn and tblastx. A description of how to determine sequence identity using this program is available on the NCBI website on the internet.

Variants of the disclosed ASOs (e.g., SEQ ID NOs: 7, 8, 9, 10, 14, 15, 17, 18 and 30-32) are typically characterized by possession of at least about 80%, at least 90%, at least 95%, at least 96%, at least 97%, at least 98% or at least 99% sequence identity counted over the full length alignment with the nucleic acid sequence using the NCBI Blast 2.0, gapped blastn set to default parameters. One of skill in the art will appreciate that these sequence identity ranges are provided for guidance only; it is possible that therapeutically effective ASOs could be obtained that fall outside of the ranges provided.

Subject: Any mammal, such as humans, non-human primates, pigs, sheep, cows, dogs, cats, rodents and the like which is to be the recipient of the particular treatment, such as treatment with one or more Rab13 ASOs and/or Net1 ASOs (such as one or more of SEQ ID NOs: 7, 8, 9, 10, 14, 15, 17, 18 and 30-32, wherein in some examples such sequences are PMOs). In two non-limiting examples, a subject is a human subject or a murine subject. In some examples, the subject has a metastatic cancer. In some examples, the subject has a metastatic cancer that was unresponsive to other treatments.

Therapeutically effective amount: The amount of agent, such as one or more Rab13 or Net1 ASOs provided herein (such as one or more of SEQ ID NOs: 7, 8, 9, 10, 14, 15, 17, 18 and 30-32, wherein in some examples such sequences are PMOs), alone or in combination with additional agents, sufficient to prevent, treat, reduce and/or ameliorate the symptoms and/or underlying causes of a disorder or disease, such as metastatic cancer. The symptoms of the metastatic cancer do not have to be completely eliminated for the composition to be effective. In one embodiment, an "effective amount" of a one or more Rab13 or Net1 ASOs provided herein (such as one or more of SEQ ID NOs: 7, 8, 9, 10, 14, 15, 17, 18 and 30-32, wherein in some examples such sequences are PMOs) is sufficient to reduce or eliminate a metastatic cancer, for example by reducing migration of a metastasis, for example by reducing migration speed, migration distance, protrusion velocity, and/or retraction velocity of a metastatic cancer. In one example, a therapeutically effective amount or concentration of one or more ASOs is one that is sufficient to increase the survival time of a patient with a metastatic cancer.

In one example, a therapeutically effective amount or concentration of one or more ASOs is an amount that reduces the migration speed of a metastatic cancer or metastatic cancer cell, for example a reduction of at least 10%, at least 20%, at least 30%, at least 40%, at least 50%, at least 60%, at least 70%, at least 80%, at least 85%, at least 90%, at least 95%, at least 98%, at least 99%, or 100%, as compound to a migration speed prior to the treatment. In one example, a therapeutically effective amount or concentration of one or more ASOs is an amount that reduces the migration distance of a metastatic cancer or metastatic cancer cell, for example a reduction of at least 10%, at least 20%, at least 30%, at least 40%, at least 50%, at least 60%, at least 70%, at least 80%, at least 85%, at least 90%, at least 95%, at least 98%, at least 99%, or 100%, as compound to a migration distance prior to the treatment. In one example, a therapeutically effective amount or concentration of one or more ASOs is an amount that reduces the protrusion velocity of a metastatic cancer or metastatic cancer cell, for example a reduction of at least 10%, at least 20%, at least 30%, at least 40%, at least 50%, at least 60%, at least 70%, at least 80%, at least 85%, at least 90%, at least 95%, at least 98%, at least 99%, or 100%, as compound to a protrusion velocity prior to the treatment. In one example, a therapeutically effective amount or concentration of one or more ASOs is an amount that reduces the retraction velocity of a metastatic cancer or metastatic cancer cell, for example a reduction of at least 10%, at least 20%, at least 30%, at least 40%, at least 50%, at least 60%, at least 70%, at least 80%, at least 85%, at least 90%, at least 95%, at least 98%, at least 99%, or 100%, as compound to a retraction velocity prior to the treatment. In one example, a therapeutically effective amount or concentration of one or more ASOs is an amount that decreases the size of a cancer metastasis (such as the volume or weight of a metastasis, or number of metastases at a site distant from the primary tumor or cancer), for example by at least 20%, at least 50%, at least 80%, at least 90%, at least 95%, at least 98%, or even at least 100%, as compared to the size of a cancer metastasis (such as the volume or weight of a metastasis, or number of metastases at a site distant from the primary tumor or cancer) in the absence of the treatment. In one example, a therapeutically effective amount or concentration of one or more ASOs is an amount that kills metastatic cancer cells, for example by killing at least 20%, at least 50%, at least 60%, at least 70%, at least 80%, at least 90%, at least 95%, at least 98%, or even at least 100% of the metastatic cancer cells, as compared to an amount of metastatic cancer cell killing in the absence of the therapy. In one example, a therapeutically effective amount or concentration of one or more ASOs is an amount that increases the survival time of a patient with a metastatic cancer (or who has had a tumor recently removed), for example increasing survival by at least 20%, at least 50%, at least 60%, at least 70%, at least 80%, at least 90%, at least 95%, at least 98%, at least 100%, at least 200%, at least 400%, or at least 500% as compared to the survival time in the therapy. In one example, the survival time of the patient with metastatic cancer is increased by at least 3 months, at least 4 months, at least 6 months, at least 8 months, at least 12 months, at least 24 months, at least 36 months, or at least 48 months, relative to patients with the same type of metastatic cancer who did not receive treatment with one or more Rab13 and/or Net1 ASOs provided herein. In some examples, combinations of these affects are achieved.

Transduced and Transformed: A virus or vector "transduces" a cell when it transfers nucleic acid into the cell. A cell is "transformed" or "transfected" when a nucleic acid (e.g., ASO) is introduced into the cell. Numerous methods of can be used to introduce a nucleic acid molecule into a cell, such as: gymnotic (naked) uptake without lipid, chemical methods (e.g., calcium-phosphate transfection), physical methods (e.g., electroporation, microinjection, particle bombardment), fusion (e.g., liposomes), receptor-mediated endocytosis (e.g., DNA-protein complexes, viral envelope/capsid-DNA complexes) and by biological infection by viruses such as recombinant viruses (e.g., lentivirus, AAV) (Wolff, J. A., ed, Gene Therapeutics, Birkhauser, Boston, USA, 1994).

Transgene: An exogenous gene supplied by a vector. In one example, a transgene includes one or more Rab13 ASOs and/or Net1 ASOs (such as one or more of SEQ ID NOs: 7, 8, 9, 10, 14, 15, 17, 18 and 30-32, wherein in some examples such sequences are PMOs).

Treating: A term when used to refer to the treatment of a metastatic cancer cell or subject with a metastatic cancer with one or more Rab13 ASOs and/or Net1 ASOs, includes contacting or incubating one or more Rab13 ASOs and/or Net1 ASOs with the cell or subject. A treated metastatic cancer cell is a metastatic cancer cell that has been contacted with the ASO(s) in an amount and under conditions sufficient for decreased metastatic cancer cell migration or increased metastatic cancer cell killing.

Tumor, neoplasia, malignancy or cancer: A neoplasm is an abnormal growth of tissue or cells which results from excessive cell division. Neoplastic growth can produce a tumor. The amount of a tumor in an individual is the "tumor burden" which can be measured as the number, volume, or weight of the tumor. A tumor that invades the surrounding tissue and/or can metastasize to a location distant from the original/primary tumor is referred to as "malignant." A "non-cancerous tissue" is a tissue from the same organ wherein the malignant neoplasm formed, but does not have the characteristic pathology of the neoplasm. Generally, noncancerous tissue appears histologically normal. A "normal tissue" is tissue from an organ, wherein the organ is not affected by cancer or another disease or disorder of that organ. A "cancer-free" subject has not been diagnosed with a cancer of that organ and does not have detectable cancer.

Exemplary tumors, such as cancers, whose metastases can be treated with the disclosed methods include metastatic solid tumors, such as breast carcinomas (e.g. lobular and duct carcinomas), sarcomas, carcinomas of the lung (e.g., non-small cell carcinoma, large cell carcinoma, squamous carcinoma, and adenocarcinoma), mesothelioma of the lung, colorectal adenocarcinoma, stomach carcinoma, prostatic adenocarcinoma, ovarian carcinoma (such as serous cystadenocarcinoma and mucinous cystadenocarcinoma), ovarian germ cell tumors, testicular carcinomas and germ cell tumors, pancreatic adenocarcinoma, biliary adenocarcinoma, hepatocellular carcinoma, bladder carcinoma (including, for instance, transitional cell carcinoma, adenocarcinoma, and squamous carcinoma), renal cell adenocarcinoma, endometrial carcinomas (including, e.g., adenocarcinomas and mixed Mullerian tumors (carcinosarcomas)), carcinomas of the endocervix, ectocervix, and vagina (such as adenocarcinoma and squamous carcinoma of each of same), tumors of the skin (e.g., squamous cell carcinoma, basal cell carcinoma, malignant melanoma, skin appendage tumors, Kaposi sarcoma, cutaneous lymphoma, skin adnexal tumors and various types of sarcomas and Merkel cell carcinoma), esophageal carcinoma, carcinomas of the nasopharynx and oropharynx (including squamous carcinoma and adenocarcinomas of same), salivary gland carcinomas, brain and central nervous system tumors (including, for example, tumors of glial, neuronal, and meningeal origin), tumors of peripheral nerve, soft tissue sarcomas and sarcomas of bone and cartilage, head and neck cancers, and lymphatic tumors (including B-cell and T-cell malignant lymphoma). In one example, the metastatic cancer is an adenocarcinoma.

In one example, the metastatic cancer is a metastatic breast cancer, such as a Her2+ positive breast cancer, or a triple negative breast cancer, which has metastasized to a location outside of the breast, such as a lymph node, liver, lung, colon, and/or bone. In one example, the metastatic cancer is a metastatic skin squamous cell carcinoma which has metastasized to a location away from the skin, such as a lymph node, lung, liver, colon, and/or bone.

Exemplary tumors, such as cancers, whose metastases can be treated with the disclosed methods include metastatic liquid tumors, such as a lymphatic, white blood cell, or other type of leukemia. In a specific example, the tumor treated is a metastatic tumor of the blood, such as a leukemia (for example acute lymphoblastic leukemia (ALL), chronic lymphocytic leukemia (CLL), acute myelogenous leukemia (AML), chronic myelogenous leukemia (CML), hairy cell leukemia (HCL), T-cell prolymphocytic leukemia (T-PLL), large granular lymphocytic leukemia, and adult T-cell leukemia), lymphomas (such as Hodgkin's lymphoma and non-Hodgkin's lymphoma), and myelomas).

Under conditions sufficient for: A phrase that is used to describe any environment that permits the desired activity. In one example, "under conditions sufficient for" includes administering one or more Rab13 ASOs and/or Net1 ASOs (such as one or more of SEQ ID NOs: 7, 8, 9, 10, 14, 15, 17, 18 and 30-32, wherein in some examples such sequences are PMOs) to a subject sufficient to allow the RAb13 or Net1 ASO to reduce transcription of Rab13 or Net1, respectively. In particular examples, the desired activity is reducing migration of metastatic cancer cells, killing metastatic cancer cells, or both.

Vector: A nucleic acid molecule as introduced into a host cell, thereby producing a transformed host cell. A vector may include nucleic acid sequences that permit it to replicate in the host cell, such as an origin of replication. A vector may also include one or more Rab13 ASOs and/or Net1 ASOs (such as one or more of SEQ ID NOs: 7, 8, 9, 10, 14, 15, 17, 18 and 30-32, wherein in some examples such sequences are PMOs) and/or selectable marker genes and other genetic elements known in the art. A vector can transduce, transform or infect a cell, thereby causing the cell to express nucleic acids and/or proteins other than those native to the cell. A vector optionally includes materials to aid in achieving entry of the nucleic acid into the cell, such as a viral particle, liposome, protein coating or the like. Exemplary vectors include plasmids and viral vectors (such as lentiviral vectors and adeno-associated vectors).

Overview

Using Rab13 RNA as a model, it is shown herein that peripheral translation does not simply lead to a corresponding local protein accumulation. Using an approach to specifically interfere with peripheral Rab13 RNA localization without affecting its stability or translation, it was observed that the location of translation critically affects some, but not all properties of the encoded Rab13 protein. Specifically, the location of translation does not affect the steady-state Rab13 protein distribution, its membrane association or interaction with Rab regulators such as REP-1 and RabGDI. However, translation at the periphery is required for full Rab13 activation. Preventing peripheral translation compromises the ability of Rab13 to support cell migration to an extent similar to that observed upon almost complete loss of the protein. This identifies the subcellular location of Rab13 RNA translation as a critical factor determining the functionality and properties of the encoded protein.

The process of translation can affect the encoded proteins through various mechanisms. For instance, the translation machinery itself provides a platform for the recruitment of maturation factors that guide nascent polypeptide chains into functional protein structures (Gloge et al., 2014). Furthermore, subunits of hetero-oligomeric complexes come into contact and begin assembling co-translationally (Shiber et al., 2018). Such co-translational interactions can determine the efficiency of functional complex formation (Shieh et al., 2015). Additionally, the untranslated regions (UTRs) of the RNA template can impact the fate of the newly synthesized proteins through acting as scaffolds to recruit protein complexes that affect the targeting or modification of the nascent or newly-synthesized polypeptides (Basu et al., 2011, Berkovits and Mayr, 2015). In this way, use of alternative UTRs can direct formation of different protein complexes that support distinct downstream protein functions (Berkovits and Mayr, 2015, Lee and Mayr, 2019). The results herein demonstrate that another factor that can have a determining impact on downstream protein activity is the subcellular microenvironment into which a protein is being synthesized.

The data herein indicate that the majority of Rab13 that is translated at peripheral protrusions does not remain at the vicinity of the translation site but assumes a mostly perinuclear steady-state distribution. This contrasts with observations of other localized RNAs whose translation leads to a corresponding local increase in protein concentration. At least in some of these latter cases translational silencing during transport is thought to reinforce the formation of protein gradients at the site of localization and eventual translation. For instance, Ash1 RNA localizes in the emerging yeast bud and directs local accumulation of Ash1p specifically in the daughter cell (Paquin and Chartrand, 2008). RNAs localized in neuronal dendrites or axons become locally translated upon receiving specific stimuli and result in corresponding protein concentration increases around the site of translation (Holt et al., 2019, Rangaraju et al., 2017). A common underlying feature of these cases is that premature or ectopic translation would have deleterious consequences, such as disruption of cell type identity in yeast, or incorrect axonal pathfinding or synaptic marking in neuronal cells. Based on the data herein, it is believed that such examples of localized transcripts for the most part pertain to RNAs which are localized in rather stably polarized structures, whose identity remains fixed even though specific signals might elicit transient responses.

Protrusions of migrating cells, even though they exhibit clear functional polarization, are distinct from the above situations in that they are very dynamic with their identity potentially changing within a time scale of minutes. Indeed, protrusions of fast migrating cells constantly switch between extension and retraction phases as they explore the surrounding environment (Ryan et al., 2012). Directional migration requires that cells are able to quickly repolarize and redefine their leading and retracting areas to follow the direction of an asymmetric extracellular cue (Petrie et al., 2009). Given that such dynamic changes can occur within minutes, which is the same range as the time required for translation of an average size protein, it seems unlikely that the use of local translation as a means of building dynamic local concentration gradients would be an efficient process. In light of the data presented here, it is proposed that in dynamically changing protrusions, local translation serves to expose newly synthesized proteins to the local environment and thus impart on them particular properties that might persist even after they have diffused or trafficked away from their site of synthesis. Given that global studies have shown little correlation between RNAs localized at cell protrusions and steady-state concentration of the corresponding proteins (Mardakheh et al., 2015), it would appear that this mode of regulation might be relevant for the majority of protrusion-localized RNAs.

In the case of Rab13, it is shown that peripheral translation is required for full activation of the protein and cell migration. Mislocalization of Rab13 RNA phenocopies complete loss of protein expression with regards to cell migration. However, upon mislocalization a substantial amount of GTP-loaded, membrane-bound Rab13 can still be detected. This indicates that pools of Rab13 protein, that are not produced peripherally, can be activated and likely contribute to different cellular functions, perhaps by interacting with different effectors. Indeed, Rab13 participates in diverse trafficking events including the recycling of integrins (Ioannou et al., 2015, Nishikimi et al., 2014, Sahgal et al., 2019, Wu et al., 2011) or of factors involved in cell-cell contacts (Kohler et al., 2004, Marzesco et al., 2002, Morimoto et al., 2005, Terai et al., 2006).

The data herein indicate that peripheral translation of Rab13 synergizes with a peripheral GEF and/or effectors to specifically support Rab13 activation that drives cell migration. Two exchange factors of Rab13, DENND2B and DENND1C, control leading edge functions in epithelial cells and lymphocytes, respectively (Ioannou et al., 2015, Nishikimi et al., 2014). DENND2B is enriched at the cell periphery where it colocalizes with actin structures and activates Rab13 at the leading edge of migrating cells (Ioannou et al., 2015); however, endogenous DENND2B in has not been detected in MDA-MB-231 cells, likely due to its low levels of expression. While Rab13 RNA localization affects the activity of the encoded protein, changes in the distribution of the protein at steady state are not observed, either by immunofluorescence or fractionation experiments, indicating that while the activation step is coupled to translation it is not rate limiting for membrane targeting. Alternatively, peripheral translation might target the protein at sub-micron membrane environments that are below the resolution threshold that our assays reach.

Overall, the data herein highlight a role for local translation in directing Rab GTPase activation and indicate that the micro-environment into which a protein is synthesized can affect its properties and downstream function. Similar results were obtained using Net1 ASOs. Based on these observations, provided herein are Rab13 and Net1 antisense oligonucleotides (ASOs), which are specific for a GA-rich motif having consensus sequence RGAAGRR (where R is a purine) or an adjacent GA-rich region. In some examples, a Rab13 ASO, comprises or consists of the sequence of any one of SEQ ID NOs: 7, 8, 14, 15, 17 and 18. In some examples, a Net1 ASO comprises or consists of any one of SEQ ID NOs: 9, 10, 30, 31 and 32. The ASOs provided herein can include one or more chemical modifications, such as at least one phosphorothioate, at least one 2'-fluoro, at least one 2'-O-methyl, at least one 2'-O-methoxy-ethyl, at least one morpholino, at least one 2',4'-constrained ethyl nucleic acid, and/or at least one locked nucleic acid (LNA). In some examples, the ASOs provided herein are isolated.

The disclosed Rab13 and Net1 ASOs can be covalently or non-covalently attached to other molecules, such as a detectable label, for example a fluorophore or radioactive molecule. In some examples, a disclosed Rab13 or Net1 ASO is covalently attached to (or encapsulated within) a nanoparticle, such as a polymeric nanoparticle, nanosphere, nanocapsule, liposome, dendrimer, polymeric micelle, or niosome.

Also provided are cells, such as a bacterial cell, yeast cell, insect cell, or mammalian cell, which includes one or more of the disclosed Rab13 and Net1 ASOs. In some examples, the cell is a mammalian metastatic cancer cell, such as a human metastatic cancer cell. Also provided are vectors, such as a viral vector (e.g., adenovirus, lentivirus, or AAV) or plasmid, which includes one or more of the disclosed Rab13 and Net1 ASOs.

Also provided are compositions that include one or more Rab13 and/or Net1 ASOs (or vectors or cells containing such), and a pharmaceutically acceptable carrier (such as water or saline). In one example a composition includes 1, 2, 3, 4, 5, 6, 7, 8, 9, 10 or 11 of the ASOs of SEQ ID NOs: 7, 8, 9, 10, 14, 15, 17, 18 and 30-32 (such as a PMO) and a pharmaceutically acceptable carrier. Such compositions can be present in a vial, such as a glass, metal, or plastic container. In some examples such compositions are lyophilized or frozen. In one example the composition includes two or more Net1 ASOs (or vectors or cells containing such), such as SEQ ID NOs: 9 and 10, and a pharmaceutically acceptable carrier (such as water or saline). In one example the composition includes two or more Rab13 ASOs (or vectors or cells containing such), such as SEQ ID NOs: 7 and 8, and a pharmaceutically acceptable carrier (such as water or saline).

In one example a composition includes two or more Net1 ASOs (or vectors or cells containing such), such as a mixture of SEQ ID NOs: 9 and 10. In one example a composition includes two or more Rab13 ASOs (or vectors or cells containing such), such as a mixture of SEQ ID NOs: 7 and 8.

Methods of treating a metastatic tumor using one or more Rab13 and/or Net1 ASOs provided herein are disclosed. In one example, such a method includes administering a therapeutically effective amount of one or more of the Rab13 and/or Net1 ASOs provided herein (such as a composition including such), such as 1, 2, 3, 4, 5, 6, 7, 8, 9, 10 or 11 of the ASOs of SEQ ID NOs: 7, 8, 9, 10, 14, 15, 17, 18 and 30-32, to a subject with the metastatic tumor, thereby treating the metastatic tumor. In one example, such a method includes administering a therapeutically effective amount of two or more of the Rab13 ASOs provided herein (such as a composition including such), such as 1, 2, 3, 4, 5, or 6, of the ASOs of SEQ ID NOs: 7, 8, 14, 15, 17, and 18, to a subject with the metastatic tumor, thereby treating the metastatic tumor. In one example, such a method includes administering a therapeutically effective amount of at least two of the Rab13 ASOs provided herein (such as a composition including such), such as at least SEQ ID Nos: 7 and 8, to a subject with the metastatic tumor, thereby treating the metastatic tumor. In one example, such a method includes administering a therapeutically effective amount of two or more of the Net1 ASOs provided herein (such as a composition including such), such as 1, 2, 3, 4, or 5 of the ASOs of SEQ ID NOs: 9, 10, 30, 31, and 32, to a subject with the metastatic tumor, thereby treating the metastatic tumor. In one example, such a method includes administering a therapeutically effective amount of at least two of the Rab13 ASOs provided herein (such as a composition including such), such as at least SEQ ID Nos: 9 and 10, to a subject with the metastatic tumor, thereby treating the metastatic tumor. Such a method can be used to reduce a number of metastases of the metastatic tumor, reduce the size of a metastasis, reduce the volume of a metastasis, or combinations thereof. In some examples, the administration is intratumoral, for example into a metastasis.

Also provided are methods of reducing migration of a cell, such as a metastatic tumor cell. In one example, such a method includes contacting a cell with a therapeutically effective amount of one or more of the Rab13 and/or Net1 ASOs provided herein (such as a composition including such), such as 1, 2, 3, 4, 5, 6, 7, 8, 9, 10 or 11 of the ASOs of SEQ ID NOs: 7, 8, 9, 10, 14, 15, 17, 18 and 30-32, thereby reducing migration of the cell. In some examples, the contacting includes administration to a subject where the cell is located (e.g., in vivo method). In some example the contacting occurs ex vivo. In some examples, such a method reduces a migration speed of the cell, protrusion velocity of the cell, retraction velocity of the cell, or combinations thereof.

Exemplary metastatic tumors or cancers that can be treated using the disclosed methods, or whose migration can be reduced, include a metastatic tumor or tumor cell of the breast, lung, colon, pancreas, ovary, uterus, cervix, skin, prostate, bone, central nervous system, kidney, or head and neck.

The disclosed methods can be used in combination with additional anti-cancer therapies. For example, the disclosed methods can further include administering a therapeutically effective amount of one or more additional anti-cancer agents to the subject (or contacting with the metastatic cancer cell), such as a chemotherapeutic, radiation therapy, and/or a biologic.

Rab13 and Net1 Antisense Oligonucleotides

Described herein are ASOs specific for a Rab13 3'-UTR or a Net1 3'-UTR, such as specific for a GA-rich motif having consensus sequence RGAAGRR (where R is a purine) or an adjacent GA-rich region. Such ASOs reduce or inhibit the invasiveness of cancer cells and can be used as a treatment for metastatic cancers.

Provided herein are ASOs that bind to a Rab13 3'-UTR, specifically at a GA-rich motif having consensus sequence RGAAGRR, or in some examples an adjacent GA-rich region. In some examples, a Rab13 ASO is specific for a mouse Rab13 3'-UTR at consensus sequence RGAAGRR, such as a sequence comprising or consisting of SEQ ID NO: 1, 2, 3, 4 or 5. Also provided herein are mouse Rab13 ASOs having at least 90%, at least 95%, at least 96%, at least 97%, at least 98% or at least 99% sequence identity to SEQ ID NO: 1, SEQ ID NO: 2, SEQ ID NO: 3, SEQ ID NO: 4, or SEQ ID NO: 5.

In some examples, a Rab13 ASO is specific for a human Rab13 3'-UTR, such as a sequence comprising or consisting of SEQ ID NO: 7, 8, 14, 15, 17 or 18. Also provided herein are human Rab13 ASOs having at least 90%, at least 95%, at least 96%, at least 97%, at least 98% or at least 99% sequence identity to SEQ ID NO: 7, SEQ ID NO: 8, SEQ ID NO: 14, SEQ ID NO: 15, SEQ ID NO: 17, or SEQ ID NO: 18. In some embodiments, a human Rab13 ASO comprises or consists of SEQ ID NO: 7, SEQ ID NO: 8, SEQ ID NO: 14, SEQ ID NO: 15, SEQ ID NO: 17, or SEQ ID NO: 18.

In some examples, a Rab13 ASO is no more than 28, no more than 27, no more than 26, no more than 25, no more than 24, or no more than 23 nucleotides in length and having at least 90%, at least 95, or 100% sequence identity with SEQ ID NO: 7. In some examples, a Rab13 ASO is no more than 28, no more than 27, no more than 26, no more than 25, no more than 24, or no more than 23 nucleotides in length and having at least 90%, at least 95, or 100% sequence identity with SEQ ID NO: 8. In some examples, a Rab13 ASO is no more than 28, no more than 27, no more than 26, no more than 25, no more than 24, or no more than 23 nucleotides in length and having at least 90%, at least 95, or 100% sequence identity with SEQ ID NO: 14. In some examples, a Rab13 ASO is no more than 28, no more than 27, no more than 26, no more than 25, no more than 24, or no more than 23 nucleotides in length and having at least 90%, at least 95, or 100% sequence identity with SEQ ID NO: 15. In some examples, a Rab13 ASO is no more than 30, no more than 29, no more than 28, no more than 27, no more than 26, or no more than 25 nucleotides in length and having at least 90%, at least 95, or 100% sequence identity with SEQ ID NO: 17. In some examples, a Rab13 ASO is no more than 28, no more than 27, no more than 26, no more than 25, no more than 24, or no more than 23 nucleotides in length and having at least 90%, at least 95, or 100% sequence identity with SEQ ID NO: 18.

Provided herein are ASOs that bind to a Net1 3'-UTR, specifically at a GA-rich motif having consensus sequence RGAAGRR (where R is a purine) or an adjacent GA-rich region. In some examples, a Net1 ASO is specific for a human Net1 3'-UTR, such as a sequence comprising or consisting of SEQ ID NO: 9, 10, 30, 31 or 2. Also provided herein are human Net1 ASOs having at least 90%, at least 95%, at least 96%, at least 97%, at least 98% or at least 99% sequence identity to SEQ ID NO: 9, SEQ ID NO: 10, SEQ ID NO: 30, SEQ ID NO: 31 or SEQ ID NO: 32. In some embodiments, a human Net1 ASO comprises or consists of SEQ ID NO: 9, SEQ ID NO: 10, SEQ ID NO: 30, SEQ ID NO: 31 or SEQ ID NO: 32.

In some examples, a Net1 ASO is no more than 28, no more than 27, no more than 26, no more than 25, no more than 24, or no more than 23 nucleotides in length and having at least 90%, at least 95, or 100% sequence identity with SEQ ID NO: 9. In some examples, a Net1 ASO is no more than 28, no more than 27, no more than 26, no more than 25, no more than 24, or no more than 23 nucleotides in length and having at least 90%, at least 95, or 100% sequence identity with SEQ ID NO: 10. In some examples, a Net1 ASO is no more than 28, no more than 27, no more than 26, no more than 25, no more than 24, or no more than 23 nucleotides in length and having at least 90%, at least 95, or 100% sequence identity with SEQ ID NO: 30. In some examples, a Net1 ASO is no more than 28, no more than 27, no more than 26, no more than 25, no more than 24, or no more than 23 nucleotides in length and having at least 90%, at least 95, or 100% sequence identity with SEQ ID NO: 31. In some examples, a Net1 ASO is no more than 28, no more than 27, no more than 26, no more than 25, no more than 24, or no more than 23 nucleotides in length and having at least 90%, at least 95, or 100% sequence identity with SEQ ID NO: 32.

In some embodiments, a disclosed Rab13 ASO and/or Net1 ASO includes a label that permits its detection. For example, such an ASO can be covalently attached to a fluorophore, radioisotope, radionucleotide, or enzyme.

ASO-Containing Kits and Compositions

Provided herein are compositions that include a pharmaceutically acceptable carrier and at least one Rab13 and/or at least one Net1 ASO, as well as kits that include at least one Rab13 and/or at least one Net1 ASO. The ASOs in the compositions and kits can be modified as described herein, such as those having modified backbones (such as those having non-natural internucleoside linkages), modified sugar moieties or modified bases (e.g., PMOs). The ASOs in the compositions and kits can also be part of a nanoparticle as provided herein.

Provided herein are compositions that include a pharmaceutically acceptable carrier and at least one Rab13 and/or at least one Net1 ASO, such as an ASO having at least 90%, at least 95%, at least 96%, at least 97%, at least 98%, at least 99%, or 100% sequence identity to SEQ ID NO: 7; an ASO having at least 90%, at least 95%, at least 96%, at least 97%, at least 98%, at least 99%, or 100% sequence identity to SEQ ID NO: 8; an ASO having at least 90%, at least 95%, at least 96%, at least 97%, at least 98%, at least 99%, or 100% sequence identity to SEQ ID NO: 9; an ASO having at least 90%, at least 95%, at least 96%, at least 97%, at least 98%, at least 99%, or 100% sequence identity to SEQ ID NO: 10; an ASO having at least 90%, at least 95%, at least 96%, at least 97%, at least 98%, at least 99%, or 100% sequence identity with SEQ ID NO: 14; an ASO having at least 90%, at least 95%, at least 96%, at least 97%, at least 98%, at least 99%, or 100% sequence identity to SEQ ID NO: 15; an ASO having at least 90%, at least 95%, at least 96%, at least 97%, at least 98%, at least 99%, or 100% sequence identity to SEQ ID NO: 17; an ASO having at least 90%, at least 95%, at least 96%, at least 97%, at least 98%, at least 99%, or 100% sequence identity to SEQ ID NO: 18; an ASO having at least 90%, at least 95%, at least 96%, at least 97%, at least 98%, at least 99%, or 100% sequence identity to SEQ ID NO: 30; an ASO having at least 90%, at least 95%, at least 96%, at least 97%, at least 98%, at least 99%, or 100% sequence identity to SEQ ID NO: 31; or an ASO having at least 90%, at least 95%, at least 96%, at least 97%, at least 98%, at least 99%, or 100% sequence identity to SEQ ID NO: 32.

In particular examples, the composition includes at least one Rab13 ASO selected from SEQ ID NO: 7, SEQ ID NO: 8, SEQ ID NO: 14, SEQ ID NO: 15, SEQ ID NO: 17, and SEQ ID NO: 18, such as 1, 2, 3, 4, 5 or all 6 of these ASOs. In particular examples, the composition includes at least one Rab13 ASO selected from SEQ ID NO: 7 and SEQ ID NO: 8, such as 1 or 2 of these ASOs. In particular examples, the composition includes at least one Net1 ASO selected from SEQ ID NO: 9 and SEQ ID NO: 10, such as 1 or both of these ASOs. In particular examples, the composition includes at least one Rab13 ASO selected from SEQ ID NO: 7 and SEQ ID NO: 8, and at least one Net1 ASO selected from SEQ ID NO: 9 and SEQ ID NO: 10.

In some embodiments, a disclosed Rab13 ASO and/or Net1 ASO is formulated for oral, inhalation, ocular, or parenteral administration.

Controlled release parenteral formulations containing at least one Rab13 and/or at least one Net1 ASO can be made as implants, oily injections, or as particulate systems. Particulate systems include, for example, microspheres, microparticles, microcapsules, nanocapsules, nanospheres, and nanoparticles. Microcapsules contain at least one Rab13 and/or at least one Net1 ASO as a central core. In microspheres the at least one Rab13 and/or at least one Net1 ASO is dispersed throughout the particle. Particles, microspheres, and microcapsules smaller than about 1 µm are generally referred to as nanoparticles, nanospheres, and nanocapsules, respectively. Capillaries have a diameter of approximately 5 µm so that only nanoparticles are administered intravenously. Microparticles are typically around 100 µm in diameter and are administered subcutaneously or intramuscularly. See, for example, Kreuter, J., *Colloidal Drug Delivery Systems*, J. Kreuter, ed., Marcel Dekker, Inc., New York, N.Y., pp. 219-342 (1994); and Tice & Tabibi, *Treatise on Controlled Drug Delivery*, A. Kydonieus, ed., Marcel Dekker, Inc. New York, NY, pp. 315-339, (1992).

Polymers can be used for ion-controlled release of the at least one Rab13 and/or at least one Net1 ASO disclosed herein. Various degradable and nondegradable polymeric matrices for use in controlled drug delivery are known (Langer, *Accounts Chem. Res.* 26:537-542, 1993). For example, the block copolymer, polaxamer 407, exists as a viscous yet mobile liquid at low temperatures but forms a semisolid gel at body temperature (Johnston et al., *Pharm. Res.* 9:425-434, 1992; and Pec et al., *J. Parent. Sci. Tech.* 44(2):58-65, 1990). Hydroxyapatite can be been used as a microcarrier for controlled release of at least one Rab13 and/or at least one Net1 ASO. In yet another aspect, liposomes are used for controlled release as well as drug targeting of the lipid-capsulated at least one Rab13 and/or at least one Net1 ASO (Betageri et al., *Liposome Drug Delivery Systems*, Technomic Publishing Co., Inc., Lancaster, Pa. (1993)). Numerous additional systems for controlled delivery of therapeutics are known (see U.S. Pat. Nos. 5,055,303; 5,188,837; 4,235,871; 4,501,728; 4,837,028; 4,957,735; 5,019,369; 5,055,303; 5,514,670; 5,413,797; 5,268,164; 5,004,697; 4,902,505; 5,506,206; 5,271,961; 5,254,342 and 5,534,496).

Also provided herein are kits that include at least one Rab13 and/or at least one Net1 ASO, such as an ASO having at least 90%, at least 95%, at least 96%, at least 97%, at least 98%, at least 99%, or 100% sequence identity to SEQ ID NO: 7; an ASO having at least 90%, at least 95%, at least 96%, at least 97%, at least 98%, at least 99%, or 100% sequence identity to SEQ ID NO: 8; an ASO having at least 90%, at least 95%, at least 96%, at least 97%, at least 98% or at least 99% sequence identity to SEQ ID NO: 9; an ASO having at least 90%, at least 95%, at least 96%, at least 97%, at least 98%, at least 99%, or 100% sequence identity to SEQ ID NO: 10; an ASO having at least 90%, at least 95%, at least 96%, at least 97%, at least 98% or at least 99% sequence identity with SEQ ID NO: 14; an ASO having at least 90%, at least 95%, at least 96%, at least 97%, at least 98%, at least 99%, or 100% sequence identity to SEQ ID NO: 15; an ASO having at least 90%, at least 95%, at least 96%, at least 97%, at least 98%, at least 99%, or 100% sequence identity to SEQ ID NO: 17; an ASO having at least 90%, at least 95%, at least 96%, at least 97%, at least 98%, at least 99%, or 100% sequence identity to SEQ ID NO: 18; or an ASO having at least 90%, at least 95%, at least 96%, at least 97%, at least 98%, at least 99%, or 100% sequence identity to SEQ ID NO: 30; or an ASO having at least 90%, at least 95%, at least 96%, at least 97%, at least 98%, at least 99%, or 100% sequence identity to SEQ ID NO: 31; and/or or an ASO having at least 90%, at least 95%, at least 96%, at least 97%, at least 98%, at least 99%, or 100% sequence identity to SEQ ID NO: 32. In one example, the kit includes at least two Rab13 ASOs, wherein one ASO has at least 90%, at least 95%, at least 96%, at least 97%, at least 98%, at least 99%, or 100% sequence identity to SEQ ID NO: 7; and a second ASO has at least 90%, at least 95%, at least 96%, at least 97%, at least 98%, at least 99%, or 100% sequence identity to SEQ ID NO: 8.

In particular examples, the kit includes at least one Rab13 ASO selected from SEQ ID NO: 7, SEQ ID NO: 8, SEQ ID NO: 14, SEQ ID NO: 15, SEQ ID NO: 17, and SEQ ID NO: 18, such as 1, 2, 3, 4, 5, or all 6 of these ASOs. In particular examples, the kit includes at least one Rab13 ASO selected from SEQ ID NO: 7 and SEQ ID NO: 8, such as 1 or 2 of these ASOs. In particular examples, the kit includes at least one Net1 ASO selected from SEQ ID NO: 9, SEQ ID NO: 10, SEQ ID NO: 30, SEQ ID NO: 31 and SEQ ID NO: 32, such as 1, 2, 3, 4 or all five of these ASOs. In particular examples, the kit includes at least one Rab13 ASO selected from SEQ ID NO: 7 and SEQ ID NO: 8, and at least one Net1 ASO selected from SEQ ID NO: 9 and SEQ ID NO: 10. Kits containing mixtures of ASOs can have each ASO in separate containers. In some examples such a kit further includes an additional anti-cancer agent, such as one or more chemotherapeutic agents and/or biologicals (e.g., mAbs).

Exemplary ASO Modifications

In some embodiments, the Rab13 ASO and/or Net1 ASOs described herein (such as one or more of SEQ ID NOs: 7, 8, 9, 10, 14, 15, 17, 18 and 30-32) contain one or more modifications to enhance nuclease resistance and/or to increase binding affinity of the ASO to its target RNA. Modified ASOs include those having modified backbones (such as those having non-natural internucleoside linkages), modified sugar moieties or modified bases.

In some embodiments herein, an ASO includes at least one chemical modification that increases its resistance to nucleases. In specific examples, the ASO includes as least one of the following modifications: phosphorothioate, 2'-fluoro, 2'-O-methyl, 2'-O-allyl, 2'-O-propyl, 2'-O-pentyl, 2'-O-alkyl, 2'-O-aminopropyl, 2'-O-methoxy-ethyl (MOE), morpholino, phosphoramidite, α-nucleoside, methylphosphonate, LNA, S-constrained-ethyl (cEt), triyclo-DNA (tc-DNA) or peptide nucleic acid (PNA) (see Evers et al., *Adv Drug Deliv Rev* 87:90-103, 2015 for a review of chemical modifications for therapeutic ASOs).

In some embodiments herein, an ASO includes at least one chemical modification that increases its affinity for target RNA. In specific examples, the ASO includes at least one of the following modifications: phosphoramidate, LNA, 2'-O-methyl, 2'-MOE, 2'-fluoro, cEt, tc-DNA, morpholino or PNA. In a specific example, one or more of SEQ ID NOs: 7, 8, 9, 10, 14, 15, 17, 18 and 30-32, are PMOs.

ASOs having modified backbones include those that retain a phosphorus atom in the backbone and those that do not have a phosphorus atom in the backbone. Examples of modified oligonucleotide backbones that can be used include, but are not limited to, phosphorothioates, chiral phosphorothioates, phosphorodithioates, phosphotriesters, aminoalkylphosphotriesters, methyl and other alkyl phosphonates including 3'-alkylene phosphonates and chiral phosphonates, phosphinates, phosphoramidates including 3'-amino phosphoramidate and aminoalkylphosphoramidates, thionophosphoramidates, thionoalkyl-phosphonates, thionoalkylphosphotriesters, and boranophosphates having normal 3'-5' linkages, 2'-5' linked analogs of these, and those having inverted polarity wherein the adjacent pairs of the nucleoside units are linked 3'-5' to 5'-3' or 2'-5' to 5'-2'. Representative U.S. patents that teach the preparation of the above phosphorus-containing linkages include, but are not limited to, U.S. Pat. Nos. 3,687,808; 4,469,863; 4,476,301; 5,023,243; 5,177,196; 5,188,897; 5,264,423; 5,276,019; 5,278,302; 5,286,717; 5,321,131; 5,399,676; 5,405,939; 5,453,496; 5,455,233; 5,466,677; 5,476,925; 5,519,126; 5,536,821; 5,541,306; 5,550,111; 5,563,253; 5,571,799; 5,587,361; and 5,625,050, each of which is herein incorporated by reference.

Examples of modified oligonucleotide backbones that do not include a phosphorus atom therein have backbones that are formed by short chain alkyl or cycloalkyl internucleoside linkages, mixed heteroatom and alkyl or cycloalkyl internucleoside linkages, or one or more short chain heteroatomic or heterocyclic internucleoside linkages. These include those having morpholino linkages (formed in part from the sugar portion of a nucleoside); siloxane backbones; sulfide, sulfoxide and sulfone backbones; formacetyl and thioformacetyl backbones; methylene formacetyl and thioformacetyl backbones; alkene containing backbones; sulfamate backbones; methyleneimino and methylenehydrazino backbones; sulfonate and sulfonamide backbones; amide backbones; and others having mixed N, O, S and $CH_2$ component parts. Representative U.S. patents that teach the preparation of the above oligonucleosides include, but are not limited to, U.S. Pat. Nos. 5,034,506; 5,166,315; 5,185,444; 5,214,134; 5,216,141; 5,235,033; 5,264,562; 5,264,564; 5,405,938; 5,434,257; 5,466,677; 5,470,967; 5,489,677; 5,541,307; 5,561,225; 5,596,086; 5,602,240; 5,610,289; 5,602,240; 5,608,046; 5,610,289; 5,618,704; 5,623,070; 5,663,312; 5,633,360; 5,677,437; and 5,677,439, each of which is herein incorporated by reference.

In some embodiments, both the sugar and the internucleoside linkage of the nucleotide units of the ASO are replaced with novel groups. One such modified compound is an oligonucleotide mimetic referred to as a peptide nucleic acid (PNA). In PNA compounds, the sugar-backbone of an oligonucleotide is replaced with an amide containing backbone, in particular an aminoethylglycine backbone. The bases are retained and are bound directly or indirectly to aza nitrogen atoms of the amide portion of the backbone. Representative U.S. patents that teach the preparation of PNA compounds include, but are not limited to, U.S. Pat. Nos. 5,539,082; 5,714,331; and 5,719,262, which are herein incorporated by reference. Further teaching of PNA compounds can be found in Nielsen et al. (Science 254, 1497-1500, 1991).

Modified ASOs can also contain one or more substituted sugar moieties. In some examples, the antisense oligonucleotides can include one of the following at the 2' position: OH; F; O-, S-, or N-alkyl; O-, S-, or N-alkenyl; O-, S- or N-alkynyl; or O-alkyl-O-alkyl, wherein the alkyl, alkenyl and alkynyl may be substituted or unsubstituted $C_1$ to $C_{10}$ alkyl or $C_2$ to $C_{10}$ alkenyl and alkynyl. In other embodiments, the ASOs include one of the following at the 2' position: $C_1$ to $C_{10}$ lower alkyl, substituted lower alkyl, alkaryl, aralkyl, O-alkaryl or O-aralkyl, SH, $SCH_3$, OCN, Cl, Br, CN, $CF_3$, $OCF_3$, $SOCH_3$, $SO_2CH_3$, $ONO_2$, $NO_2$, $N_3$, $NH_2$, heterocycloalkyl, heterocycloalkaryl, aminoalkylamino, polyalkylamino, substituted silyl, an RNA cleaving group, a reporter group, an intercalator, a group for improving the pharmacokinetic properties of an oligonucleotide, or a group for improving the pharmacodynamic properties of an oligonucleotide, and other substituents having similar properties. In one example, the modification includes 2'-methoxyethoxy (also known as 2'-β-(2-methoxyethyl) or 2'-MOE) (Martin et al., Helv Chim Acta 78, 486-504, 1995). In other examples, the modification includes 2'-dimethylaminooxyethoxy (also known as 2'-DMAOE) or 2'-dimethylaminoethoxyethoxy (also known in the art as 2'-β-dimethylaminoethoxyethyl or 2'-DMAEOE).

Similar modifications can also be made at other positions of the compound. ASOs can also have sugar mimetics such as cyclobutyl moieties in place of the pentofuranosyl sugar. Representative US patents that teach the preparation of modified sugar structures include, but are not limited to, U.S. Pat. Nos. 4,981,957; 5,118,800; 5,319,080; 5,359,044; 5,393,878; 5,446,137; 5,466,786; 5,514,785; 5,519,134; 5,567,811; 5,576,427; 5,591,722; 5,597,909; 5,610,300; 5,627,053; 5,639,873; 5,646,265; 5,658,873; 5,670,633; and 5,700,920, each of which is herein incorporated by reference.

The Rab13 ASO and/or Net1 ASOs described herein (such as one or more of SEQ ID NOs: 7, 8, 9, 10, 14, 15, 17, 18 and 30-32) can also include base modifications or substitutions. As used herein, "unmodified" or "natural" bases include the purine bases adenine (A) and guanine (G), and the pyrimidine bases thymine (T), cytosine (C) and uracil (U). Modified bases include other synthetic and natural bases, such as 5-methylcytosine (5-me-C), 5-hydroxymethyl cytosine, xanthine, hypoxanthine, 2-aminoadenine, 6-methyl and other alkyl derivatives of adenine and guanine, 2-propyl and other alkyl derivatives of adenine and guanine, 2-thiouracil, 2-thiothymine and 2-thiocytosine, 5-halouracil and cytosine, 5-propynyl uracil and cytosine, 6-azo uracil, cytosine and thymine, 5-uracil (pseudouracil), 4-thiouracil, 8-halo, 8-amino, 8-thiol, 8-thioalkyl, 8-hydroxyl and other 8-substituted adenines and guanines, 5-halo particularly 5-bromo, 5-trifluoromethyl and other 5-substituted uracils and cytosines, 7-methylguanine and 7-methyladenine, 8-azaguanine and 8-azaadenine, 7-deazaguanine and 7-deazaadenine and 3-deazaguanine and 3-deazaadenine. Further modified bases have been described (see, for example, U.S. Pat. No. 3,687,808, incorporated by reference; and Sanghvi, Y. S., Chapter 15, Antisense Research and Applications, pages 289-302, Crooke, S. T. and Lebleu, B., ed., CRC Press, 1993). Certain of these modified bases are useful for increasing the binding affinity of antisense oligonucleotides. These include 5-substituted pyrimidines, 6-azapyrimidines and N-2, N-6 and 0-6 substituted purines, including 2-aminopropyladenine, 5-propynyluracil and 5-propynylcytosine. 5-methylcytosine substitutions have been shown to increase nucleic acid duplex stability by 0.6-1.2° C. Representative U.S. patents that teach the preparation of modified bases include, but are not limited to, U.S. Pat. Nos. 4,845,205; 5,130,302; 5,134,066; 5,175,273; 5,367,066; 5,432,272; 5,457,187; 5,459,255; 5,484,908; 5,502,177; 5,525,711; 5,552,540; 5,587,469; 5,594,121; 5,596,091; 5,614,617; 5,681,941; and 5,750,692, each of which is herein incorporated by reference.

ASO-Nanoparticle Conjugates

The Rab13 and Net1 ASOs (such as PMOs) disclosed herein can be conjugated to (covalently or non-covalently) a variety of different types of nanoparticles to deliver the ASOs to a cell or subject, such as metastatic cancer cells in a subject. The ASOs can be encapsulated within the nanoparticle, or attached to the nanoparticle (e.g., directly or indirectly via a linker). In some examples, two different ASOs are attached to (or encapsulated within) a single nanoparticle, such as (1) two or more of SEQ ID NOs: 7, 8, 9, 10, 14, 15, 17, 18 and 30-32, (2) SEQ ID NO: 7 and 8, (3) SEQ ID NO: 9 and 10, or (4) one or more of SEQ ID NOs: 7, 8, 14, 15, 17 and 18 and one or more of SEQ ID NOs: 9, 10 and 30-32. The use of nanoparticles can also improve drug bioavailability and reduce the dose of a ASOs required to achieve a therapeutic effect. Hydrophobic molecules can be incorporated inside the core of a nanoparticle, while hydrophilic drugs can be carried within an aqueous core protected by a polymeric or lipid shell. Examples of nanoparticles that can be attached to a Rab13 or Net1 ASO include, but at not limited to, nanospheres, nanocapsules, liposomes, dendrimers, polymeric micelles, niosomes, and polymeric nanoparticles (Fay and Scott, *Immunotherapy* 3(3):381-394, 2011). In some examples, a nanoparticle is complexed with other proteins to promote fusion of lipid bilayers, such as coat proteins derived from the hemagglutinating virus of Japan (HVJ, a Sendai family virus).

In one example, the nanoparticle is a liposome. The liposomal component of an immunoliposome is typically a lipid vesicle of one or more concentric phospholipid bilayers. In some cases, the phospholipids are composed of a hydrophilic head group and two hydrophobic chains to enable encapsulation of both hydrophobic and hydrophilic drugs. Conventional liposomes are rapidly removed from the circulation via macrophages of the reticuloendothelial system (RES). To generate long-circulating liposomes, the composition, size and charge of the liposome can be modulated. The surface of the liposome may also be modified, such as with a glycolipid or sialic acid. For example, the inclusion of polyethylene glycol (PEG) significantly increases circulation half-life. Liposomes for use as drug delivery agents have been described (see, for example, Paszko and Senge, *Curr Med Chem* 19(31)5239-5277, 2012; Immordino et al., Int J Nanomedicine 1(3):297-315, 2006; U.S. Patent Application Publication Nos. 2011/0268655; 2010/00329981).

In one example, the nanoparticle is a noisome, non-ionic surfactant-based vesicles having a structure similar to liposomes. The membranes of niosomes are composed only of nonionic surfactants, such as polyglyceryl-alkyl ethers or N-palmitoylglucosamine Niosomes range from small, unilamellar to large, multilamellar particles. These nanoparticles are monodisperse, water-soluble, chemically stable, have low toxicity, are biodegradable and non-immunogenic, and increase bioavailability of encapsulated drugs.

In one example, the nanoparticle is a dendrimer, which includes a range of branched polymer complexes. These nanoparticles are water-soluble, biocompatible and are sufficiently non-immunogenic for human use. Generally, dendrimers consist of an initiator core, surrounded by a layer of a selected polymer that is grafted to the core, forming a branched macromolecular complex. Dendrimers are typically produced using polymers such as poly(amidoamine) or poly(L-lysine).

In one example, the nanoparticle is a polymeric micelles, which are composed of aggregates of amphiphilic co-polymers (consisting of both hydrophilic and hydrophobic monomer units) assembled into hydrophobic cores, surrounded by a corona of hydrophilic polymeric chains exposed to the aqueous environment. The polymers used to prepare polymeric micelles can be heterobifunctional copolymers composed of a hydrophilic block of PEG, poly(vinyl pyrrolidone) and hydrophobic poly(L-lactide) or poly(L- lysine) that forms the particle core. Cationic micelles have been developed to carry DNA or RNA molecules.

In one example, the nanoparticle is a polymeric nanoparticle, which includes both nanospheres and nanocapsules. Nanospheres consist of a solid matrix of polymer, while nanocapsules contain an aqueous core. The formulation selected typically depends on the solubility of the therapeutic agent to be carried/encapsulated; poorly water-soluble drugs are more readily encapsulated within a nanospheres, while water-soluble and labile drugs, such as DNA and proteins, are more readily encapsulated within nanocapsules. The polymers used to produce these nanoparticles include, for example, poly(acrylamide), poly(ester), poly(alkylcyanoacrylates), poly(lactic acid) (PLA), poly(glycolic acids) (PGA), and poly(D,L-lactic-co-glycolic acid) (PLGA).

Methods for Treating Metastases

The present disclosure provides methods for reducing the migration of metastatic cancer cells, such as cells distant or away from the primary cancer. The metastatic cancer cell is contacted with a therapeutically effective amount of one or more Rab13 ASOs and/or Net1 ASOs provided herein (such as one or more of SEQ ID NOs: 7, 8, 9, 10, 14, 15, 17, 18 and 30-32, wherein in some examples such sequences are PMOs) (for example in the presence of a pharmaceutically acceptable carrier, such as a pharmaceutically and physiologically acceptable fluid), under conditions that permit the ASO to specifically hybridize to it complementary target RNA (i.e., Rab13 or Net1 RNA). For example, the one or more Rab13 ASOs and/or Net1 ASOs provided herein (such as one or more of SEQ ID NOs: 7, 8, 9, 10, 14, 15, 17, 18 and 30-32, wherein in some examples such sequences are PMOs) can be present in a pharmaceutically effective carrier, such as water, physiological saline, balanced salt solutions (such as PBS/EDTA), aqueous dextrose, sesame oil, glycerol, ethanol, combinations thereof, or the like, as a vehicle. The carrier and composition can be sterile, and the formulation suits the mode of administration.

The disclosed methods can be used to treat a metastatic cancer, such as in vitro or in vivo. The disclosed methods can be used to treat fixed metastases in the body as well as metastatic tumors or cells in the circulation (e.g., leukemia cells, metastases, circulating tumor cells). In some examples, the metastatic cancer is a metastatic cancer of the breast, liver, colon, ovary, prostate, pancreas, brain, cervix, bone, skin, head and neck, lung, and blood. That is, the primary tumor can be one in the breast, liver, colon, ovary, prostate, pancreas, brain, cervix, bone, skin, head and neck, lung, and blood, and the metastasis treated distant from the primary tumor site. For example, if the primary tumor is in the colon, a metastasis can be outside of the colon, such as the liver, lung, and or bone. Specific exemplary metastatic cancers that can be treated with the disclosed methods are provided herein. In some examples, the method further includes monitoring the therapy, such as monitoring the size of one or more metastases, volume one or more metastases, number of metastases, survival time of the patient, or combinations thereof.

For example, administration of one or more Rab13 ASOs and/or Net1 ASOs provided herein (such as one or more of SEQ ID NOs: 7, 8, 9, 10, 14, 15, 17, 18 and 30-32, wherein in some examples such sequences are PMOs) to a subject having a metastatic tumor, reduces the migration of the metastatic cancer cells, kills the metastatic cancer cells, increases survival time of the patient, or combinations thereof, thereby treating the metastatic cancer. For example, the use of one or more Rab13 ASOs and/or Net1 ASOs provided herein can reduce the number of metastases, volume of a metastasis, the size of a metastasis, the weight of a metastases, or combinations thereof, by at least 20%, at least 25%, at least 30%, at least 40%, at least 50%, at least 75%, at least 80%, at least 85%, at least 90%, or at least 95%, relative to the absence of treatment. The use of antibody-IR700 molecules in combination with NIR light can in some examples slow the growth of a metastasis, decrease or slow metastasis of the tumor (for example by reducing the number of metastases or decreasing the weight, volume or size of a metastasis), or combinations thereof.

The disclosed methods can result in a decrease in the symptoms associated with a tumor and/or a metastatic tumor. For example, the disclosed methods can reduce metastatic tumor cell volume, weight, or size (or number of metastatic tumors), or combinations thereof, such as by at least 10%, for example by at least 20%, at least 40%, at least 50%, at least 80%, at least 85%, at least 90%, or more, relative to the absence of administration of one or more Rab13 ASOs and/or Net1 ASOs. In one example, administration of the disclosed one or more Rab13 ASOs and/or Net1 ASOs slows the growth of a metastasis, such as by at least 10%, for example by at least 20%, at least 40%, at least 50%, at least 80%, at least 85%, at least 90%, or more, relative to the absence of administration of one or more Rab13 ASOs and/or Net1 ASOs. In one example, the volume of a metastasis treated with one or more Rab13 ASOs and/or Net1 ASOs is at least 2-fold, at least 3-fold, at least 4-fold, or even at least 5-fold smaller than the volume of a tumor not treated with the one or more Rab13 ASOs and/or Net1 ASOs (for example after at least 7 days, at least 10 days, at least 14 days, at least 30 days, at least 60 days, at least 90 days, or at least 120 days after the treatment). In one example, the size of a tumor and/or metastasis treated with the one or more Rab13 ASOs and/or Net1 ASOs is at least 2-fold, at least 3-fold, at least 4-fold, or even at least 5-fold smaller than the size of a tumor not treated with the antibody-IR700 molecules (for example after at least 7 days, at least 10 days, at least 14 days, at least 30 days, at least 60 days, at least 90 days, or at least 120 days after the treatment).

In some examples, the method increases survival time of the subject relative to an absence of administration of one or more Rab13 ASOs and/or one or more Net1 ASOs. In one example, the survival time of a subject having a tumor treated with one or more Rab13 ASOs and/or one or more Net1 ASOs is increase by at least 10%, for example by at least 20%, at least 40%, at least 50%, at least 80%, at least 85%, at least 90%, at least 100%, at least 2-fold, at least 3-fold, at least 4-fold, at least 5-fold, at least 6-fold, at least 7-fold, or at least 10-fold longer than survival time of a subject having a metastasis not treated with the one or more Rab13 ASOs and/or one or more Net1 ASOs (for example after a specified period of time, such as at least 14 days, at least 30 days, at least 60 days, at least 90 days, at least 120 days, at least 6 months, at least 12 months, at least 24 months, or at least 5 years after the treatment, more subjects treated with the one or more Rab13 ASOs and/or one or more Net1 ASOs will be alive than if not treated with the one or more Rab13 ASOs and/or one or more Net1 ASOs). In some examples, the disclosed methods can increase a subject's survival time by at least 3 months, at least 6 months, at least 12 months, at least 18 months, at least 24 months, at least 36 months or more, relative to average survival time in the absence of administration of the one or more Rab13 ASOs and/or one or more Net1 ASOs.

In some examples, the method further includes treating the subject with (i.e., administering to the subject) one or more additional therapeutic agents. The one or more additional therapeutic agents can be administered to the subject contemporaneously or sequentially with the one or more Rab13 ASOs and/or one or more Net1 ASOs. In one example, the additional therapeutic agent(s) are administered after the one or more Rab13 ASOs and/or one or more Net1 ASOs, for example at least 10 minutes, at least 30 minutes, at least 60 minutes, at least 2 hours, at least 3 hours, at least 4, hours, at least 5 hours, at least 6 hours, at least 7 hours, at least 8 hours, at least 10 hours, at least 12 hours, at least 24 hours, at least 48 hours, at least 72 hours, at least 1 week, at least 1 month, or at least 1 year after the irradiation, such as 1 hour to 10 hours, 1 hour to 9 hours 1 hour to 8 hours, 2 hours to 8 hours, 4 hours to 8 hours, 1 hour to 24 hours, or 1 hour to 48 hours after administering the ASO(s). In another example, the additional therapeutic agent(s) are administered just before the administering the ASO(s) (such as about 10 minutes to 120 minutes before administering the ASO(s), such as 10 minutes to 60 minutes or 10 minutes to 30 minutes before administering the ASO(s)).

In some examples, combining the one or more Rab13 ASOs and/or Net1 ASOs provided herein (such as one or more of SEQ ID NOs: 7, 8, 9, 10, 14, 15, 17, 18 and 30-32, wherein in some examples such sequences are PMOs) with additional therapy (such as anti-neoplastic agents), enhances the effectiveness of the treatment of the metastasis. For example, combining one or more Rab13 ASOs and/or one or more Net1 ASOs with the additional therapy (such as one or more anti-neoplastic agents) can result in a metastatic tumor volume that is less than the metastatic tumor volume would be if it were treated with either the one or more Rab13 ASOs and/or one or more Net1 ASOs alone or the additional therapy alone, that is, there is a synergistic effect. In one example, the volume of a metastasis treated with the combination therapy is at least 2-fold, at least 3-fold, at least 4-fold, or even at least 5-fold smaller than the volume of a metastasis treated with either the one or more Rab13 ASOs and/or one or more Net1 ASOs alone or the additional therapy alone (for example after at least 7 days, at least 10 days, at least 14 days, at least 30 days, at least 60 days, at least 90 days, or at least 120 days after the treatment). In one example, the size of a metastasis treated with the combination therapy is at least 5-fold, at least 6-fold, at least 7-fold, or even at least 10-fold smaller than the size of a control untreated tumor (for example after at least 7 days, at least 10 days, at least 14 days, at least 30 days, at least 60 days, at least 90 days, or at least 120 days after the treatment). In another or additional example, combining the one or more Rab13 ASOs and/or one or more Net1 ASOs with the additional therapy (such as anti-neoplastic agents) can increase the survival time of a subject having a metastatic cancer relative to the survival time of the subject if the metastatic cancer was treated with either the one or more Rab13 ASOs and/or one or more Net1 ASOs alone or the additional therapy alone, that is, there is a synergistic effect. In one example, the survival time of a subject having a tumor treated with the combination therapy is at least 2-fold, at least 3-fold, at least 4-fold, at least 5-fold, at least 6-fold, at least 7-fold, or at least 10-fold longer than survival time of a subject having a tumor treated with either the one or more Rab13 ASOs and/or one or more Net1 ASOs alone or the additional therapy alone (for example after a specified period of time, such as at least 14 days, at least 30 days, at least 60 days, at least 90 days, at least 120 days, at least 6 months, at least 12 months, at least 24 months, or at least 5 years after the treatment, more subjects treated with the combination therapy will be alive than if treated with either therapy alone).

Exemplary Tumors

The disclosed methods of treating a metastasis using one or more Rab13 ASOs and/or Net1 ASOs, can be used to treat a metastatic cancer, such as in a patient with a metastatic cancer. In some examples, the metastatic cancer is a metastatic solid tumor, such as metastasis of a primary solid tumor, such as a metastasis of a primary pancreatic cancer, primary colorectal cancer, primary liver cancer, primary glioma, primary lung cancer, primary head and neck cancer, primary thyroid cancer, primary endometrial cancer, primary breast cancer, or primary ovarian cancer. in some examples, the metastasis is a metastatic: sarcoma or carcinoma, fibrosarcoma, myxosarcoma, liposarcoma, chondrosarcoma, osteogenic sarcoma, and other sarcomas, synovioma, mesothelioma, Ewing's tumor, leiomyosarcoma, rhabdomyosarcoma, colon carcinoma, pancreatic cancer, breast cancer, ovarian cancer, prostate cancer, hepatocellular carcinoma, lung cancer, colorectal cancer, head and neck cancer, squamous cell carcinoma, basal cell carcinoma, adenocarcinoma (for example adenocarcinoma of the pancreas, colon, ovary, lung, breast, stomach, prostate, cervix, or esophagus), sweat gland carcinoma, sebaceous gland carcinoma, papillary carcinoma, papillary adenocarcinomas, medullary carcinoma, bronchogenic carcinoma, renal cell carcinoma, hepatoma, bile duct carcinoma, choriocarcinoma, Wilms' tumor, cervical cancer, testicular tumor, bladder carcinoma, CNS tumors (such as a glioma, astrocytoma, medulloblastoma, craniopharyogioma, ependymoma, pinealoma, hemangioblastoma, acoustic neuroma, oligodendroglioma, menangioma, melanoma, neuroblastoma and retinoblastoma).

In some examples, the metastatic cancer is a metastatic liquid cancer such as a metastatic leukemia, including metastatic acute leukemia (such as metastatic acute lymphocytic leukemia, metastatic acute myelocytic leukemia, and metastatic myeloblastic, metastatic promyelocytic, metastatic myelomonocytic, metastatic monocytic and metastatic erythroleukemia), chronic metastatic leukemias (such as chronic myelocytic (granulocytic) leukemia and chronic lymphocytic leukemia), metastatic polycythemia vera, metastatic lymphoma, metastatic Hodgkin's disease, metastatic non-Hodgkin's lymphoma, metastatic multiple myeloma, metastatic Waldenstrdm's macroglobulinemia, or heavy chain disease.

Exemplary Subjects

The disclosed methods are used to treat a subject who has a metastatic cancer. In some examples, the primary tumor and/or one or more metastases have been previously treated, such as surgically or chemically removed, and the disclosed methods are used subsequently to kill any remaining metastatic cells that may remain in the patient.

The disclosed methods can be used to treat any mammalian subject, such as a human, who has a metastatic cancer, or has had such previously removed or treated. Subjects in need of the disclosed therapies can include human subjects having metastatic cancer. For example, the disclosed methods can be used as initial treatment for cancer either alone, or in combination with radiation or other chemotherapy or biotherapy (such as a monoclonal antibody therapy). The disclosed methods can also be used in patients who have failed previous radiation or chemotherapy. Thus, in some examples, the subject is one who has received other therapies, but those other therapies have not provided a desired therapeutic response.

Administration of ASOs

Antisense oligonucleotides can be delivered to a cell, tissue or organ using any of a number of methods. Methods of administration include, but are not limited to, intratumoral, intradermal, intramuscular, intraperitoneal, parenteral, intravenous, subcutaneous, vaginal, rectal, intranasal, inhalation, in the eye, intraosseous, oral or by gene gun.

Intranasal administration refers to delivery of the compositions into the nose and nasal passages through one or both of the nares and can comprise delivery by a spraying mechanism or droplet mechanism, or through aerosolization of the ASO. Administration of the compositions by inhalant can be through the nose or mouth via delivery by spraying or droplet mechanisms. Delivery can be directly to any area of the respiratory system (such as to a metastasis in a lung) via intubation.

Parenteral administration is generally achieved by injection. Injectables can be prepared in conventional forms, either as liquid solutions or suspensions, solid forms suitable for solution of suspension in liquid prior to injection, or as emulsions. Injection solutions and suspensions can be prepared from sterile powders, granules, and tablets. Administration can be systemic or local. In one example, administration is achieved by injection into a metastasis.

ASOs can also be delivered by oral administration. In some embodiments, the ASO is conjugated to triantennary N-acetyl galactosamine (GalNAc or GN3; see Prakash et al., *Nucleic Acids Res* 42(13):8796-8807, 2014).

ASOs can also be administered to a subject and/or delivered to a cell by liposomal-mediated transfection, electroporation or conjugation of the ASO to a cell-penetrating peptide (CPP). Transfection of ASOs generally involves the use of liposomal-mediated transfection reagents. Methods for transfection and electroporation of nucleic acids, including ASOs, are known (see, for example, U.S. Pat. Nos. 7,307,069 and 7,288,530; Pretchtel et al., *J. Immunol. Methods* 311(1-2):139-52, 2006; Ghartey-Tagoe et al., *Int. J. Pharm.* 315(1-2):122-133, 2006). CPPs are a family of polypeptides that facilitate transduction of proteins, nucleic acids or other compounds across membranes in a receptor-independent manner (Wadia and Dowdy, *Curr. Protein Pept. Sci.* 4(2):97-104, 2003). Typically, CPPs are short polycationic sequences that can facilitate cellular uptake of compounds to which they are linked into endosomes of cells. For example, delivery of ASOs by covalently-linked cationic cell penetrating peptides can be performed (Abes et al., J. Control Release 116(3):304-13, 2006).

Antisense oligonucleotides can be administered with pharmaceutically acceptable carriers. Pharmaceutically acceptable carriers are determined in part by the particular composition being administered, as well as by the particular method used to administer the composition. Accordingly, there is a wide variety of suitable formulations of pharmaceutical compositions of the present disclosure.

Compositions for oral administration may include powders or granules, suspensions or solutions in water or non-aqueous media, capsules, sachets, or tablets. Thickeners, flavorings, diluents, emulsifiers, dispersing aids or binders may be desirable.

Preparations for parenteral administration include sterile aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's, or fixed oils. Intravenous vehicles include fluid and nutrient replenishers, electrolyte replenishers (such as those based on Ringer's dextrose), and the like. Preservatives and other additives may also be present such as, for example, antimicrobials, anti-oxidants, chelating agents, and inert gases and the like.

Formulations for topical administration may include ointments, lotions, creams, gels, drops, suppositories, sprays, liquids and powders. Conventional pharmaceutical carriers, aqueous, powder or oily bases, thickeners and the like can be used (for example for a metastasis on the skin).

Administration can be accomplished by single or multiple doses. The dose required can vary from subject to subject depending on the species, age, weight and general condition of the subject, the particular ASOs being used and its mode of administration. An appropriate dose can be determined by one of ordinary skill in the art using only routine experimentation. If administered in multiple doses, the time between delivery of each dose can vary between days, weeks, months and years.

ASOs may be covalently linked to one or more moieties or conjugates which enhance the activity, cellular distribution or cellular uptake of the resulting antisense oligonucleotides. Exemplary conjugate groups include cholesterol moieties and lipid moieties. Additional conjugate groups include carbohydrates, phospholipids, biotin, phenazine, folate, phenanthridine, anthraquinone, acridine, fluoresceins, rhodamines, coumarins, and dyes.

ASOs administered can also be modified as described herein. In one example, ASO administered are modified to have one or more stabilizing groups that are generally attached to one or both termini to enhance properties such as, for example, nuclease stability. Included in stabilizing groups are cap structures. These terminal modifications protect the ASO having terminal nucleic acid from exonuclease degradation, and can help in delivery and/or localization within a cell. The cap can be present at the 5'-terminus (5'-cap), or at the 3'-terminus (3'-cap), or can be present on both termini. Cap structures include, for example, inverted deoxy abasic caps. Further 3' and 5'-stabilizing groups that can be used to cap one or both ends of an antisense oligonucleotide to impart nuclease stability include those disclosed herein and in WO 03/004602, which is herein incorporated by reference.

The effective amount of one or more Rab13 ASOs and/or one or more Net1 ASOs administered to a human or veterinary subject can vary depending upon a number of factors associated with that subject, for example the overall health of the subject. An effective amount of one or more Rab13 ASOs and/or one or more Net1 ASOs can be determined by varying the dosage of the product and measuring the resulting therapeutic response, such as the regression of a metastasis. Effective amounts also can be determined through various in vitro, in vivo or in situ immunoassays. The disclosed one or more Rab13 ASOs and/or one or more Net1 ASOs can be administered in a single dose, or in several doses, as needed to obtain the desired response. However, the effective amount of can be dependent on the source applied, the subject being treated, the severity and type of the condition being treated, and the manner of administration.

In particular examples, a therapeutically effective dose of a Rab13 ASO or Net1 ASO is at least 0.5 milligram per kilogram (mg/kg), at least 1 mg/kg, at least 2 mg/kg, at least 5 mg/kg, at least 10 mg/60 kg, at least 15 mg/kg, at least 20 mg/kg, at least 50 mg/kg, for example 0.5 to 50 mg/kg, such as a dose of 1 mg/kg, 2 mg/kg, 5 mg/kg, 10 mg/kg, or 20 mg/kg. In another example, a therapeutically effective dose of an ASO is at least 10 mg, such as at least 20 mg, at least 50 mg, or at least 100 μg. In one example, a therapeutically effective dose of an ASO is at least 1 nM, at least 10 nM, at least 100 nM, at least 1 uM, at least 10 uM, at least 100 uM, at least 1 mM, at least 10 mM, or at least 100 mM. However, one skilled in the art will recognize that higher or lower dosages also could be used, for example depending on the particular Rab13 ASO or Net1 ASO. In particular examples, a daily dosage is administered in one or more divided doses (such as 2, 3, or 4 doses) or in a single formulation. In particular examples, the subject receives multiple administrations of one or more Rab13 ASOs and/or one or more Net1 ASOs (such as at least 2, at least 3, at least 4, at least 5, at least 10, at least 15, or at least 20 separate administrations, such as 2, 3, 4, 5, 6, 7, 8, 9, 10, 11, 12, 13, 14, 15, 16, 17, 18, 19, 20, 25, 30, 40, or 50 separate administrations over time, such as over a week, month(s), or year(s)). The disclosed one or more Rab13 ASOs and/or one or more Net1 ASOs can be administered alone, with a pharmaceutically acceptable carrier, and/or with other therapeutic agents (such as other anti-neoplastic agents).

Administration of Additional Therapeutic Agents

One or more Rab13 ASOs and/or one or more Net1 ASOs can be used in combination with additional therapeutic agents (such as anti-neoplastic agents) c in vitro, for example by adding the ASO(s) and additional therapeutic agent(s) to growth media in which metastatic cancer cells are growing, or can be contacted with a metastatic cancer cell in vivo, for example by administering the ASO(s) and additional therapeutic agent(s) to the subject with metastatic cancer to be treated.

The one or more Rab13 ASOs and/or Net1 ASOs provided herein (such as one or more of SEQ ID NOs: 7, 8, 9, 10, 14, 15, 17, 18 and 30-32, wherein in some examples such sequences are PMOs), as well as additional therapeutic agents, can be administered locally or systemically using any method known in the art, for example to subjects having a metastatic cancer, or who has had a tumor or metastasis previously removed (for example via surgery or other therapy). Although specific examples are provided, one skilled in the art will appreciate that alternative methods of administration of the disclosed ASOs and additional therapeutic agents can be used. Such methods may include for example, the use of catheters or implantable pumps to provide continuous infusion over a period of several hours to several days into the subject in need of treatment.

In one example, one or more Rab13 ASOs and/or Net1 ASOs provided herein (such as one or more of SEQ ID NOs: 7, 8, 9, 10, 14, 15, 17, 18 and 30-32, wherein in some examples such sequences are PMOs), and additional therapeutic agents are administered by parenteral means, including direct injection direct injection or infusion into a metastasis (intratumorally). In some examples, the ASO(s) and additional therapeutic agents are administered to the metastasis by applying the ASO(s) and additional therapeutic agents to the metastasis, for example by bathing the metastasis in a solution containing the ASO(s) and additional therapeutic agents or by pouring the ASO(s) and additional therapeutic agents onto the metastasis.

In one example, one or more Rab13 ASOs and/or Net1 ASOs provided herein (such as one or more of SEQ ID NOs: 7, 8, 9, 10, 14, 15, 17, 18 and 30-32, wherein in some examples such sequences are PMOs), and additional therapeutic agents are administered systemically, for example intravenously, intramuscularly, subcutaneously, intradermally, intraperitoneally, subcutaneously, or orally, to a subject having a metastatic cancer.

Treatments with one or more Rab13 ASOs and/or Net1 ASOs provided herein (such as one or more of SEQ ID NOs: 7, 8, 9, 10, 14, 15, 17, 18 and 30-32, wherein in some examples such sequences are PMOs) and the additional agent(s) can be completed in a single day, or may be done repeatedly on multiple days with the same or a different dosage. Repeated treatments may be done on the same day, on successive days, or every 1-3 days, every 3-7 days, every 1-2 weeks, every 2-4 weeks, every 1-2 months, or at even longer intervals. Thus, in some examples, the subject is treated at least 2 times, at least 3 times, at least 4 times, at least 5 times, at least 10 times, or at least 20 times (such as 2-5 times, or 3-4 times) with the one or more Rab13 ASOs and/or Net1 ASOs provided herein (such as one or more of SEQ ID NOs: 7, 8, 9, 10, 14, 15, 17, 18 and 30-32, wherein in some examples such sequences are PMOs) and the additional agent(s).

Exemplary Additional Therapies

As discussed above, prior to, during, or following administration of one or more Rab13 ASOs and/or Net1 ASOs provided herein (such as one or more of SEQ ID NOs: 7, 8, 9, 10, 14, 15, 17, 18 and 30-32, wherein in some examples such sequences are PMOs) molecules, the treated subject can receive one or more other therapies. In one example, the subject receives one or more treatments to remove or reduce a tumor and/or a metastasis prior to administration of the ASO(s). In one example, the subject receives one or more treatments following administration of the ASO(s). In an example, the subject receives one or more additional therapies concurrently with the administration of the disclosed ASO(s).

In some examples, the subject is treated with one or more anti-cytokine agents (such as tocilizumab, for example as an iv infusion at 4 to 8 mg/kg if following administration of the ASO(s), the subject suffers from side effects, for example due to the elevated cytokines/chemokines).

Examples of such therapies that can be used in combination with the disclosed methods, include but are not limited to, surgical treatment for removal or reduction of the tumor and/or a metastasis (such as surgical resection, cryotherapy, or chemoembolization), as well as anti-tumor pharmaceutical treatments which can include radiotherapeutic agents, anti-neoplastic chemotherapeutic agents, antibiotics, alkylating agents and antioxidants, kinase inhibitors, biologics (e.g., antibodies) and other agents. Particular examples of additional therapeutic agents that can be used include microtubule binding agents, DNA intercalators or cross-linkers, DNA synthesis inhibitors, DNA and/or RNA transcription inhibitors, antibodies, enzymes, enzyme inhibitors, and gene regulators. These agents (which are administered at a therapeutically effective amount) and treatments can be used alone or in combination. Methods and therapeutic dosages of such agents are known to those skilled in the art, and can be determined by a skilled clinician.

In one example the additional therapy administered is a chemotherapy immunosuppressant (such as Rituximab, steroids) or a cytokine (such as GM-CSF). Chemotherapeutic agents are known (see for example, Slapak and Kufe, Principles of Cancer Therapy, Chapter 86 in Harrison's Principles of Internal Medicine, 14th edition; Perry et al., Chemotherapy, Ch. 17 in Abeloff, Clinical Oncology 2nd ed., 2000 Churchill Livingstone, Inc; Baltzer and Berkery. (eds): Oncology Pocket Guide to Chemotherapy, 2nd ed. St. Louis, Mosby-Year Book, 1995; Fischer Knobf, and Durivage (eds): The Cancer Chemotherapy Handbook, 4th ed. St. Louis, Mosby-Year Book, 1993). Exemplary chemotherapeutic agents that can be used with the methods provided herein include but are not limited to, carboplatin, cisplatin, paclitaxel, docetaxel, doxorubicin, epirubicin, topotecan, irinotecan, gemcitabine, iazofurine, gemcitabine, etoposide, vinorelbine, tamoxifen, valspodar, cyclophosphamide, methotrexate, fluorouracil, mitoxantrone, Doxil (liposome encapculated doxiorubicine) and vinorelbine.

"Microtubule binding agent" refers to an agent that interacts with tubulin to stabilize or destabilize microtubule formation thereby inhibiting cell division. Examples of microtubule binding agents that can be used in conjunction with the disclosed antibody-IR700 molecule therapies include, without limitation, paclitaxel, docetaxel, vinblastine, vindesine, vinorelbine (navelbine), the epothilones, colchicine, dolastatin 15, nocodazole, podophyllotoxin and rhizoxin. Analogs and derivatives of such compounds also can be used. For example, suitable epothilones and epothilone analogs are described in International Publication No. WO 2004/018478. Taxoids, such as paclitaxel and docetaxel, as well as the analogs of paclitaxel taught by U.S. Pat. Nos. 6,610,860; 5,530,020; and 5,912,264 can be used.

The following classes of compounds can be used in combination with the disclosed ASOs disclosed herein: suitable DNA and/or RNA transcription regulators, including, without limitation, anthracycline family members (for example, daunorubicin, doxorubicin, epirubicin, idarubicin, mitoxantrone, and valrubicin) and actinomycin D, as well as derivatives and analogs thereof also are suitable for use in combination with the disclosed therapies. DNA intercalators and cross-linking agents that can be administered to a subject include, without limitation, platinum compounds (for example, carboplatin, cisplatin, oxaliplatin, and BBR3464), mitomycins, such as mitomycin C, bleomycin, chlorambucil, cyclophosphamide, as well as busulfan, dacarbazine, mechlorethamine, procarbazine, temozolomide, thiotepa, and uramustine and derivatives and analogs thereof. DNA synthesis inhibitors suitable for use as therapeutic agents include, without limitation, methotrexate, 5-fluoro-5'-deoxyuridine, 5-fluorouracil and analogs thereof. Examples of suitable enzyme inhibitors include, without limitation, camptothecin, etoposide, formestane, trichostatin and derivatives and analogs thereof. Suitable compounds that affect gene regulation include agents that result in increased or decreased expression of one or more genes, such as raloxifene, 5-azacytidine, 5-aza-2'-deoxycytidine, tamoxifen, 4-hydroxytamoxifen, mifepristone and derivatives and analogs thereof. Kinase inhibitors include imatinib, gefitinib, and erolitinib that prevent phosphorylation and activation of growth factors.

In one example, the additional therapeutic agent is folic acid (for example, methotrexate, pemetrexed, and raltitrexed), purine (for example, cladribine, clofarabine, fludarabine, mercaptopurine, and tioguanine), pyrimidine (for example, capecitabine), cytarabine, fluorouracil, gemcitabine, and derivatives and analogs thereof. In one example, the additional therapeutic agent is a plant alkaloid, such as podophyllum (for example, etoposide, and teniposide) and derivatives and analogs thereof. In one example, the additional therapeutic agent is an antimetabolite, such as cytotoxic/antitumor antibiotics, bleomycin, rifampicin, hydroxyurea, mitomyci, and derivatives and analogs thereof. In one example, the additional therapeutic agent is a topoisomerase inhibitor, such as topotecan, irinotecan, and derivatives and analogs thereof. In one example, the additional therapeutic agent is a photosensitizer, such as aminolevulinic acid, methyl aminolevulinate, porfimer sodium, verteporfin, and derivatives and analogs thereof. In one example, the additional therapeutic agent is a nitrogen mustard (for example, chlorambucil, chlormethine, cyclophosphamide, ifosfamide, and melphalan) or nitrosourea (for example, carmustine, fotemustine, lomustine, and streptozocin), and derivatives and analogs thereof.

Other therapeutic agents, for example anti-tumor agents, that may or may not fall under one or more of the classifications above, also are suitable for administration in combination with the disclosed therapies. By way of example, such agents include adriamycin, apigenin, rapamycin, zebularine, cimetidine, alitretinoin, altretamine, amsacrine, anagrelide, arsenic trioxide, asparaginase, axitinib, bexarotene, bevacizumab, bortezomib, celecoxib, denileukin diftitox, estramustine, hydroxycarbamide, lapatinib, pazopanib, pentostatin, masoprocol, mitotane, pegaspargase, tamoxifen, sorafenib, sunitinib, vemurafinib, vandetanib, tretinoin, and derivatives and analogs thereof. In one example, the additional therapeutic is a small molecule inhibitor, such as one or more of gefitinib, erlotinib, and lapatinib.

Other therapeutic agents can include biologics, such as one or more therapeutic antibodies. Examples of such biologics include but are not limited to monoclonal antibodies, such as one or more of alemtuzumab, arcitumomab, bevacizumab, cetuximab, daclizumab, gemtuzumab, ibritumomab tiuxetan, ipilimumab, matuzumab, nimotuzumab, nivolumab, ofatumumab, rituximab, panitumumab, pembrolizumab, pertuzumab, tositumomab, trastuzumab, and zalutumumab.

Specific examples of chemotherapies and bio-therapies that can be used with the disclosed methods include but are not limited to one or more of the following: 5-fluorouracil (e.g., Adrucil®, Efudex®, Fluoroplex®), Avastin® (bevacizumab), Camptosar® (Irinotecan Hydrochloride), capecitabine (e.g., Xeloda®), oxaliplatin (e.g., Eloxatin®), Erbitux® (cetuximab), leucovorin calcium, regorafenib, Stivarga® (Regorafenib), Vectibix® (Panitumumab), Wellcovorin® (Leucovorin Calcium), and Zaltrap® (Ziv-Aflibercept).

Examples of drug combinations that can be used in combination with the disclosed methods include but are not limited to: GSK2256098 and trametinib; VS-6063 and paclitaxel; Dasatinib and Erlotinib; Dasatinib and Bevacizumab; as well as Dasatinib and Dacarbazine.

In some examples, the subject receiving the one or more Rab13 ASOs and/or Net1 ASOs provided herein (such as one or more of SEQ ID NOs: 7, 8, 9, 10, 14, 15, 17, 18 and 30-32, wherein in some examples such sequences are PMOs) is also administered interleukin-2 (IL-2), for example via intravenous administration. In particular examples, IL-2 (Chiron Corp., Emeryville, CA) is administered at a dose of at least 500,000 IU/kg as an intravenous bolus over a 15 minute period every eight hours beginning on the day after administration of the peptides and continuing for up to 5 days. Doses can be skipped depending on subject tolerance.

In some examples, the one or more Rab13 ASOs and/or one or more Net1 ASOs are co-administered (or administered shortly before or after the ASO) with a fully human antibody to cytotoxic T-lymphocyte antigen-4 (anti-CTLA-4). In some example subjects receive at least 1 mg/kg anti-CTLA-4 (such as 3 mg/kg every 3 weeks or 3 mg/kg as the initial dose with subsequent doses reduced to 1 mg/kg every 3 weeks).

The following examples are provided to illustrate certain particular features and/or embodiments. These examples should not be construed to limit the disclosure to the particular features or embodiments described.

Example 1

Materials and Methods

This example describes the materials and methods used to generate the results described in Examples 2-7.

Plasmid Constructs and Lentivirus Production

To express β-globin RNA followed by different UTRs, the genomic region containing the coding sequence of human β-globin was ligated to fragments corresponding to the following UTRs: β-globin UTR (3'UTR of human β-globin, Acc #: NM_000518.4), Rab13 UTR (wt) (3'UTR of mouse Rab13, Acc #: NM_026677.4), Rab13 UTR (Δ1) (3'UTR of mouse Rab13 missing nucleotides 204-211, corresponding to region 1), and Rab13 UTR (Δ 1+2) (3'UTR of mouse Rab13 missing nucleotides 204-211 and 193-200, corresponding to regions 1 and 2, respectively). The sequences were cloned into the pENTR1A vector and then transferred into the pINDUCER20 lentivector (Addgene #44012) using the Gateway LR clonase II Enzyme mix (Thermo Fisher Scientific, cat #11791-020).

mEGFP-Lifeact-7 (Addgene plasmid #54610) was transferred into pCDH-CMV-MCS-EF$_1$-Puro (System Biosciences, cat #CD510B-1) using NheI/NotI sites for virus production.

To express N-terminally GFP-tagged Rab13 using different UTRs, the coding sequence of EGFP was ligated in frame to the coding sequence of human Rab13. The fusion was then ligated to fragments corresponding to the 3'UTR of human Rab13 (Acc #: NM_002870.5) (wt UTR) or the 3'UTR of Rab13 missing 53 nucleotides (202-254) from the GA-rich region that is targeted by the Rab13 PMOs (APMO UTR). The sequences were cloned into PCDH-PGK lentivector.

Lentivirus was produced in HEK293T cells cultured in DMEM containing 10% FBS and Penicillin/Streptomycin. HEK293T cells were transfected with pINDUCER20 lentivectors, together with packaging plasmids pMD2.G and psPAX2 using PolyJet In Vitro DNA transfection Reagent (SignaGen) for 48 h. Harvested virus was precipitated with polyethylene glycol at 4° C. overnight.

Immunofluorescence and Western Blot

For IF, cells were plated onto collagen IV-coated glass coverslips (10 μg/ml) and then fixed with 4% paraformaldehyde (PFA) in PBS (phosphate-buffered saline) for 15 min, permeabilized with 0.2% Triton X-100 in PBS for 5 min, blocked with 5% goat serum in PBS for 1 h, and incubated with Rab13 rabbit polyclonal antibody (Novus Biologicals, cat #NBP1-85799, 1/200 dilution) for 1 h. Secondary antibodies were conjugated with Alexa 647 (Thermo Fisher Scientific).

For Western blot detection the following antibodies were used: anti-Rab13 rabbit polyclonal (Novus Biologicals, cat #NBP1-85799, 1/1,000 dilution), anti-GFP rabbit polyclonal (Invitrogen, cat #A11122, 1/2,000 dilution), anti-RhoGDI, anti-Transferrin receptor (clone H68.4, ThermoFisher Scientific, cat #13-6800), anti-α-tubulin mouse monoclonal (Sigma-Aldrich, cat #T6199, 1/10,000 dilution), and anti-GAPDH rabbit monoclonal 14C10 (Cell Signaling Technology, cat #2118, 1/2,000 dilution), anti-phospho-FAK(Y397) (Cell Signaling Technology, cat #3283), anti-REP-1 (Abcam, cat #134964), anti-RabGDI (Santa Cruz Biotechnology, cat #sc-374649).

Cell Culture, siRNA Transfection and Generation of Stable Cell Lines

NIH/3T3 mouse fibroblast cells (ATCC) were grown in DMEM supplemented with 10% calf serum, sodium pyruvate and penicillin/streptomycin (Invitrogen) at 37° C., 5% $CO_2$. MDA-MB-231 human breast cancer cells (ATCC) were grown in Leibovitz's L15 media supplemented with 10% fetal bovine serum and penicillin/streptomycin at 37° C. in atmospheric air. Cells were tested for mycoplasma and were free of contamination.

For knockdown experiments, 40 μmoles of siRNAs were transfected into cells with Lipofectamine RNAiMAX (Thermo Fisher Scientific, cat #13778-150) according to the manufacturer's instructions. Cells were assayed after three days. siRNAs used were: AllStars Negative control siRNA (cat #1027281), si-Rab13 #7 (cat #SI02662149; target sequence: 5'-CAGGGCAAACATAAATGTAAA-3'; SEQ ID NO: 28) and si-Rab13 #8 (cat #SI02662702; target sequence: 5'-ATGGTCTTTCTTGGTATTAAA-3'; SEQ ID NO: 29) from Qiagen.

To generate stable cell lines expressing β-globin reporters with different UTRs, NIH/3T3 cells were infected with the corresponding lentiviruses and selected with 0.6 mg/ml Geneticin (Thermo Fisher Scientific). Exogenous expression of the reporters was induced by addition of 1 μg/ml doxycycline (Fisher Scientific) approximately:2-3 hrs before processing cells for FISH. This concentration of doxycycline and duration of incubation was chosen to achieve relatively low levels of expression.

To generate stable cell lines expressing GFP-Rab13 with different UTRs, MDA-MB-231 cells were infected with the corresponding lentiviruses and selected with 6 μg/ml blasticidin (Thermo Fisher Scientific). GFP-expressing cells with low level of GFP expression were sorted by FACS.

Morpholino Oligos and Delivery

Antisense morpholino oligonucleotides were synthesized by Gene Tools, LLC and delivered into cells using EndoPorter(PEG) (GeneTools, LLC). Sequences used were as follows:

```
mRab13 #1:
                            (SEQ ID NO: 1)
5'-TTCACATCCTTGGTTCCTCCCCCTC-3' mRab13 #2:
                            (SEQ ID NO: 2)
5'-CTGTTCACCTTTCACATCCTTGGTT-3' mRab13 #3:
                            (SEQ ID NO: 3)
5'-CTTCTCAAATCCCTTCTGTTCACCT-3' mRab13 #6:
                            (SEQ ID NO: 4)
5'-ACTAACAAAGACCTTGTAGAGTGAG-3' mRab13 #7:
                            (SEQ ID NO: 5)
5'-GAACCCACAGTGGAAACAGGATGTC-3'

HsRab13 #1:
                            (SEQ ID NO: 6)
5'-CCAAGCCCCTCTGCTATTTCTCCCC-3'

HsRab13 #2:
                            (SEQ ID NO: 7)
5'-TCTTTCACTTCCTCAATTCATTCCT-3'

HsRab13 #4:
                            (SEQ ID NO: 8)
5'-CCTTCCTTTCCTCCTCCCTCTCTTC-3'
```

-continued

HsRab13-11:
(SEQ ID NO: 11)
5'-TTCAGCTTCCGGGGTGGGGAGGCAA-3'

HsRab13-27:
(SEQ ID NO: 12)
5'-CGTTGTCTCCCTCAGGTTCAGCTTC-3'

HsRab13-49:
(SEQ ID NO: 13)
5'-CTCCCCTGCTCACTCCCTCTGCCGT-3'

HsRab13-91:
(SEQ ID NO: 14)
5'-TTACCATCTACCTATGTGACCCTCC-3'

HsRab13-113:
(SEQ ID NO: 15)
5'-CTCCTTTTTCTCCTCATTCTCTTTA-3'

HsRab13-139:
(SEQ ID NO: 16)
5'-TTTTTTCCTTTCTGCTTTTCCCTTT-3'

Hs-Rab13-165:
(SEQ ID NO: 17)
5'-TCCCTTCTCCCTTCCTCTCTCTTCC-3'

HsRab13-210:
(SEQ ID NO: 18)
5'-TCTTCCTACCTCCTTGCCTTCTTTC-3'

HsRab13-256:
(SEQ ID NO: 19)
5'-TAAGGTCTGAAGCCTGAGGCATCTC-3'

HsRab13-281:
(SEQ ID NO: 20)
5'-TTTATGTTTGCCCTGAAAACCCAGG-3'

HsRab13-306:
(SEQ ID NO: 21)
5'-AACAGAATAAATCAGTGTATTTACA-3'

HsRab13-331:
(SEQ ID NO: 22)
5'-GCAGGACCCTAAAACCTGATCTAGT-3'

HsRab13-356:
(SEQ ID NO: 23)
5'-TAGTGTAGTGCCGAGCTAGCCTTTT-3'

HsRab13-378:
(SEQ ID NO: 24)
5'-GACAGAACAGGAGCAAATTCCCTAG-3'

HsRab13-400:
(SEQ ID NO: 25)
5'-ACCAAGAAAGACCATGACAAGTGAC-3'

HsRab13-423:
(SEQ ID NO: 26)
5'-TTGTGCAAATGGTGGCCTTTAATAC-3'

Protrusion/Cell Body Isolation and RNA Analysis

Protrusions and cell bodies were isolated from serum-starved cells plated for 2 hrs on Transwell inserts equipped with 3.0-μm porous polycarbonate membrane (Corning) as previously described (Wang et al., 2017) with some modifications. Briefly, 3.5 million serum-starved cells were plated per 25 mm filter, pre-coated with 10 μg/ml collagen IV, and 1 or 3 filters were used for cell body or protrusion isolation, respectively. Cells were allowed to attach for 2 hrs and LPA (150 ng/ml) was added to the bottom chamber for 40 min. The cells were fixed with 0.3% paraformaldehyde for 10 min. For isolating protrusions, cell bodies on the upper surface were manually removed by wiping with cotton swab and laboratory paper. The protrusions on the underside were then solubilized by immersing the filter in crosslink reversal buffer (100 mM Tris pH 6.8, 5 mM EDTA, 10 mM DTT and 1% SDS) and gentle scraping. Cell bodies were similarly isolated after manually removing protrusions from the underside of the membrane. The extracts were incubated at 70° C. for 45 min and used for protein analysis or RNA isolation using Trizol LS (Thermo Fisher Scientific).

For nanoString analysis, RNA samples were analyzed using a custom-made codeset and the nCounter analysis system according to the manufacturer's instructions (NanoString Technologies). For ddPCR, RNA samples were analyzed using the ddPCR EvaGreen Supermix (Bio-Rad, cat. no. 186-4034). Droplets were generated using the Automated Droplet Generator (Bio-Rad, cat no. 186-4101), PCR amplification was performed on a C1000 Touch™ Thermal Cycler (Bio-Rad, cat no. 185-1197) and droplet reading was done with the QX 200 Droplet reader (Bio-Rad, cat no. 186-4003) and QuantaSoft software (Bio-rad).

Fluorescence in situ Hybridization (FISH)

For FISH, cells were plated on fibronectin- or collagen IV-coated glass coverslips for 2-3 h and subsequently fixed with 4% PFA for 20 min (5 μg/ml fibronectin for NIH/3T3 cells and 10 μg/ml collagen IV for MDA-MB-231 cells). FISH was performed with ViewRNA ISH Cell Assay kit (Thermo Fisher Scientific) according to the manufacturer's instructions. The following probe sets were used: human HBB #VA1-13382; mouse Ddr2 #VB6-12897; mouse Rab13 #VB1-14374; mouse Cyb5r3 #VB6-3197970; human Rab13 #VA1-12225; human Net1 #VA6-3169338; GFP #VF6-16198. DAPI was used to stain nuclei and CellMask stain (Thermo Fisher Scientific) was used to identify the cell outlines. Samples were mounted with ProLong Gold anti-fade reagent (Thermo Fisher Scientific). Image analysis and quantification of RNA distributions was performed using RDI Calculator (Stueland et al., 2019).

Active Rab13 Pull-Down Assays, Cell Fractionation and Immunoprecipitation

For Rab13 pull-down, cells were washed with ice-cold TBS and lysed in buffer containing 50 mM Tris (pH 7.4), 150 mM NaCl, 10 mM $MgCl_2$, 1% Triton X-100, 0.1% SDS, 0.5% sodium deoxycholate, 10% glycerol and protease inhibitor cocktail. Clarified lysates were then incubated with 20 mg of recombinant glutathione S-transferase (GST)-RBD-MICAL-L1 and Pierce™ Glutathione magnetic agarose beads (Life Technologies-Invitrogen, cat #78601) for 2 hrs at 4° C. Beads were washed with lysis buffer without sodium deoxycholate and SDS, eluted with sample buffer, and analyzed by immunoblotting.

To obtain soluble and particulate fractions, adherent cells were incubated with a buffer containing 50 mM Tris pH 7.4, 50 mM NaCl, 0.01% Digitonin, 10 mM $MgCl_2$, 1 mM EDTA, 10% glycerol and a cocktail of protease and phosphatase inhibitors (Thermo Fischer Scientific, cat#1861281) with rocking at 4° C. for 10 min Cell material extracted in this buffer was defined as soluble. The remaining material, corresponding to the particulate fraction, was extracted using a buffer containing 50 mM Tris pH 7.4, 1% Triton X-100, 150 mM NaCl, 10 mM $MgCl_2$, 0.1% SDS, 0.5% deoxycholate and 10% glycerol. Equal volumes of these fractions were analyzed by SDS-PAGE and immunoblotting. For quantitation, the soluble and particulate amounts were normalized to the corresponding amounts of soluble and particulate markers.

For immunoprecipitations, cells were lysed with a buffer containing 50 mM Tris pH 7.4, 1% NP-40, 150 mM NaCl, 10 mM $MgCl_2$, 10% glycerol and a cocktail of protease and phosphatase inhibitors (Thermo Fischer Scientific, cat #1861281). Lysates were cleared by centrifugation and mixed with GFP-Trap Magnetic Agarose beads (Chromotek, cat #gtma-10) for 1.5 h, at 4° C. Immobilized complexes were eluted with Laemmli's buffer and analyzed by SDS-PAGE and immunoblotting.

Migration Assays

Transwell migration assays were performed using 24-well plates with 8 µm-pore size inserts. Inserts were coated on both sides with collagen IV overnight (10 µg/ml in PBS). MDA-MB-231 cells that had been kept in 0.1% FBS-containing media for 16 h were detached using trypsin. After addition of trypsin inhibitor cells were resuspended in media containing 0.1% FBS and 20,000 cells (in 400 µl) were plated onto each insert. The lower chamber contained 600 µl of the same media. 2 h post-plating, 10% FBS was added in the lower chamber to induce cell motility. 2 h later both sides of the membrane were fixed with 4% PFA, cells were removed from the upper chamber and the membrane was stained with DAPI. Technical replicates were included in each assay. Nuclei were counted within 25 fields of view in each insert (5×5 tiles; tile area=456 µm×456 µm).

Invasion assays were performed based on (Scott et al., 2011) with some modifications. 24-well plates with 8 µm pore size inserts were used. Matrigel (BD Biosciences, cat #354324) was used at 50% dilution with PBS. 100 µl of matrix solution was added to the inserts and let to solidify. 40,000 cells (in 100 µl regular media) were plated on the upward facing underside and allowed to attach for 4 h. Subsequently, transwells were inverted, the underside was washed with serum-free media and transwells were transferred in wells containing 500 µl of serum-free media. 100 µl of 10% FBS-containing media were added on top of the solidified Matrigel and cells were allowed to invade for 48 h. Transwells were fixed in 4% PFA/0.2% Triton X-100 in PBS for 1 hr at room temperature and nuclei were stained with DAPI overnight.

Imaging and Image Analysis

Images of all fixed samples were obtained using a Leica SP8 confocal microscope, equipped with a HC PL APO 63× oil CS2 objective Z-stacks through the cell volume were obtained and maximum intensity projections were used for subsequent analysis Image analysis was performed using ImageJ or RDI Calculator (Stueland et al., 2019).

For live imaging of Lifeact-GFP-expressing cells, cells were plated on collagen IV-coated coverglass and were imaged on a Leica SP8 confocal microscope equipped with HC PL APO 63× oil CS2 objective, at constant 37° C. temperature and atmospheric air. The 488 nm laser line was used for illumination and z-stacks through the cell volume were acquired every 1.5 min over a period of 1 hr. Maximal intensity projections were produced and edge velocity was determined using the ADAPT ImageJ plugin (Barry et al., 2015) by thresholding the image and using the plugin's default settings. Protrusion and retraction velocities were averaged for each cell.

For live imaging of cherry-NLS-expressing cells, cells were plated on collagen IV-coated coverglass and were imaged on an Olympus IX81 microscope equipped with a 10× phase U Plan Fluorite Dry objective, a pE-300ultra Illumination system, an ORCA-Flash4.0 v3 sCMOS camera and an Okolab cage incubator enclosure. Time lapse images were taken every 5 min over a period of 10 hours. Nuclei were tracked using the built-in Manual Tracking ImageJ plugin. The resulting XY coordinates for each cell track were imported into a DiPer macro (Gorelik and Gautreau, 2014) to calculate average cell speed.

Example 2

Rab13 RNA and Protein Exhibit Distinct Subcellular Distributions

In both mouse and human mesenchymal cells, the Rab13 RNA is prominently enriched at peripheral protrusions (FIG. 1A and Mili et al., 2008, Wang et al., 2017). Furthermore, in extending lamellipodia the Rab13 RNA is actively translated (Moissoglu et al., 2019). To assess whether this leads to a corresponding increase of Rab13 protein in the vicinity of the peripherally translated Rab13 RNA, the distribution of endogenous Rab13 protein was visualized. Despite peripheral Rab13 RNA enrichment, the Rab13 protein is prominently concentrated around the nucleus (FIGS. 1B, 1C). Staining of Rab13 knockdown cells confirmed the specificity of the signal (FIG. 1B).

Protein and RNA distributions among protrusions (Ps) and cell bodies (CB) from cells grown on microporous filters were assessed. Consistent with the imaging data, the Rab13 RNA is significantly enriched at protrusions while the Rab13 protein is not (FIG. 1D). The enrichment of pY397-FAK verifies the enrichment of protrusions containing newly formed adhesions in the Ps fraction.

These results indicate that a significant proportion of the protein translated from peripheral Rab13 RNA does not persist at the periphery but assumes a steady state perinuclear distribution.

Example 3

A GA-Rich Motif within Rab13 3'UTR is Necessary for Localization at Protrusions

Figure 2A:
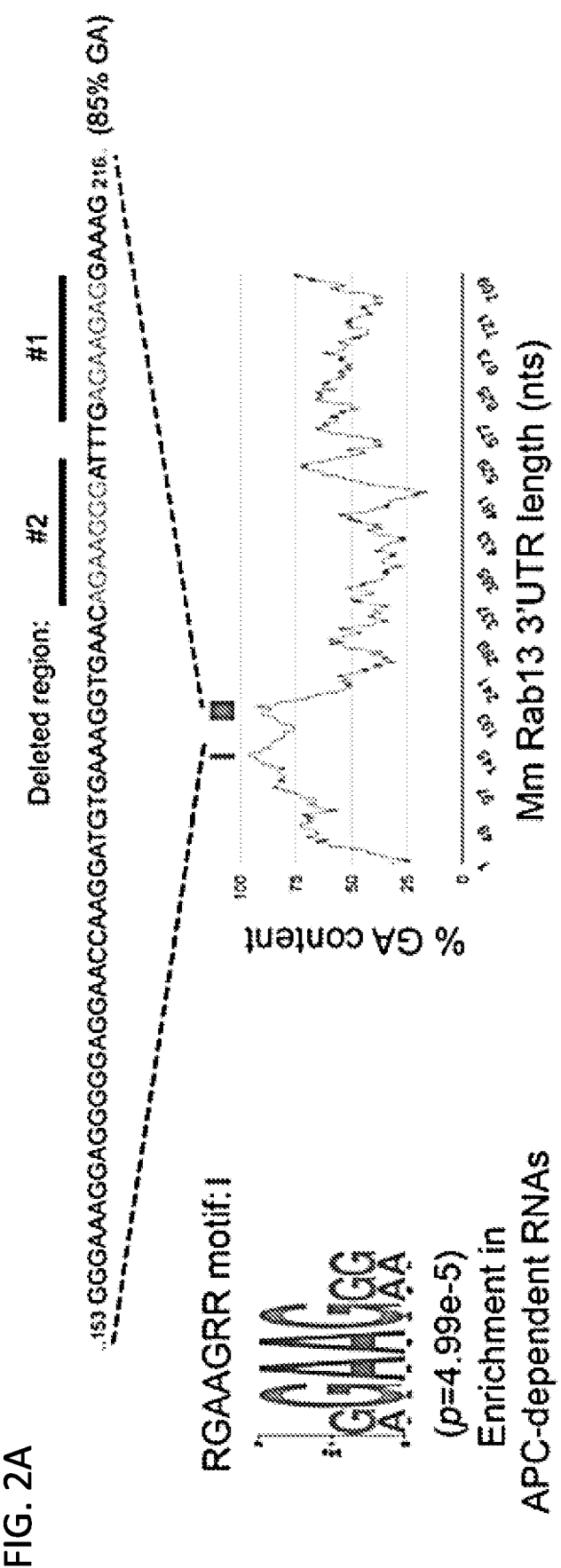
FIGS. 2A-2C: A GA-rich motif in the mouse Rab13 3'UTR is necessary for localization at protrusions.
Figure 3:
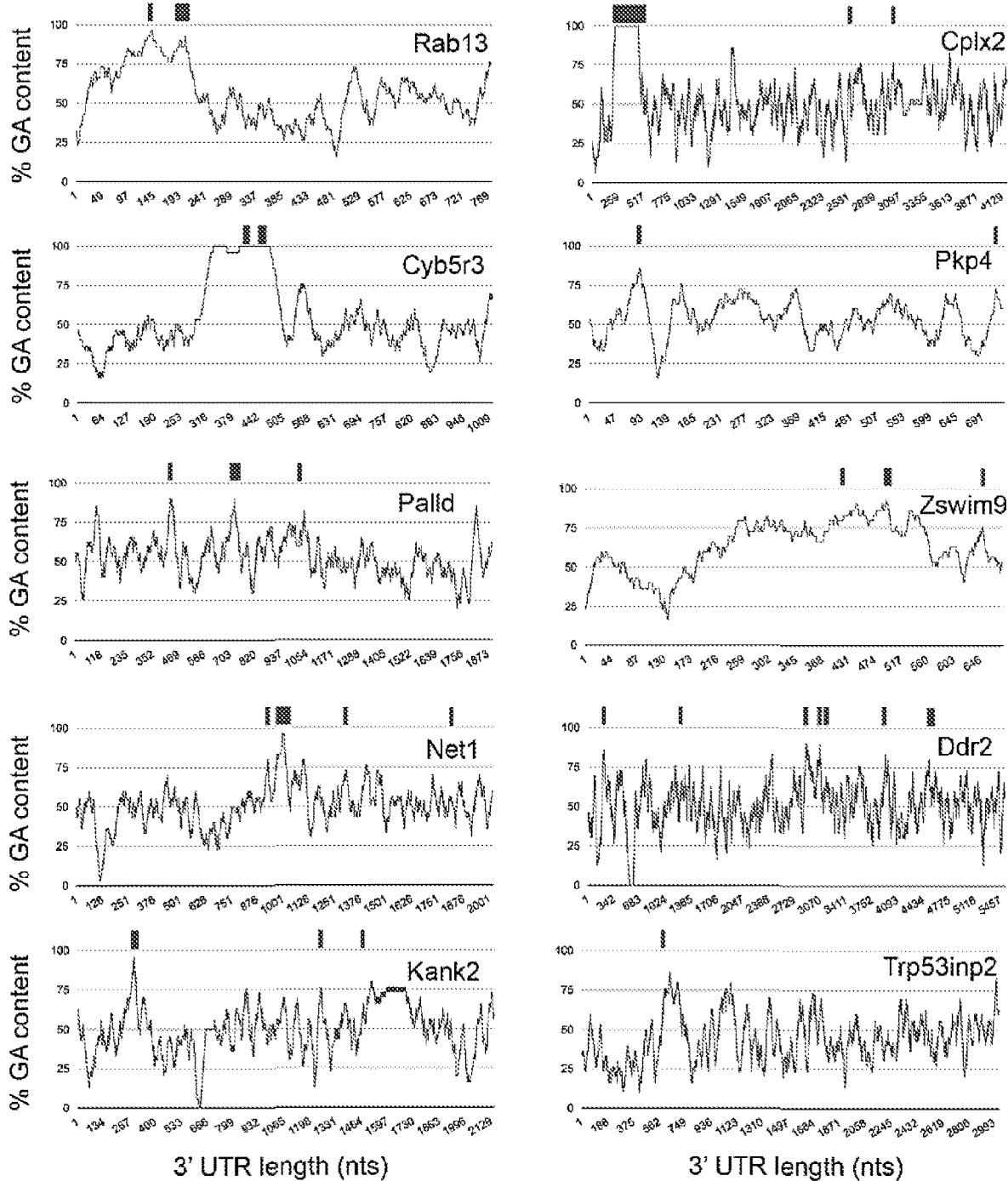
FIG. 3: GA-rich motif distribution in 3'UTRs of APC-dependent RNAs. Graphs show the % GA content along the 3'UTR of the indicated APC-dependent RNAs using a 30 nt window size. Occurrences of the consensus GA-rich motif are indicated by a rectangle above each graph. Wider rectangles indicate the presence of multiple motifs. Exact sizes are not to scale due to the variable UTR lengths. The majority of GA-rich motifs are found within more extended GA-rich regions with GA content >75%. The GA-motif is 8 nucleotides while the window for % GA calculation is 30 nucleotides.

To understand whether peripheral translation of Rab13 has a functional role, a method was developed to specifically interfere with peripheral localization of the Rab13 RNA. Specific sequences important for localization were identified. It had previously been shown that a 200-300 nt region of the mouse Rab13 3'UTR is sufficient for localization and can competitively inhibit the localization of other peripheral, APC-dependent RNAs (Wang et al., 2017). Based on this observation, it was postulated that this region likely contains a binding site for a factor commonly bound to APC-dependent RNAs. Sequence alignment and gazing were used to pinpoint a potential common binding site. A particular GA-rich motif was observed, with the consensus RGAAGRR (where R is a purine), which is present, in one or multiple copies, in the 3'UTR of the majority (~60%) of APC-dependent RNAs (FIGS. 2A and 3). Indeed, motif enrichment analysis (meme-suite.org) indicated that this motif is significantly enriched (p=4.99e-5) in APC-dependent RNAs compared to APC-independent RNAs, an RNA group which is also enriched at protrusions but through a distinct pathway (Wang et al., 2017).

The mouse Rab13 3'UTR has four GA-rich motifs within nucleotides 140-220. To test for any functional significance, a beta-globin RNA carrying either the wild type 3'UTR of the mouse Rab13 RNA, or the 3'UTR carrying specific deletions was exogenously expressed in mouse fibroblast cells (FIGS. 2A, 2B). Reporter RNAs were placed under a Dox-responsive promoter and their expression was induced for only a few hours to achieve low expression levels and prevent competition effects. The exogenous RNA, or a control endogenous RNA, was imaged using single-molecule FISH and a Peripheral Distribution Index (PDI) measured to quantify their distributions in multiple cells (Stueland et al., 2019). Consistent with previous observations (Wang et al., 2017), the beta-globin RNA shows a mostly diffuse cytoplasmic distribution, denoted by low PDI values (FIGS. 2B, 2C), while addition of the Rab13 3'UTR is sufficient to promote its peripheral localization, denoted by a significant increase in PDI values.

Figure 2C:
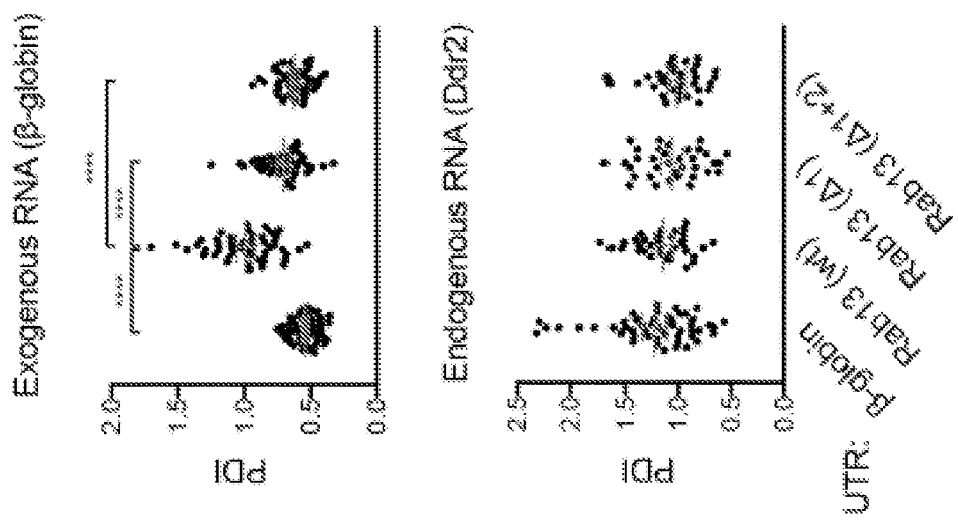
Figure 2B:
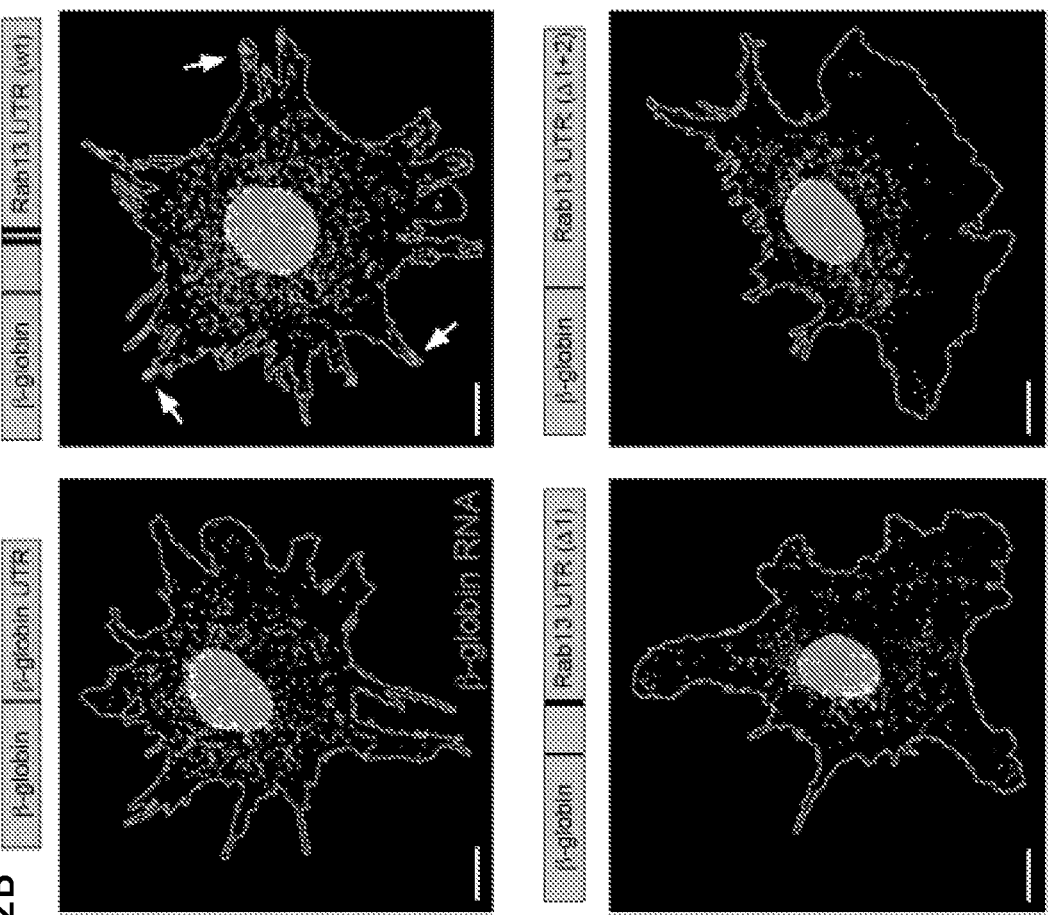

Interestingly, deletion of one RGAAGRR motif (Rab13 UTR (Δ1)) significantly perturbed the ability of the Rab13 3'UTR to direct localization of the beta-globin RNA, while deletion of two of them (Rab13 UTR (Δ 1+2)) made the distribution of the reporter indistinguishable from that of the non-localized control (FIG. 2C). An endogenous localized RNA (Ddr2) remained similarly localized at protrusions in all conditions (FIG. 2C). Therefore, at least some of the RGAAGRR motifs are required for peripheral localization of Rab13.

Example 4

Figure 4A:
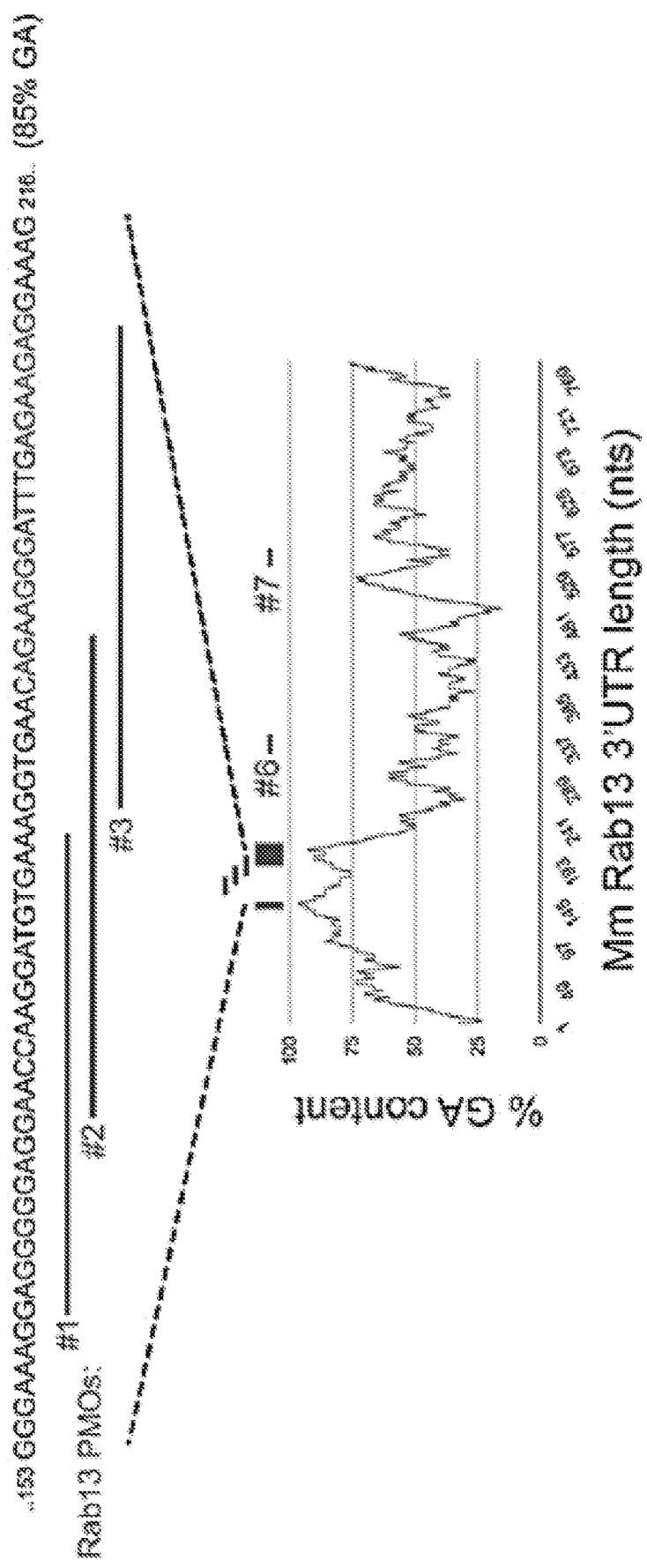
FIGS. 4A-4D: Antisense oligonucleotides against the GA-rich region specifically interfere with localization of the Rab13 RNA.

Antisense Oligonucleotides Against the GA-Rich Region of Rab13 Specifically Interfere with Localization of the Rab13 RNA The majority of the GA-rich motifs (62%; 148 of 239 motifs in 3'UTRs of APC-dependent RNAs) are found within more extended GA-rich regions, which exhibit high GA content (>75%) for at least 30 consecutive nucleotides or more (FIG. 3). To further investigate the roles of these different Rab13 3' UTR features and to, at the same time, interfere with the localization of the endogenous Rab13 RNA, an antisense oligonucleotide (ASO) approach was used. ASOs have been used to interfere with RNA structure formation or RNA-protein binding (Havens and Hastings, 2016, Hua et al., 2010, Lentz et al., 2013). 25 nt-long phosphorodiamidate morpholino (PMO) oligos predicted to recognize specifically the Rab13 RNA were designed. ASOs #1, 2 and 3 (SEQ ID NOS: 1, 2 and 3, respectively) target the RGAAGRR motifs or the adjacent GA-rich region, oligos #6 and #7 (SEQ ID NOS: 4 and 5, respectively) target the Rab13 3'UTR but outside of the GA-rich region, while an additional control PMO targets an intronic sequence of human beta-globin (FIG. 4A).

Figure 5A:
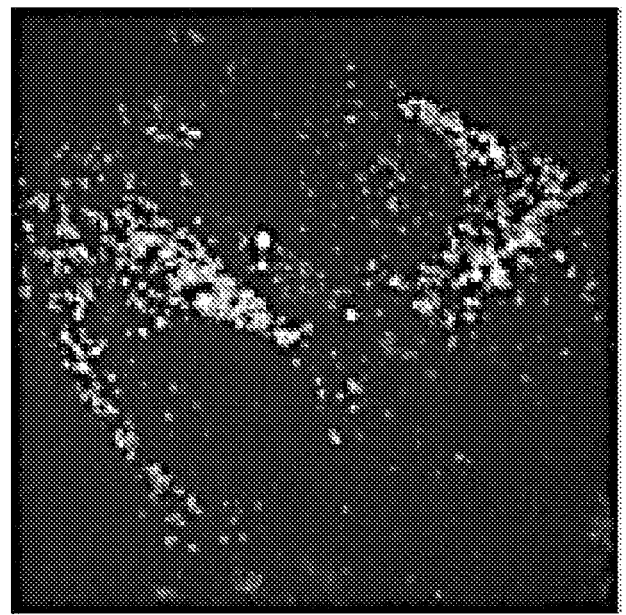

The efficiency of PMO delivery and their persistence in cells was determined by delivering fluorescently labeled PMOs and imaging cells for multiple days. PMOs were taken up by virtually all cells and persisted, either within apparent endosomal structures or released into the cytosol, for more than 3 days (FIGS. 5A, 5B).

Figure 4B:
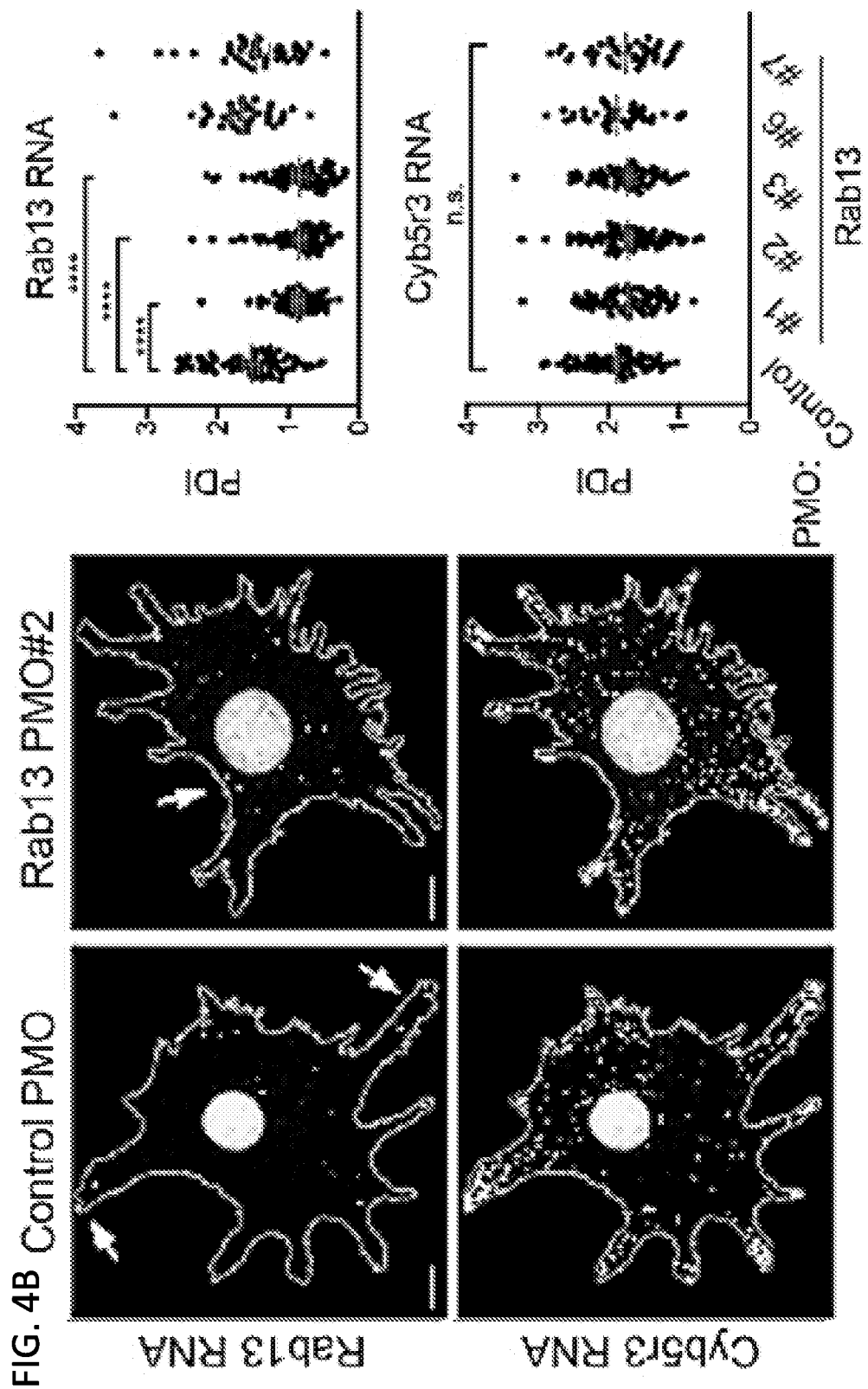

The effect of antisense PMOs on the localization of the Rab13 RNA was assessed, 3 days after PMO delivery, by single-molecule FISH of the endogenous Rab13 RNA and PDI calculation. Cells exposed to the control PMO exhibited peripheral localization of Rab13 RNA. Similarly, the Rab13 #6 and #7 PMOs (SEQ ID NOS: 4 and 5) did not affect Rab13 RNA distribution (FIG. 4B). However, PMOs targeting the RGAAGRR motifs (PMOs #2 and #3, SEQ ID NOS: 2 and 3, respectively) caused a pronounced mislocalization of the Rab13 RNA towards the perinuclear cytoplasm, evidenced by a significant reduction in PDI values (FIG. 4B). Interestingly, the Rab13 PMO #1 (SEQ ID NO: 1), which targets the adjacent GA-rich region, disrupted localization to a similar extent, indicating that apart from the RGAAGRR motifs, additional GA-rich sequences are important for localization or that the overall structure of this region is important. Notably, within the same cells, another APC-dependent RNA, Cyb5r3, maintained its localization at protrusions under all conditions. Therefore, PMOs against the GA-rich region of the Rab13 RNA specifically perturb Rab13 RNA localization at protrusions.

Figures 4C, 4D:
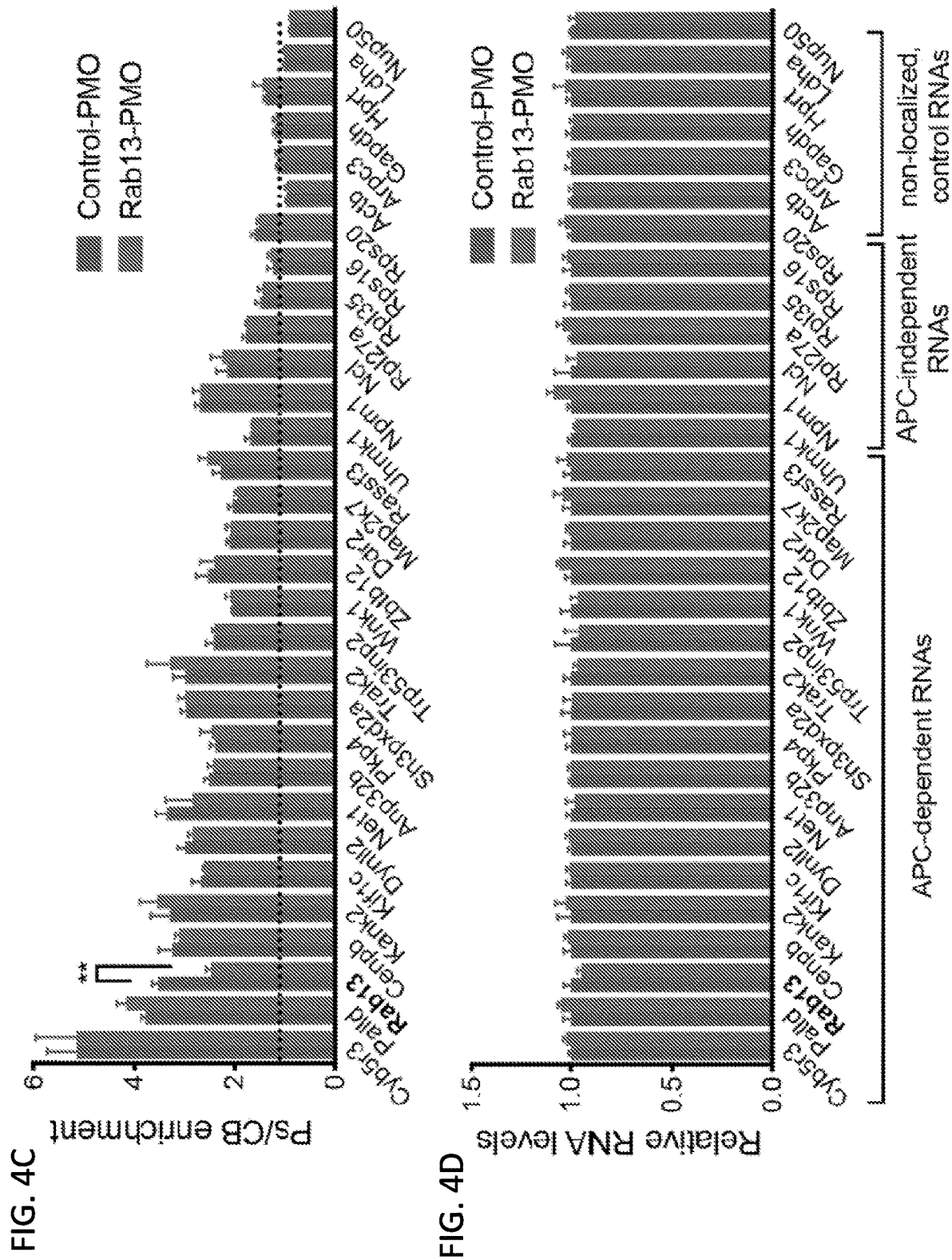

To more extensively investigate the specificity of the observed effect, the distribution of a panel of ~20 APC-dependent RNAs, as well as of several APC-independent RNAs, which are also enriched at protrusions through a distinct pathway (Wang et al., 2017) were assessed. Specifically, protrusions and cell bodies were fractionated and the degree of enrichment of various RNAs at protrusions measured using nanoString analysis. As described previously (Wang et al., 2017), in control cells APC-dependent RNAs are enriched at protrusions, and their enrichment is more pronounced than that exhibited by APC-independent RNAs (FIG. 4C). Importantly, cells treated with a mislocalizing Rab13 PMO exhibited indistinguishable distributions for all RNAs tested, with the notable exception of the targeted Rab13 RNA, which became significantly less enriched at protrusions, corroborating and extending the FISH analysis described above (FIG. 4B).

Based on these observations, it was concluded that antisense PMOs against the Rab13 GA-rich region specifically alter the distribution of the Rab13 RNA without impacting the distribution of other RNAs, even those belonging to the same co-regulated group.

Figure 6:
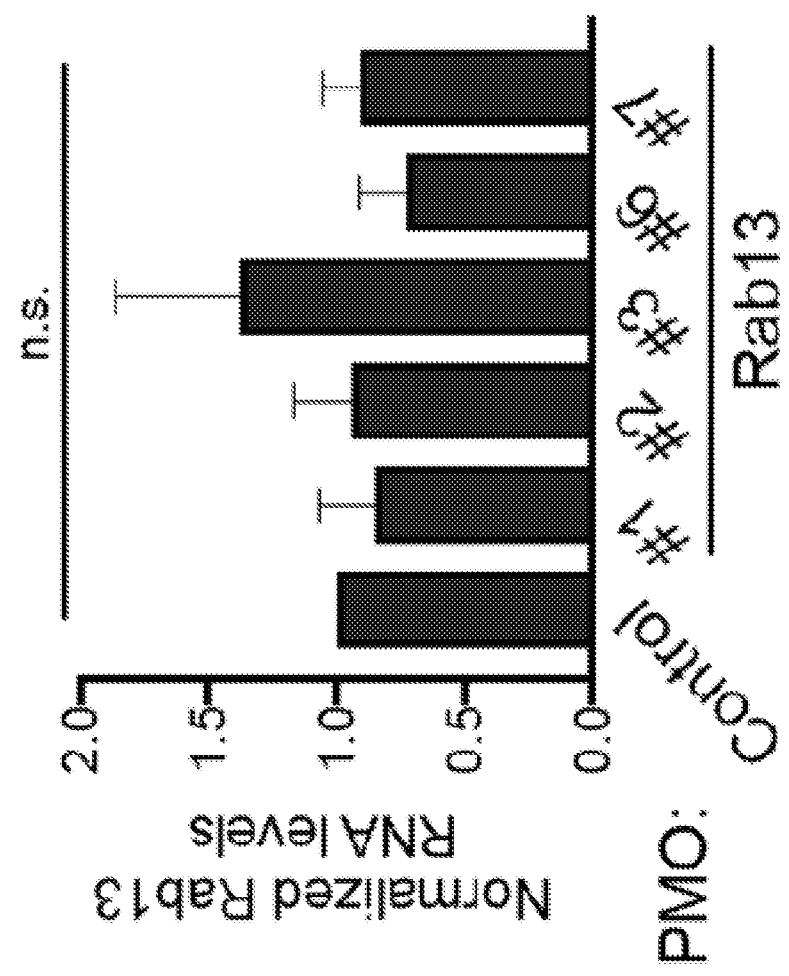
FIG. 6: Rab13 PMOs do not affect Rab13 RNA levels. The indicated PMOs (SEQ ID NO: 1, 2, 3, 4 or 5, respectively) were delivered into mouse fibroblast cells. Rab13 RNA levels were assessed by RT-ddPCR and normalized to housekeeping RNA levels. n.s.: not significant by one-way ANOVA.

The overall abundance of the same panel of RNAs was measured. PMO oligos do not trigger RNase H activity, and consistent with that no detectable change in the total levels of either the Rab13, or of any other RNA, in cells treated with Rab13 PMOs was observed (FIGS. 4D and 6). Therefore, this approach allows the distribution of the endogenous Rab13 RNA to be specifically altered without affecting its overall abundance in cells.

Example 5

Figure 7B:
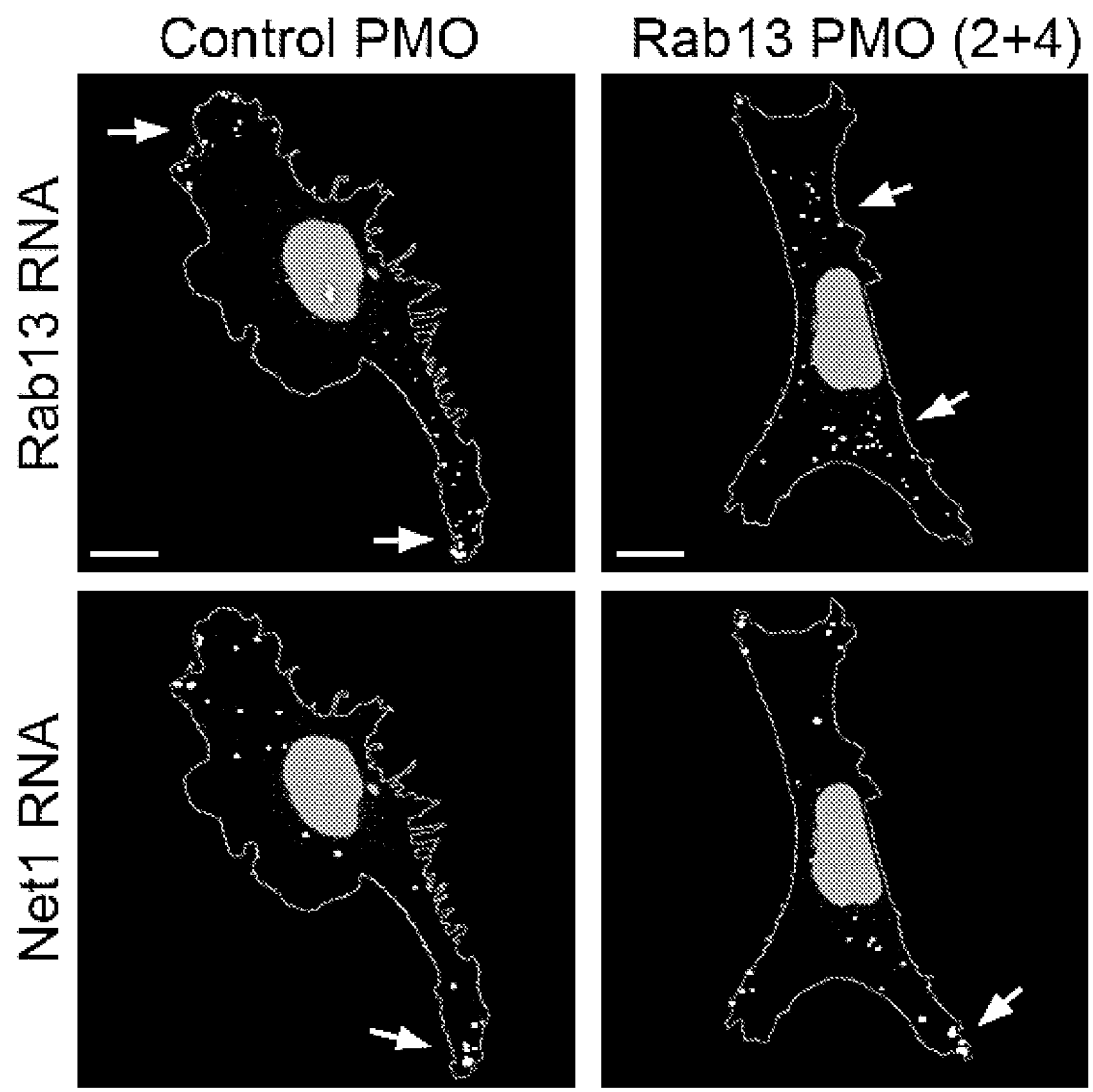

Human Rab13 3'UTR has a Functionally Conserved GA-Rich Region Required for Peripheral Localization Rab13 RNA is localized at protrusive regions in diverse cell types and species. It was determined whether similar sequence determinants supported localization of the human Rab13 transcript. Indeed, plotting of the GA-content along the UTR length revealed a GA-rich region (>75%) in the human Rab13 UTR with similar topology as that of the mouse Rab13 3' UTR sequence (nts 98-268), which additionally contained interspersed RGAAGRR motifs (FIG. 7A).

To determine whether this region exhibits similar functional attributes with regards to RNA localization at protrusions, ASOs targeting across the length of the human Rab13 3'UTR were tested. Oligos targeting either RGAAGRR motifs directly (hsPMO #4, SEQ ID NO: 8; hsRab13-PMO165, SEQ ID NO: 17; HsRab13-210, SEQ ID NO: 18) or adjacent GA-rich regions (hsPMO #2, SEQ ID NO: 7; hsRab13-PMO91, SEQ ID NO: 14; hsRab13-PMO113, SEQ ID NO: 15) significantly affected Rab13 RNA localization, as indicated by a significant decrease in PDI values (FIG. 7A). By contrast, all oligos targeting sites outside of the GA-rich region did not significantly affect Rab13 RNA distribution (FIG. 7A). Using individual PMOs, such as PMO #2 (SEQ ID NO: 7) had a relatively less pronounced effect. However, delivery of both PMOs #2 and #4 (SEQ ID NO: 7 and 8) together had an additive effect resulting in marked Rab13 RNA mislocalization (FIGS. 7A and B). Furthermore, the observed effects were specific for Rab13 RNA since the distribution of another peripherally localized RNA, Net1, was not affected (FIGS. 7A and B). Thus, similar to the observations in mouse cells, interfering with either the RGAAGRR motifs or the adjacent GA-rich regions in human MDA-MB-231 breast cancer cells specifically perturbs the peripheral localization of the Rab13 RNA.

Figure 7C:
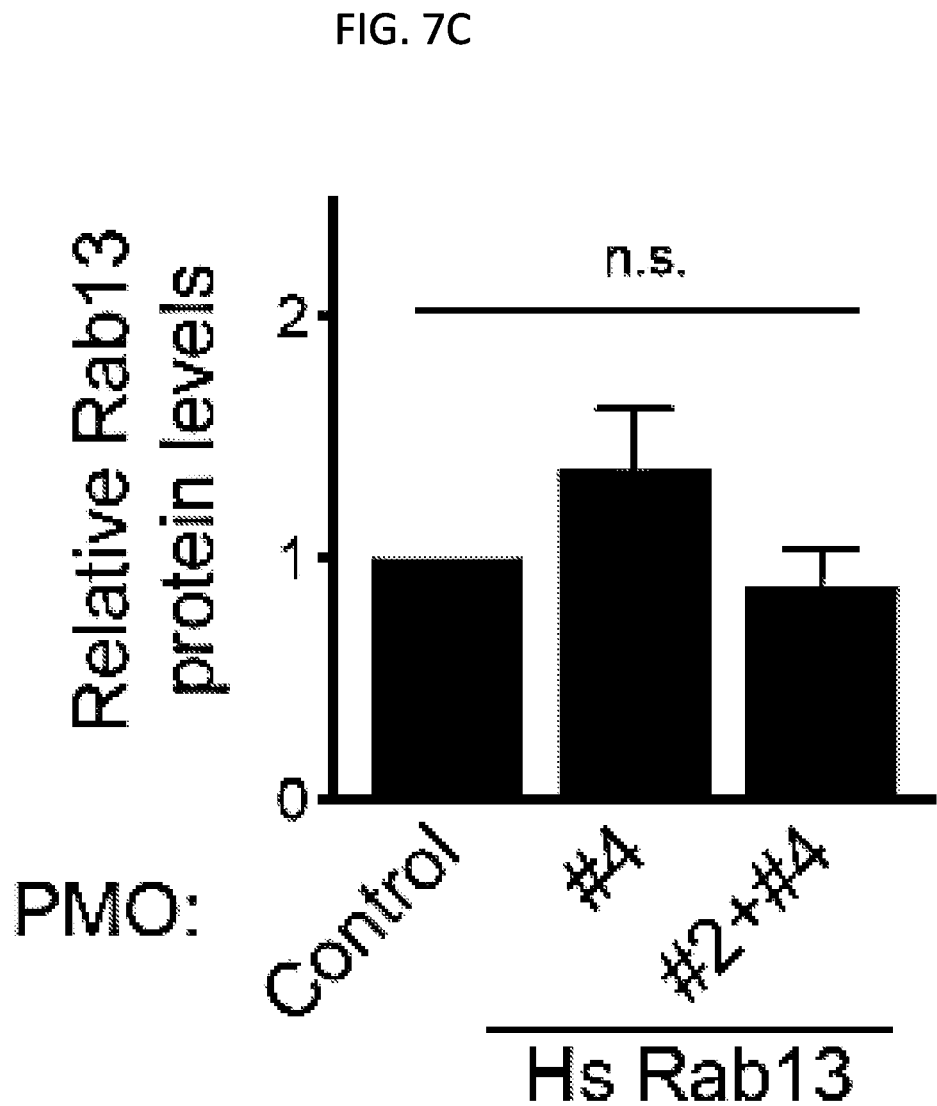

Mislocalization of the Rab13 RNA was not accompanied by any detectable change in the amount of Rab13 protein produced (FIG. 7C). Specifically, the same amount of Rab13 protein is produced in cells exhibiting either peripheral (control PMO) or perinuclear (Rab13 PMO #4 or #2+4) Rab13 RNA distribution. This is consistent with the observation that Rab13 RNA translation is not coordinated with its localization, i.e. the Rab13 RNA is similarly translated in both perinuclear and peripheral regions (Moissoglu et al., 2019). Therefore, the use of ASOs allows for the functional roles promoted by the localization of the Rab13 RNA to be assessed without confounding contributions due to altered protein expression.

Example 6

Peripheral Rab13 RNA Localization is Important for Cell Migration

The Rab13 GTPase is activated at the leading edge of migrating cells and promotes cell migration (Ioannou and McPherson, 2016). To determine if the localization of the Rab13 RNA at protrusive cellular regions is integrated with the function of the Rab13 protein, the effect of Rab13 RNA mislocalization on the ability of cells to migrate was determined. Cells treated with control PMOs or Rab13 PMOs (#2 and #4; SEQ ID NOS: 7 and 8, respectively) were assessed using various assays.

Figure 8A:
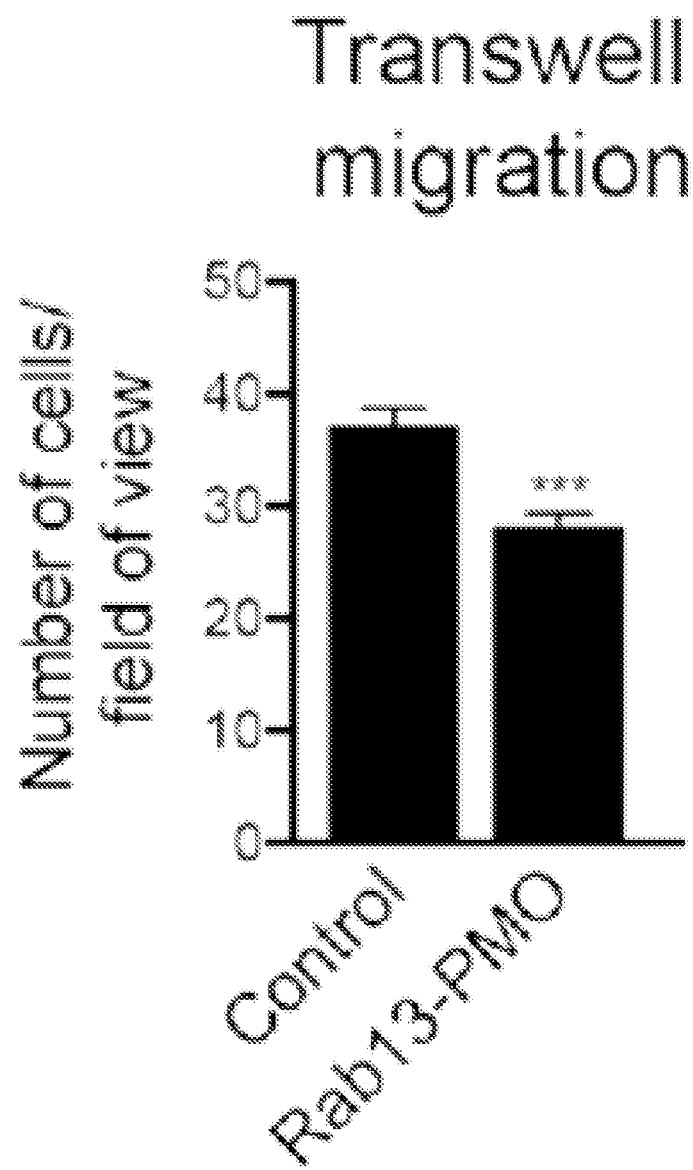
FIGS. 8A-8F: Loss of peripheral Rab13 RNA localization disrupts cell migration and phenocopies acute Rab13 protein loss.

In one experiment, cells plated on microporous Transwell membrane inserts were induced to migrate towards a chemoattractant gradient and the number of cells reaching the bottom surface after 4 hours were counted. Mislocalization of the Rab13 RNA from protrusions significantly perturbed the ability of cells to respond and migrate chemotactically (FIG. 8A).

Figure 8B:
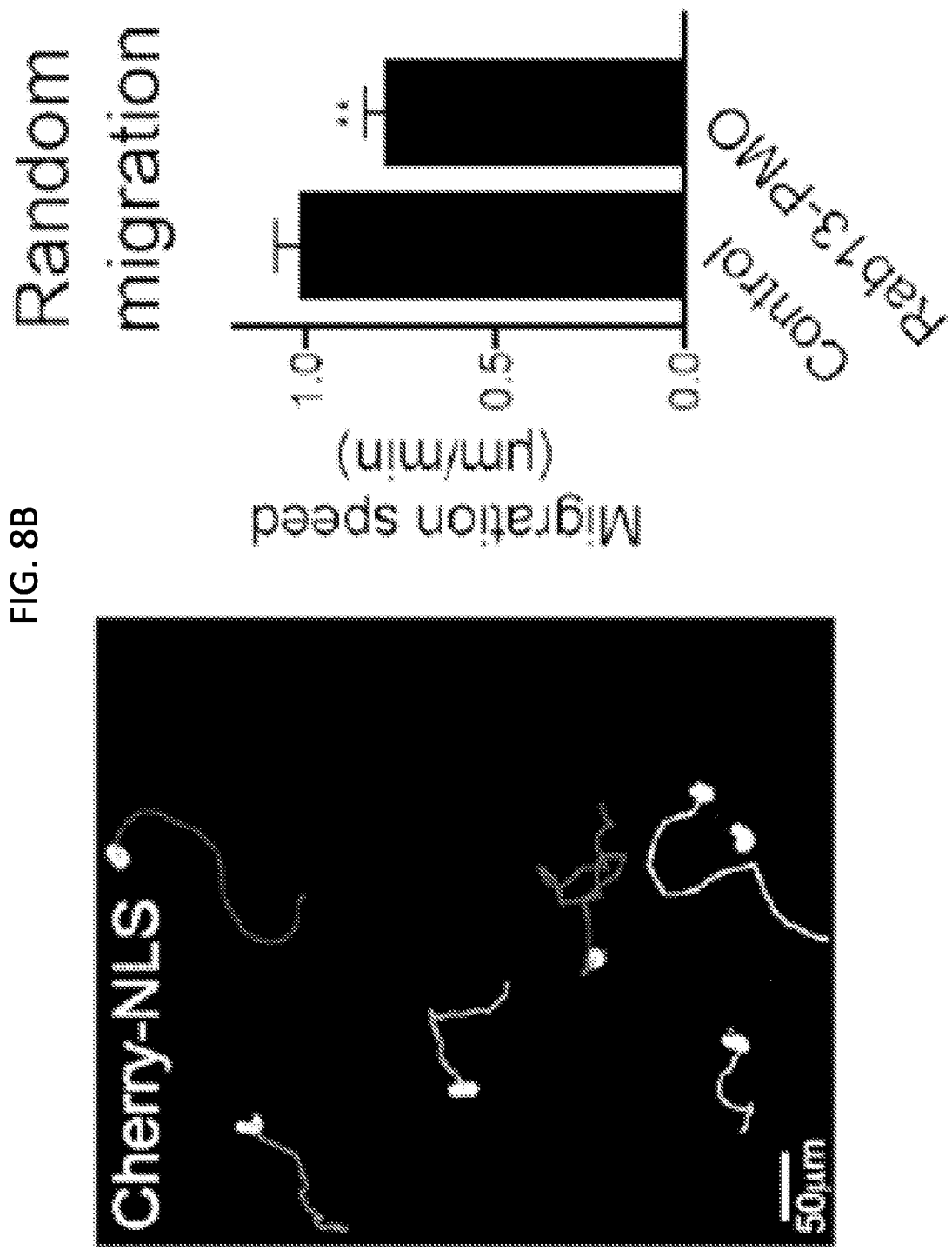

To assess migration parameters of individual cells, single cells expressing Cherry-NLS fluorescent protein to mark nuclei were plated on collagen and were tracked over time to derive their speed and directionality (FIG. 8B). Again, cells containing perinuclear Rab13 RNA exhibited lower migration speeds (FIG. 8B).

Figure 8C:
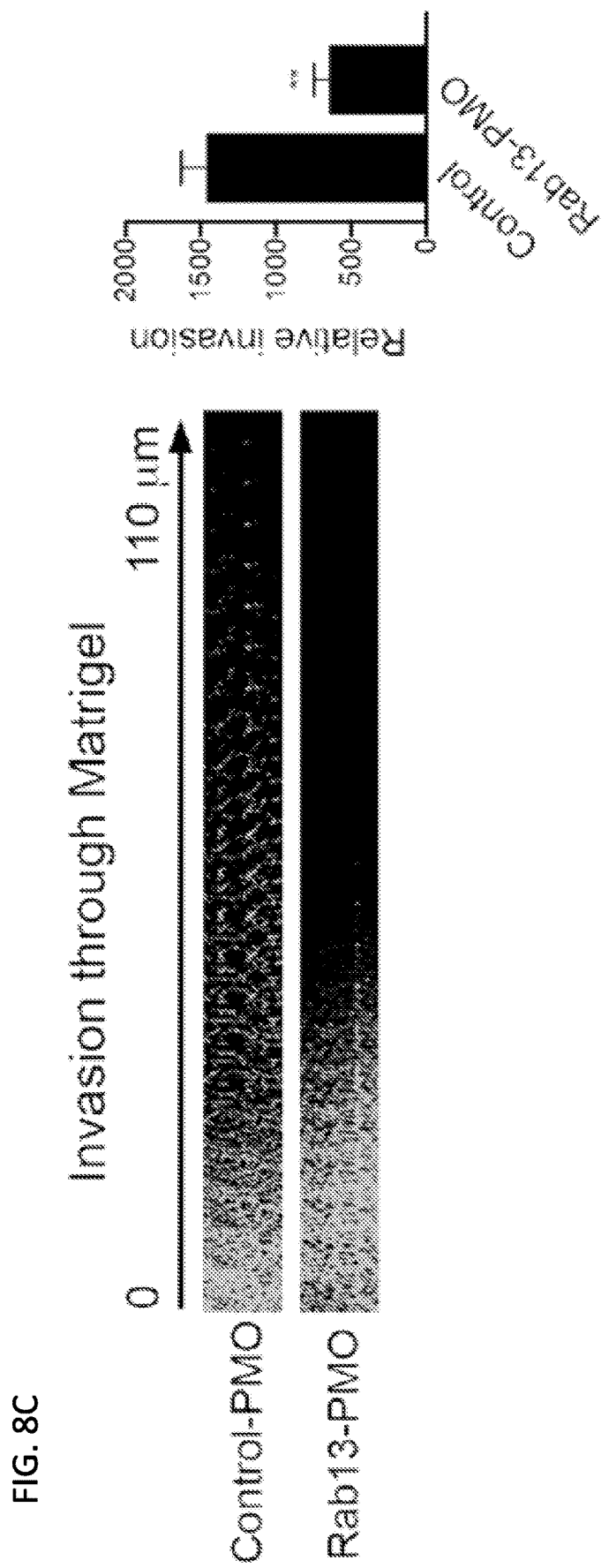

Finally, cells attached on one side of a Matrigel plug were induced to migrate through it towards a chemoattractant in order to assess their ability to invade through a 3-dimensional matrix. Serial imaging sections through the Matrigel were taken for >100 µm to assess the number of cells reaching at various depths. Notably, cells treated with Rab13 PMOs exhibited significantly reduced invasiveness (FIG. 8C). Therefore, peripheral localization of the Rab13 RNA functionally contributes to various cell migration modes.

Figure 8D:
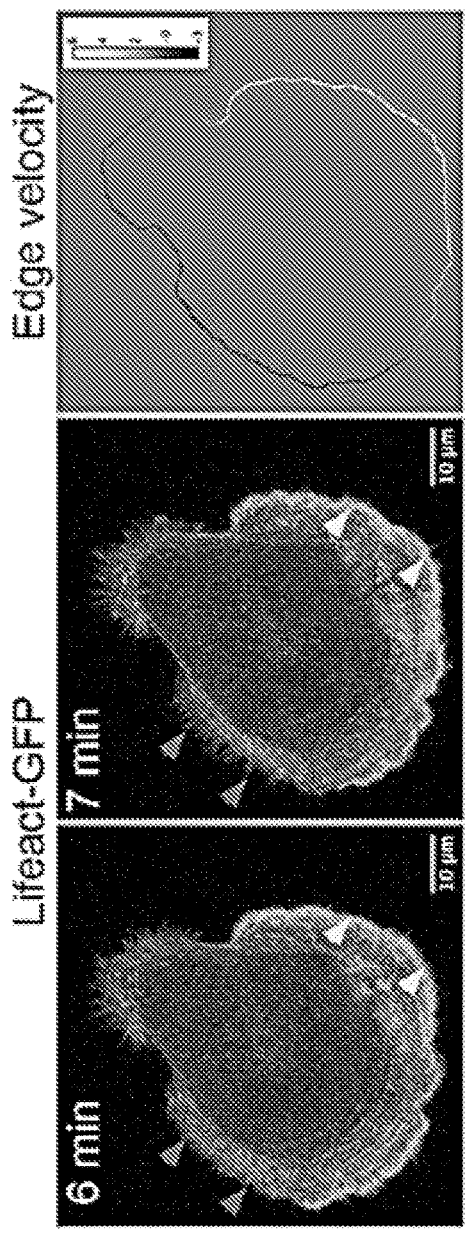
Figure 8D:
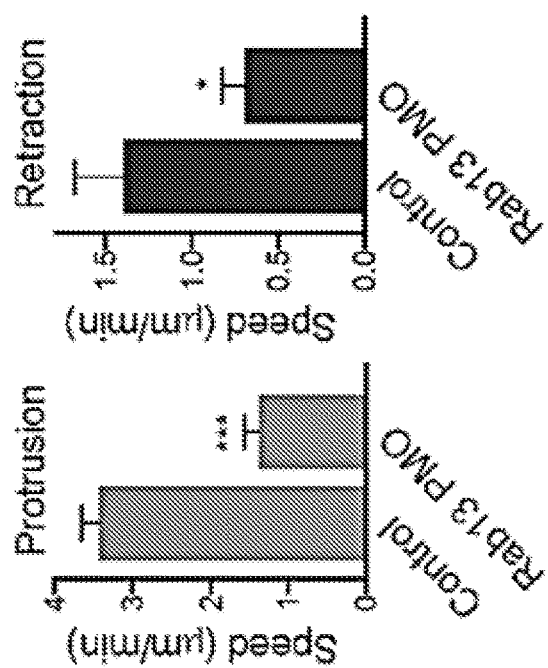

To assess in more detail the molecular mechanisms and polarized behaviors that underlie the observed migration defects, the dynamics of protrusive or retractive cellular regions upon Rab13 RNA mislocalization were examined Specifically, Lifeact-GFP expressing cells were imaged over time and the rate of protrusion extension or retraction was quantified (FIG. 8D). Mislocalization of the Rab13 RNA to perinuclear regions significantly reduced the rate of both protrusion and retraction (FIG. 8D). Therefore, peripheral localization of the Rab13 RNA impacts overall the rate of cytoskeletal dynamics.

Example 7

Figure 8E:
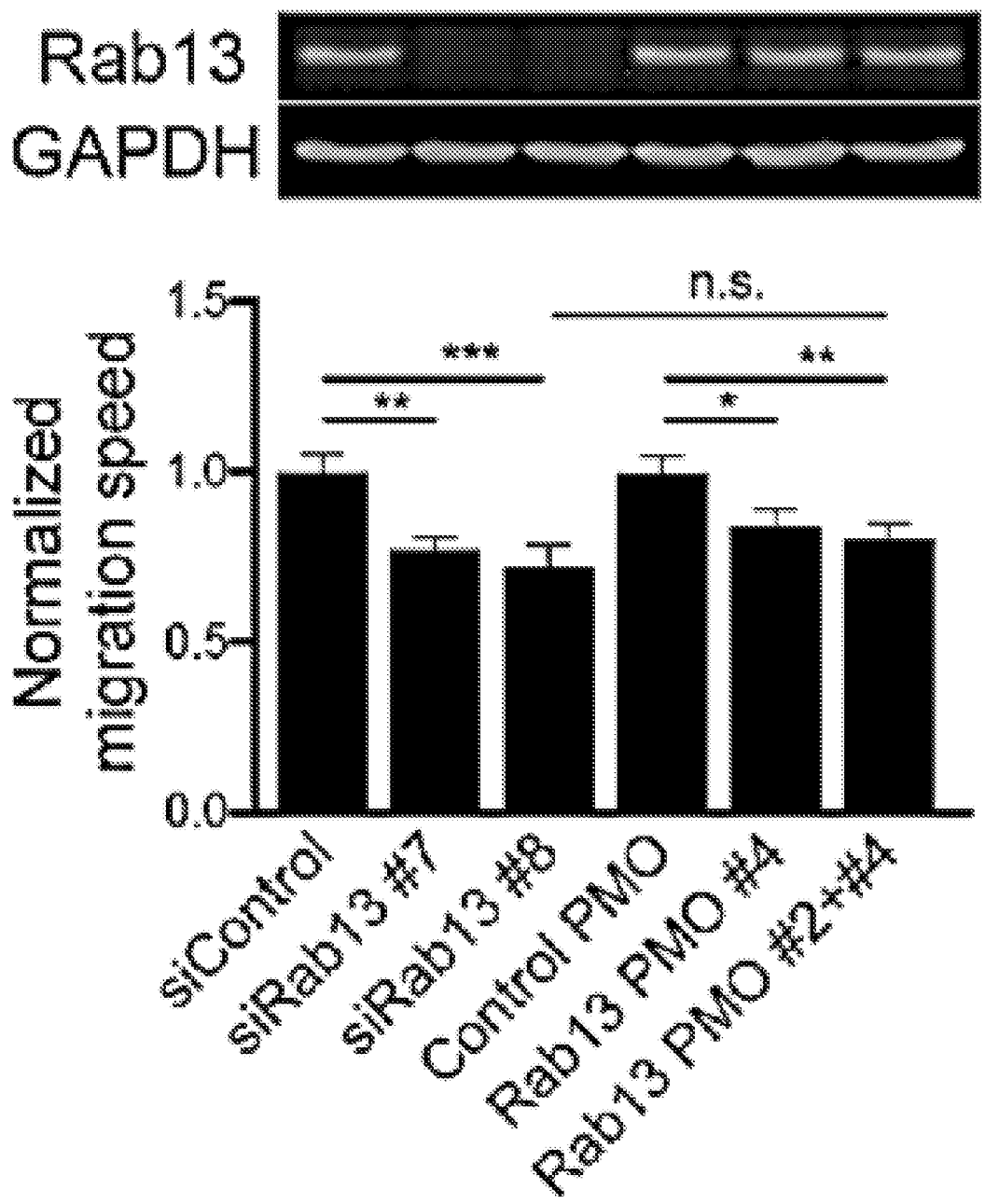
Figure 8F:
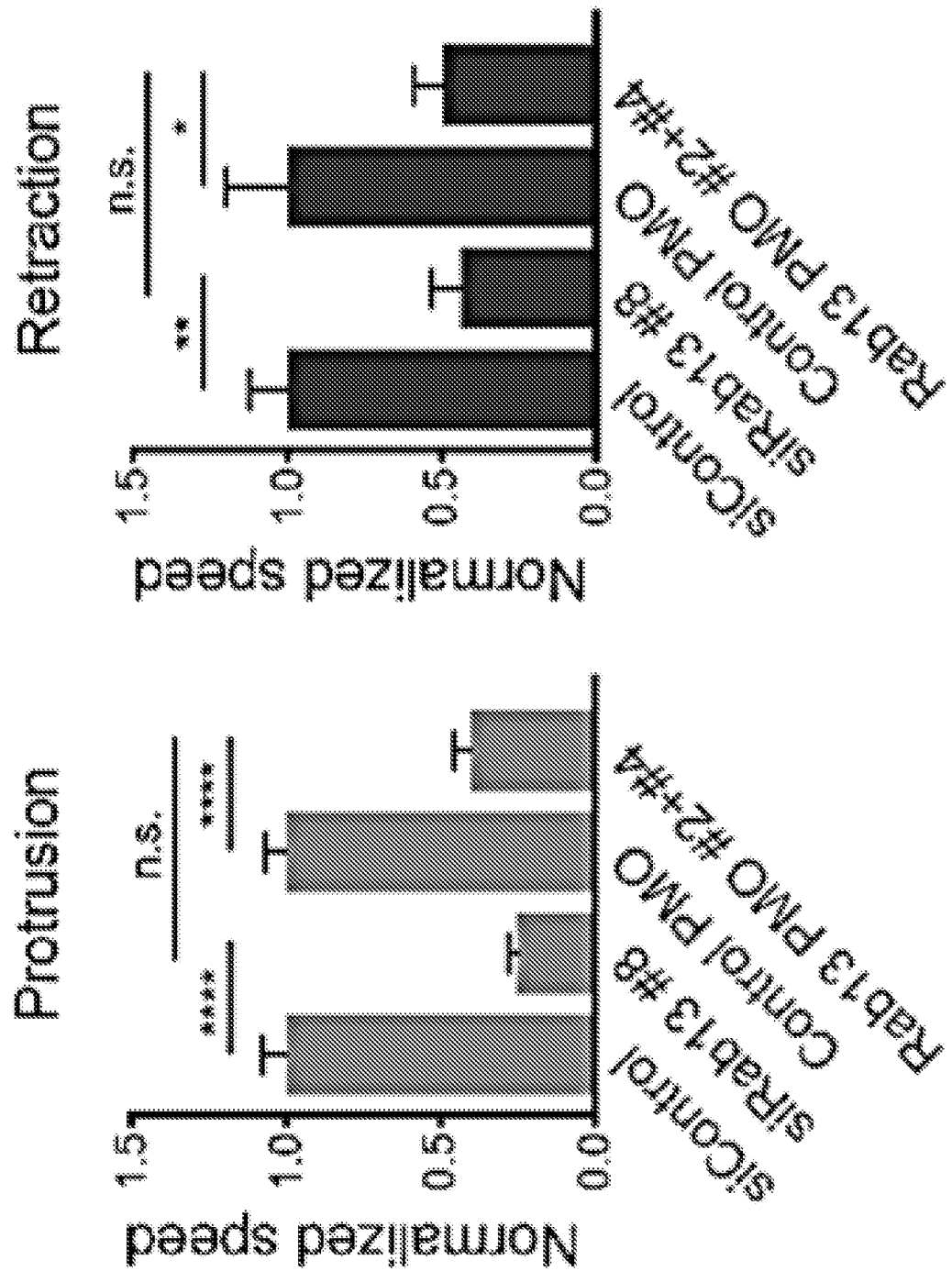

Mislocalization of Rab13 RNA from the Periphery Phenocopies Acute Rab13 Protein Loss The cell migration defects observed upon mislocalization of the Rab13 RNA were remarkable given that the same amount of Rab13 protein was expressed in the cells (FIG. 7C). The extent to which the overall Rab13 function was compromised when its RNA was prevented from reaching the periphery was determined. For comparison, to set a baseline level, Rab13 protein expression was knocked down using siRNAs. Indeed, siRNA transfection reduced Rab13 expression to almost undetectable levels (FIG. 8E). Consistent with prior reports, Rab13 knockdown resulted in reduced migration speed and compromised the rate of both protrusive and retracting motions (FIGS. 8E, 8F). Strikingly, the extent of these defects was similar to that observed with Rab13 RNA mislocalization (FIGS. 8E, 8F). Therefore, while translation of Rab13 RNA in a perinuclear location gives rise to the same amount of Rab13 protein product, the resulting protein is virtually non-functional towards cell migration, phenocopying the effect observed by an almost complete Rab13 protein loss.

Example 8

Figure 9A:
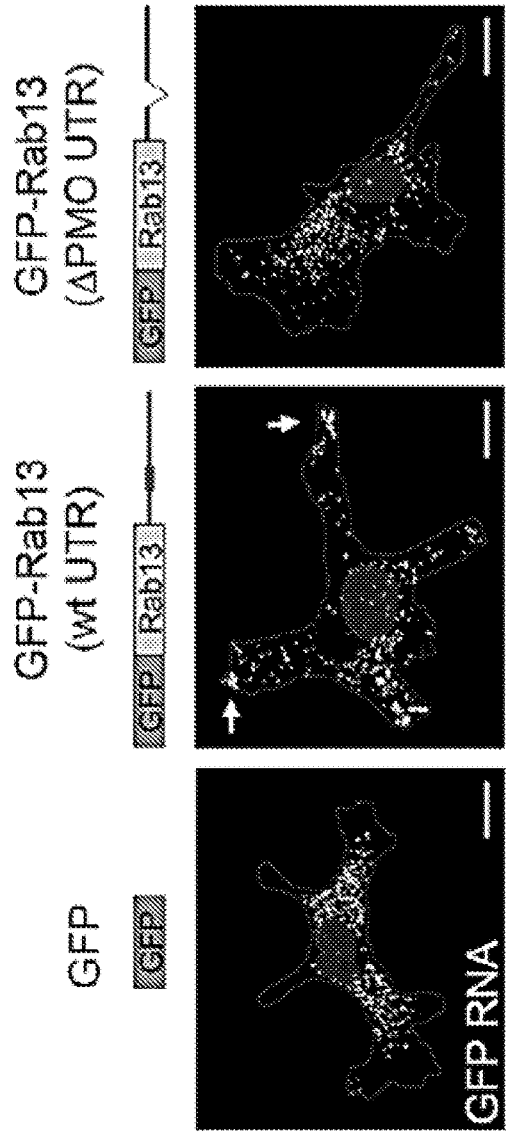
FIGS. 9A-9D: Peripheral localization of exogenous Rab13 does not affect Rab13 RNA stability or translation.
Figure 9A:
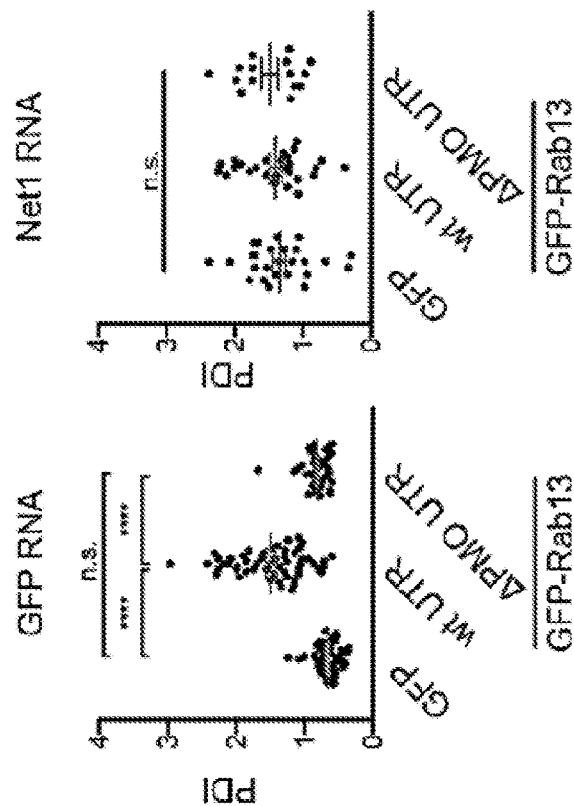
Figure 9B:
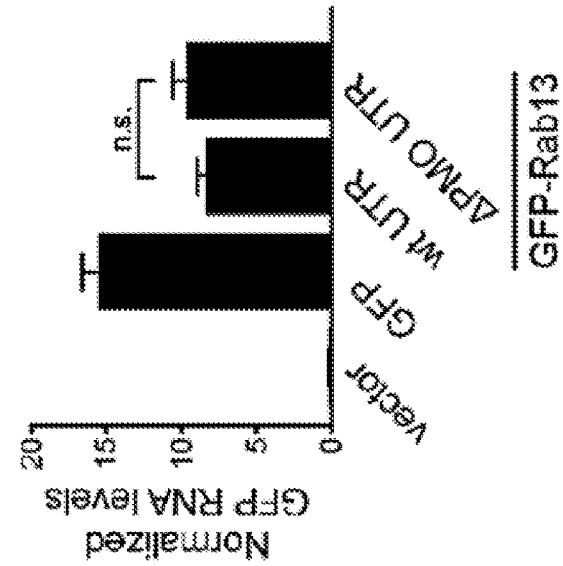
Figure 9C:
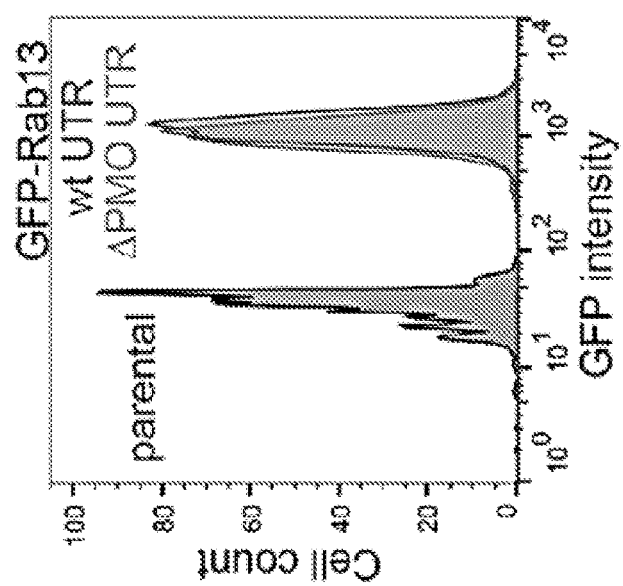
Figure 9D:
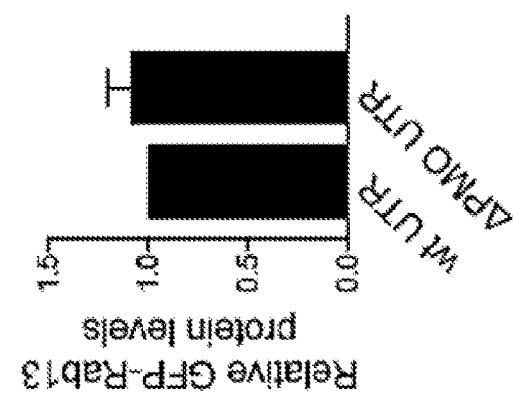

Peripheral Rab13 RNA Translation is Required for Rab13 Protein Activation but not Steady State Distribution or Membrane Association To understand this striking effect, it was determined how perinuclear versus peripheral translation affects the encoded Rab13 protein. To further confirm that any observed effects are due to changes in Rab13 RNA distribution, and not due to other potential non-specific consequences of PMO delivery, exogenously expressed Rab13 protein was examined Specifically, GFP-Rab13 was expressed from a construct that carries the full length, wild-type Rab13 3'UTR or from a construct that carries the same UTR with a deletion of a 52 nt region that corresponds to the GA-rich region targeted by the Rab13 PMOs (APMO) (FIG. 9A). FISH analysis showed that the exogenous wild-type Rab13 RNA achieved a peripheral localization, while peripheral localization of the APMO Rab13 RNA was significantly abrogated and was similar to the localization of GFP RNA (FIG. 9A). Exogenous GFP-Rab13 RNAs were expressed at similar levels (FIG. 9B) and did not affect the localization of another endogenous RNA (Net1; FIG. 9A). Furthermore, the amount of GFP-Rab13 protein produced from the two constructs was indistinguishable, as assessed by Western blot analysis or flow cytometry of GFP expression (FIGS. 9C, 9D).

Figure 10A:
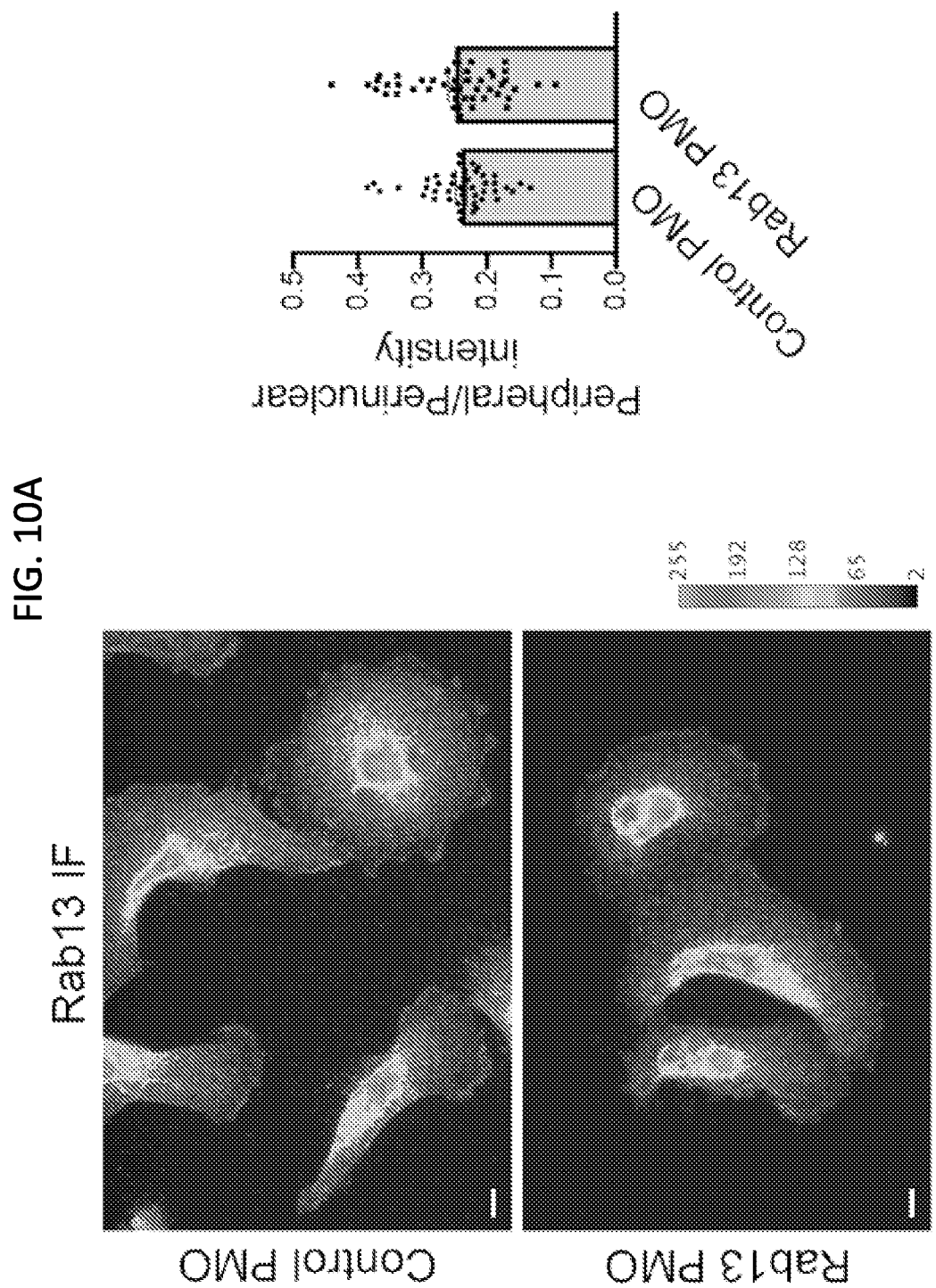
FIGS. 10A-10E: Peripheral Rab13 RNA translation is required for Rab13 protein activation but not steady state distribution or membrane association.
Figure 10B:
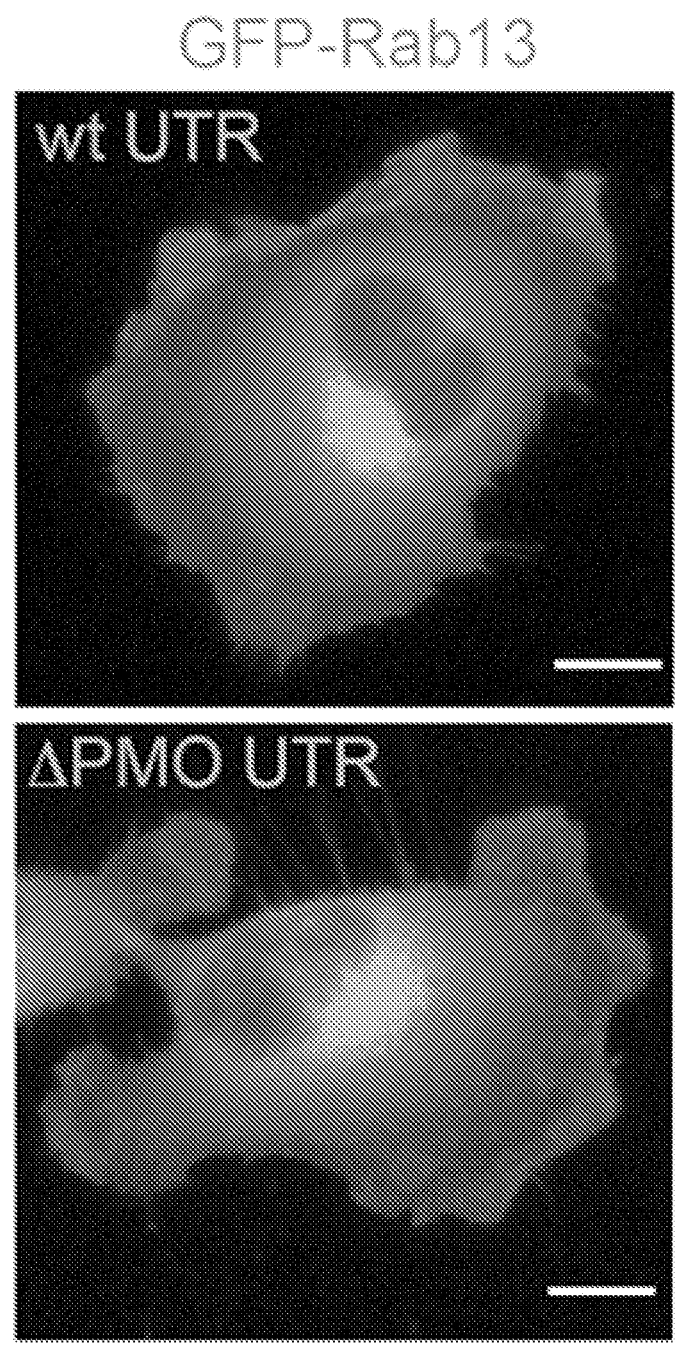
Figure 10C:
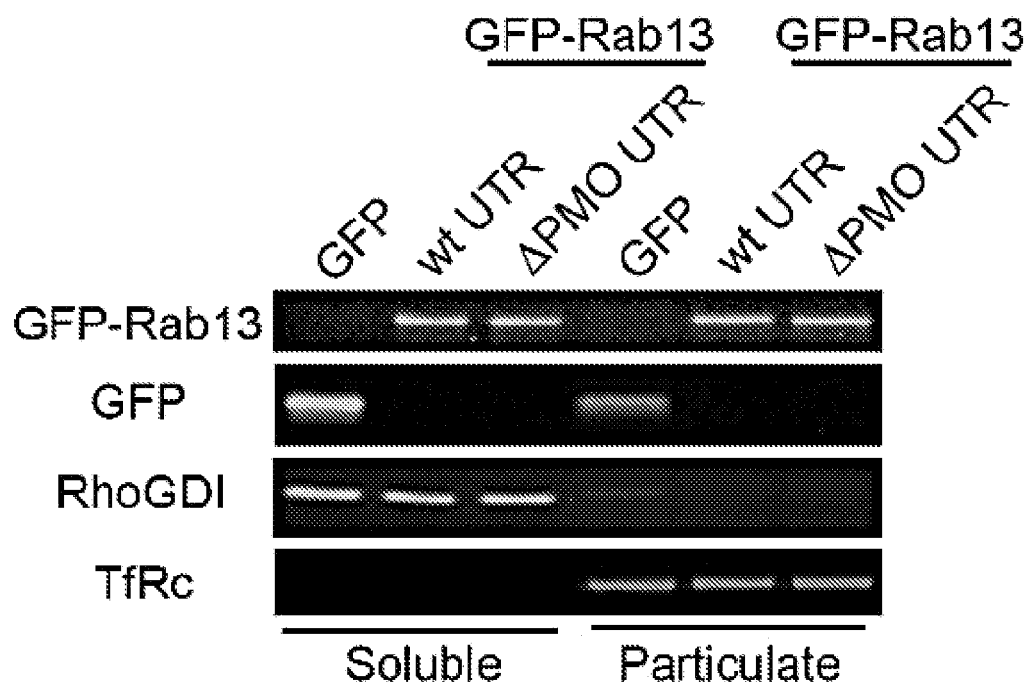
Figure 10C:
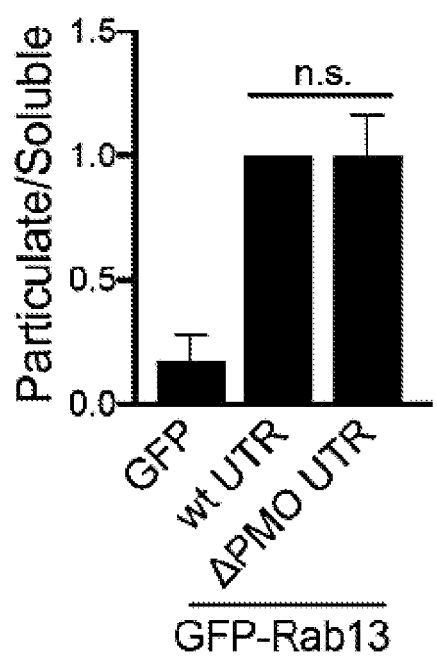
Figure 11A:
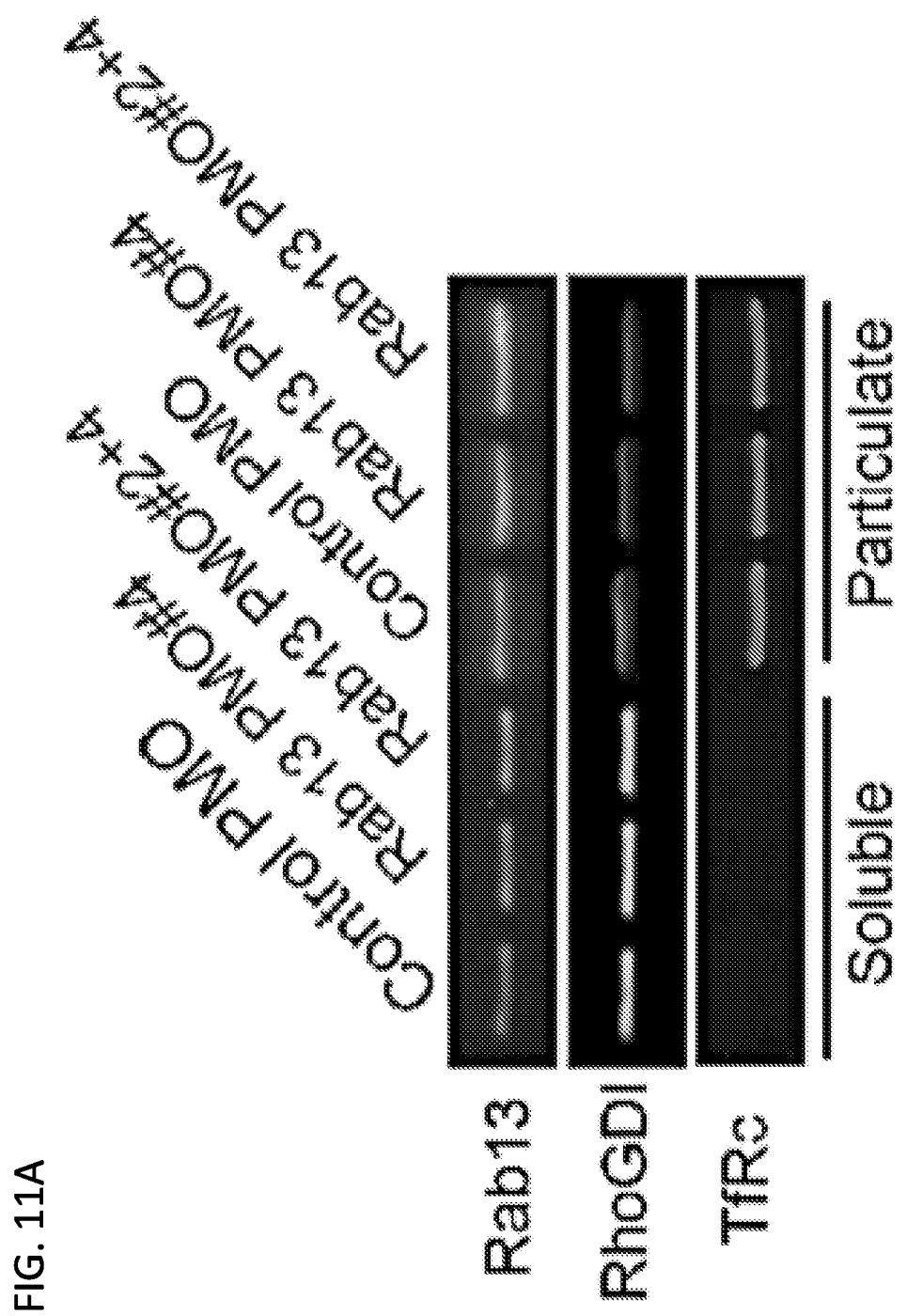
FIGS. 11A-11B: Rab13 RNA mislocalization does not affect binding to membranes or association with REP-1 or RabGDI.
Figure 11B:
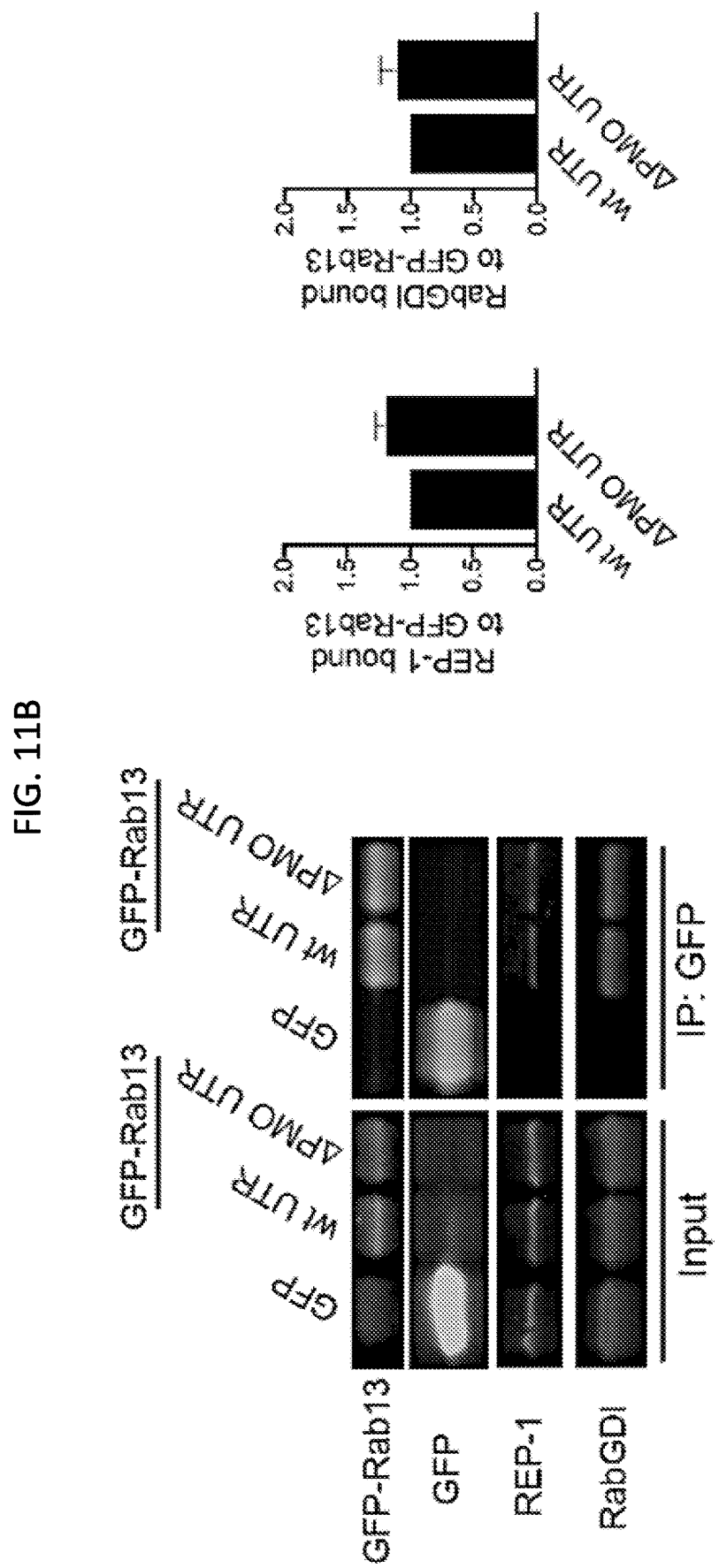

Interestingly, the steady-state localization of Rab13 protein was not impacted upon changing the location of its translation. Endogenous Rab13 protein assumed the same membranous and perinuclear distribution upon PMO delivery (FIG. 10A). Similarly, exogenous GFP-Rab13 showed identical distribution regardless of where its RNA was localized (FIG. 10B). Because Rab GTPases associate with membranes to control vesicle trafficking, whether association of Rab13 with membranes was affected by the location of translation was examined Cells were permeabilized with digitonin and soluble and particulate fractions isolated. Both endogenous and exogenous Rab13 protein associated similarly with the particulate fraction regardless of where the encoding RNA was enriched (FIGS. 10C and 11A). Furthermore, consistent with the observed similar association with the membrane fraction, Rab13 protein translated peripherally or perinuclearly associates to the same extent with the Rab escort protein REP-1 (FIG. 11B), an interaction required for prenylation of Rab GTPases (Leung et al., 2006a). Furthermore, both Rab13 forms interact similarly with RabGDI (FIG. 11B), a protein that extracts Rab GTPases from membranes and maintains them soluble in the cytoplasm (Muller and Goody, 2018). Therefore, despite the pronounced functional defect exhibited upon Rab13 RNA mislocalization, at least some of the properties and interactions of the Rab13 protein are not affected.

Figure 10D:
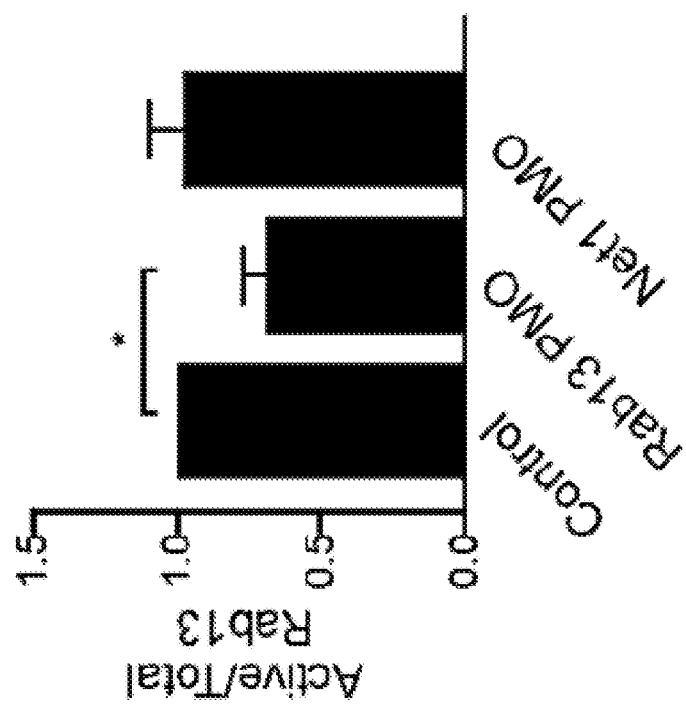
Figure 10D:
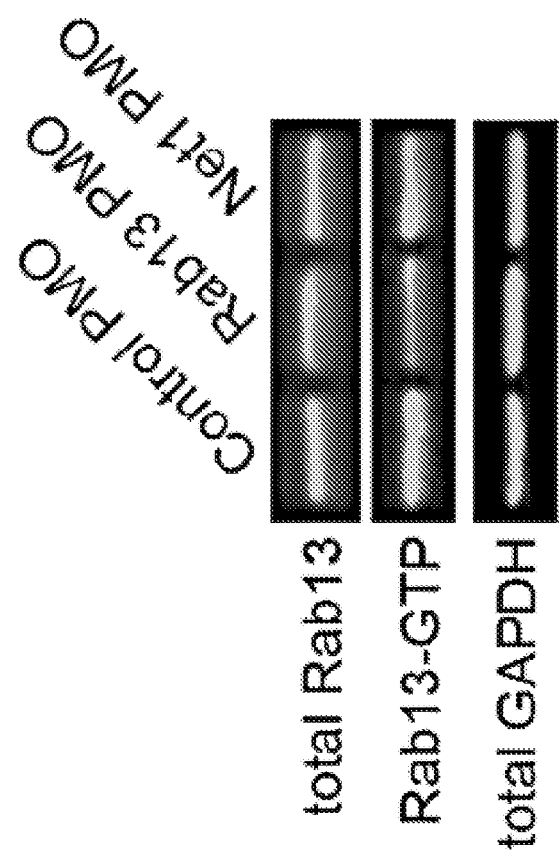
Figure 10E:
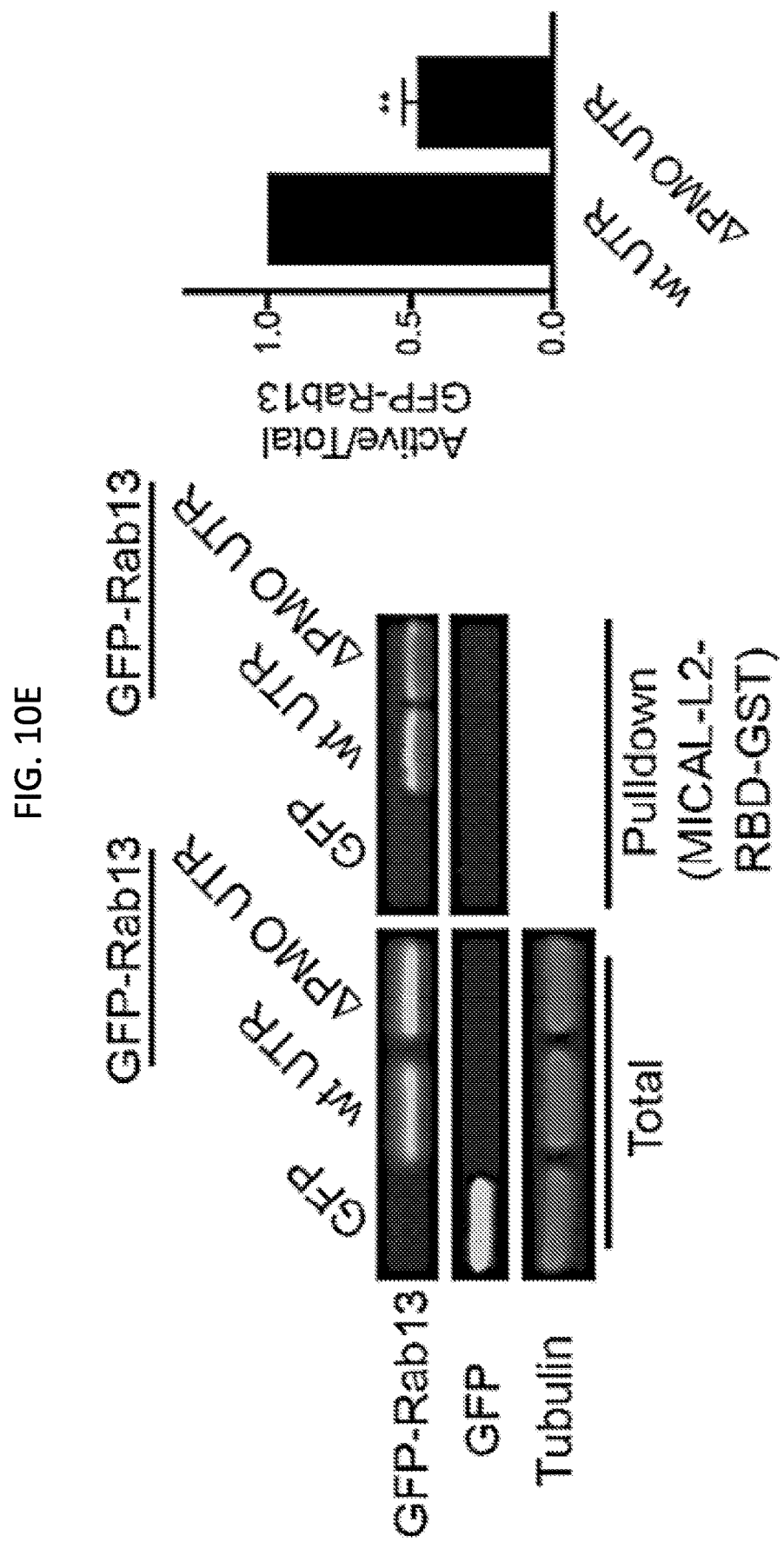

It was determined whether perinuclear translation affects Rab13 activity. Active Rab proteins are loaded with GTP, which promotes their binding to effector molecules. Therefore, the degree of effector binding was to assess the level of active Rab GTPases. Rab13 GTPase activity was assessed through measuring its ability to interact with the Rab13-binding domain (RBD) of its effector protein MICAL-L1 (Ioannou et al., 2015). Endogenous Rab13 produced from a perinuclear RNA (Rab13 PMO cells) exhibited significantly reduced activity compared to peripherally translated Rab13 protein (control PMO cells or cells treated with PMOs against the unrelated Net1 RNA) (FIG. 10D). Pulldown assays with the MICAL-L1-RBD also revealed that the exogenous GFP-Rab13 protein expressed from a perinuclearly localized RNA had significantly less activity compared to the wild type protein (FIG. 10E). Therefore, Rab13 activity and thus protein function is partly determined by the subcellular location of Rab13 RNA translation.

Example 9

Antisense Oligonucleotides Against 3'UTR of Net1 Specifically Interfere with Localization of the Net1 RNA and Reduce Cell Migration The examples above describe the identification of particular sequences within the Rab13 3'UTR that are important for localization of this RNA at cell protrusions, and the discovery that antisense morpholino oligonucleotides against them can disrupt this localization (FIGS. 4 and 7) and lead to reduced cell migration and invasion of breast cancer cells (FIG. 8).

Figure 12:
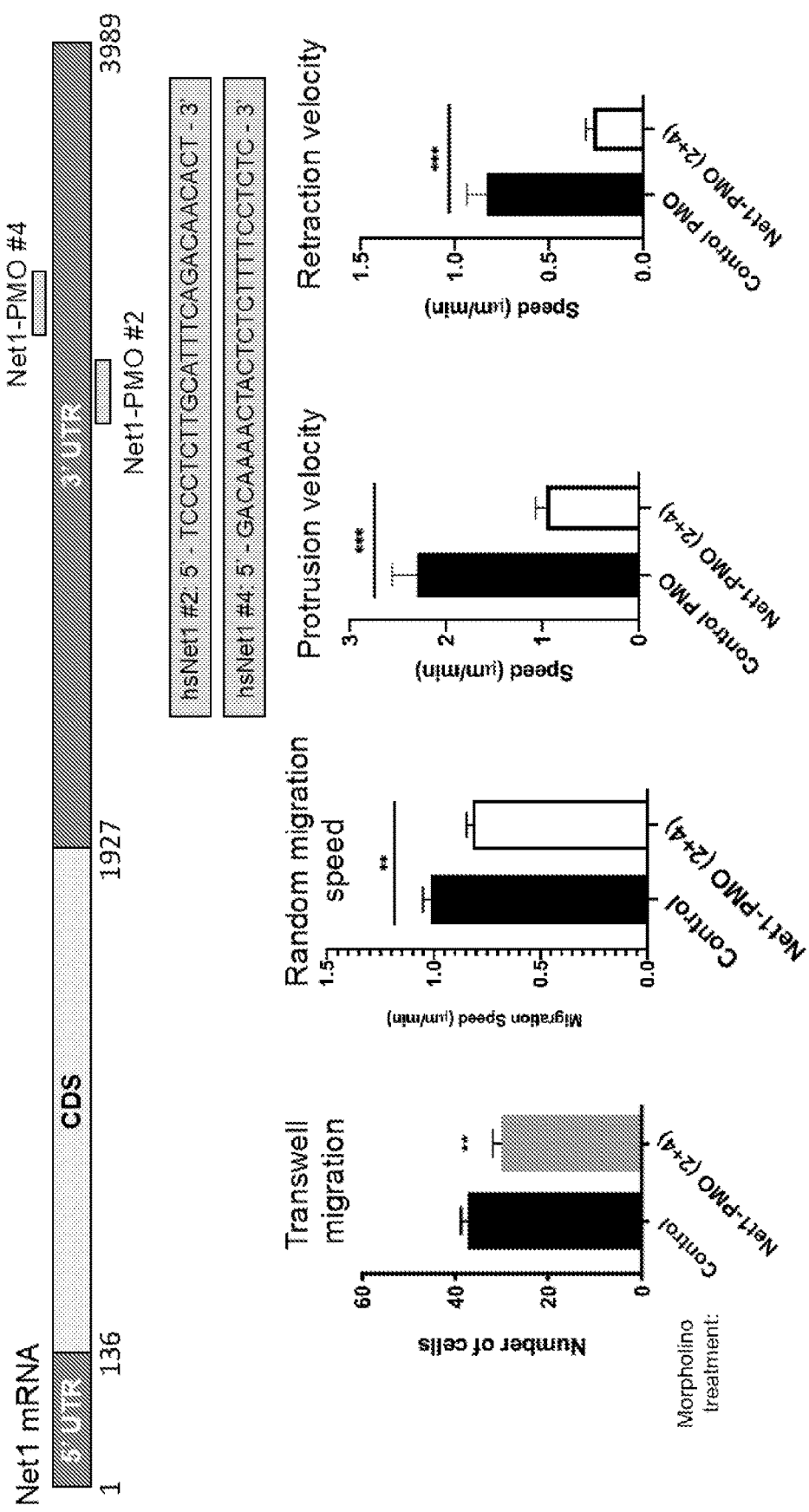
FIG. 12: The sequences of the ASOs used (Net1-PMO #2 and #4, SEQ ID NOs: 9 and 10, respectively) and the sites within the Net1 3'UTR where they hybridize are shown. Delivery of Net1 ASOs reduces cell migration of MDA-MB-231 breast cancer cells in a Transwell assay; it reduces their speed during random migration on a collagen-IV-coated coverglass; and the speed of edge protrusion and retraction measured through time-lapse imaging of Lifeact-expressing cells.

Similar results were obtained for Net1 RNA expressed in breast cancer cells, using the methods provided in Example 1. PMOs against human Net1 3'UTR (TCCCTCTTGCATTTCAGACAACACT, SEQ ID NO: 9; and GACAAAACTACTCTCTTTTCCTCTC, SEQ ID NO: 10) specifically disrupt its localization at cell protrusions and reduce the ability of cells to migrate and extend protrusions (FIG. 12).

Figure 13:
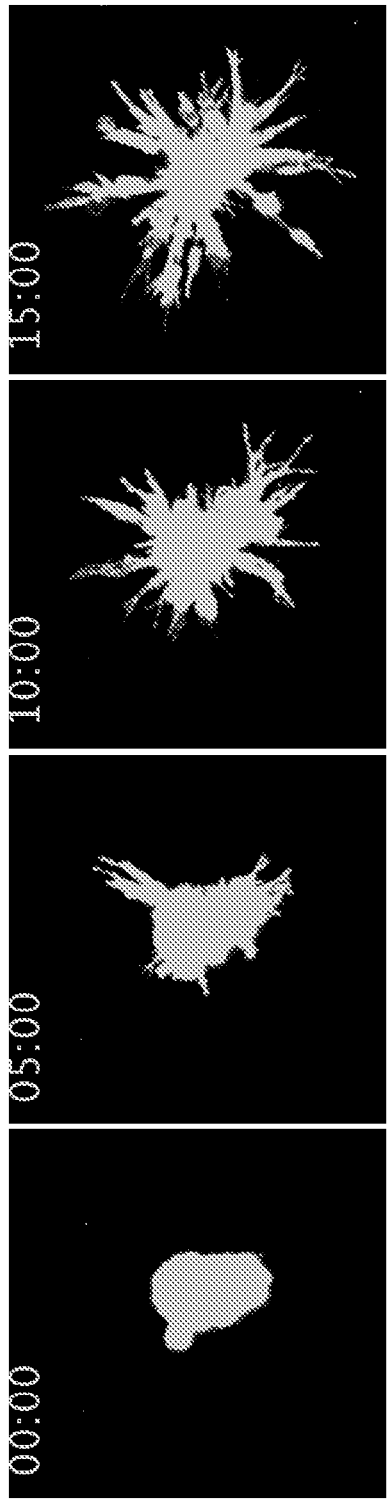
FIG. 13: Multicellular spheroids of MDA-MB-231 breast cancer cells were embedded within 3-dimensional Matrigel. They were induced to invade and imaged over time. Top images show individual movie frames and time in hours:minutes. To measure invasiveness a binary mask of each spheroid was obtained, and a 'complexity' metric was derived (higher complexity values indicate more invasiveness). Graph to the right presents complexity values of multiple spheroids treated with the indicated PMOs. PMOs against Net1 or Rab13 reduce invasiveness.
Figure 13:
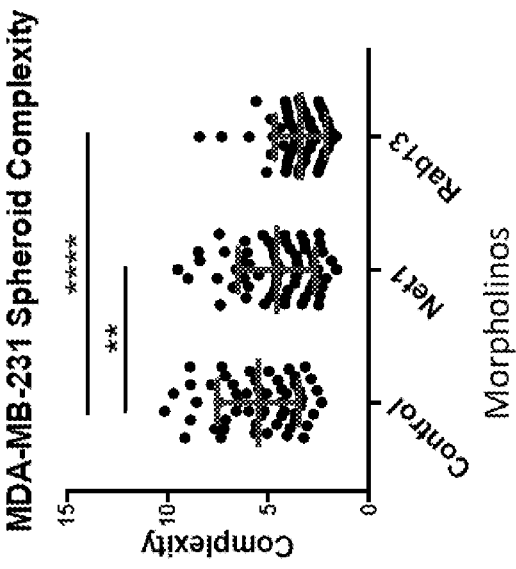
Figure 13:
Figure 14:
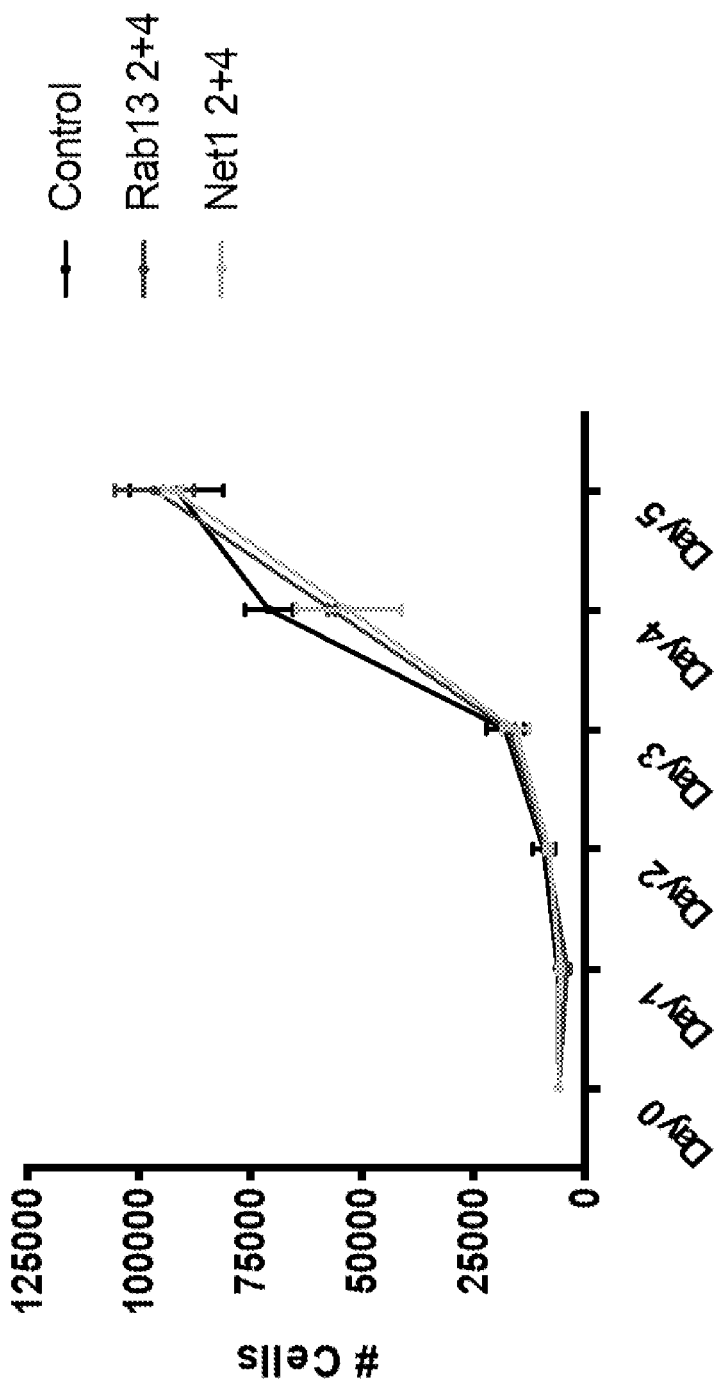
FIG. 14: Cell proliferation assay of MDA-MB-231 cells treated with the indicated PMOs.

To demonstrate these PMOs have a similar effect under conditions that more closely mimic the physiologic situation, their effect during invasion of multicellular spheroids of cancer cells into a 3-dimensional matrix mimicking the extracellular environment was tested. Delivery of Rab13 or Net1 PMOs reduces the invasive ability of multicellular cancer spheroids (FIG. 13). PMOs affect cell migration without having toxic effects, as assessed by the ability of cells to proliferate to similar extents (FIG. 14).

Example 10

Figure 16A:
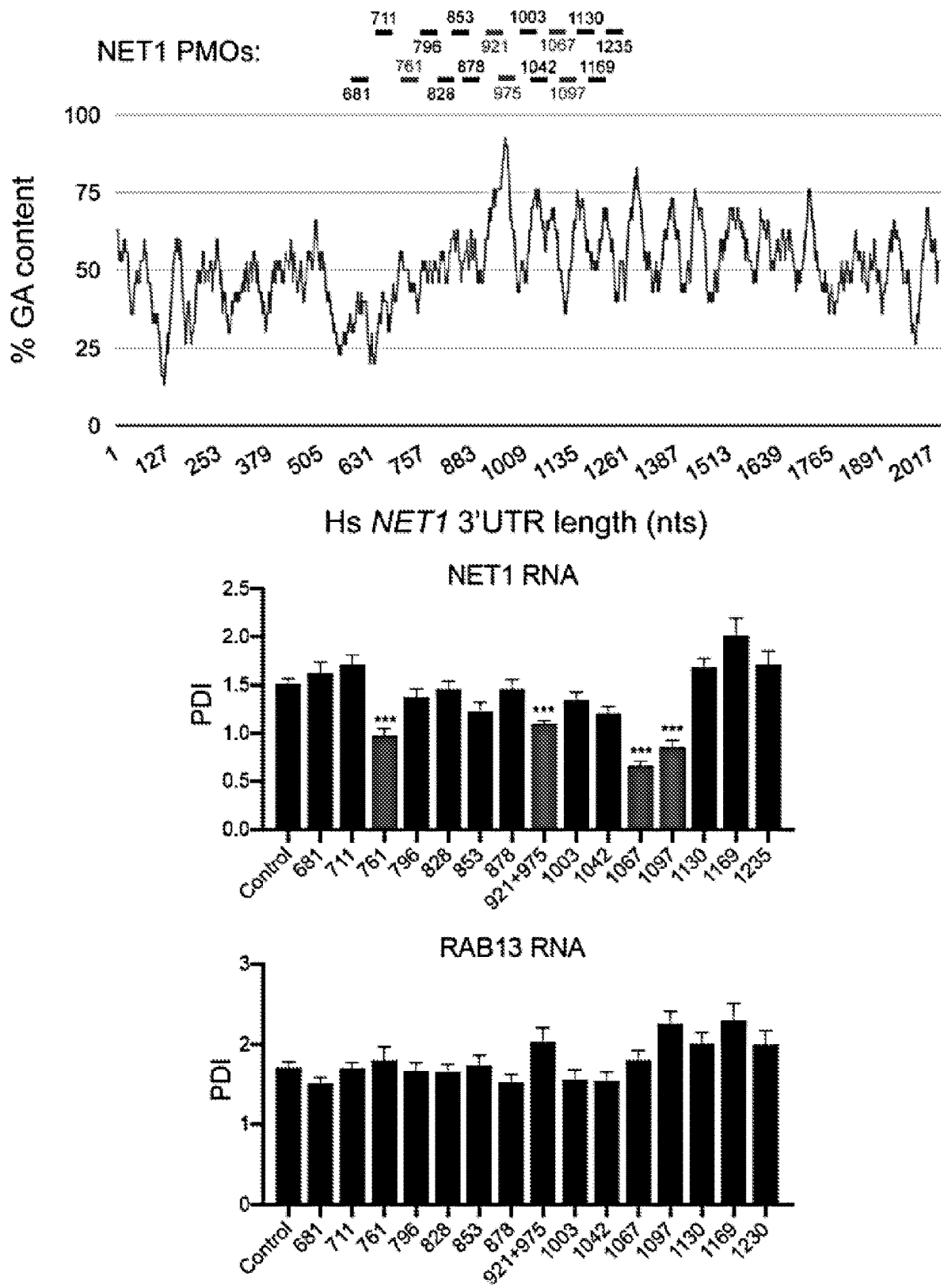

Antisense Oligonucleotides that Disrupt Net1 RNA Localization and Cell Migration Antisense morpholino oligonucleotides (PMOs) targeting GA-rich regions of the human NET1 3'UTR (FIG. 16A, upper graph) were tested for their capacity to inhibit Net1 RNA localization and cell migration. MDA-MB-231 cells were treated with the indicated Net1-targeted PMOs (and Rab13-specific PMOs as a control) and distribution of the PMOs was evaluated by measuring PDI (FIG. 16A, middle and lower graphs). A PDI=1 indicates a diffuse distribution. PMOs numbered 761, 921, 975, 1067 and 1097 (SEQ ID NOs: 30, 9, 10, 31 and 32, respectively) significantly decreased the peripheral localization of the NET1 RNA.

Figures 16B, 16C, 16D:
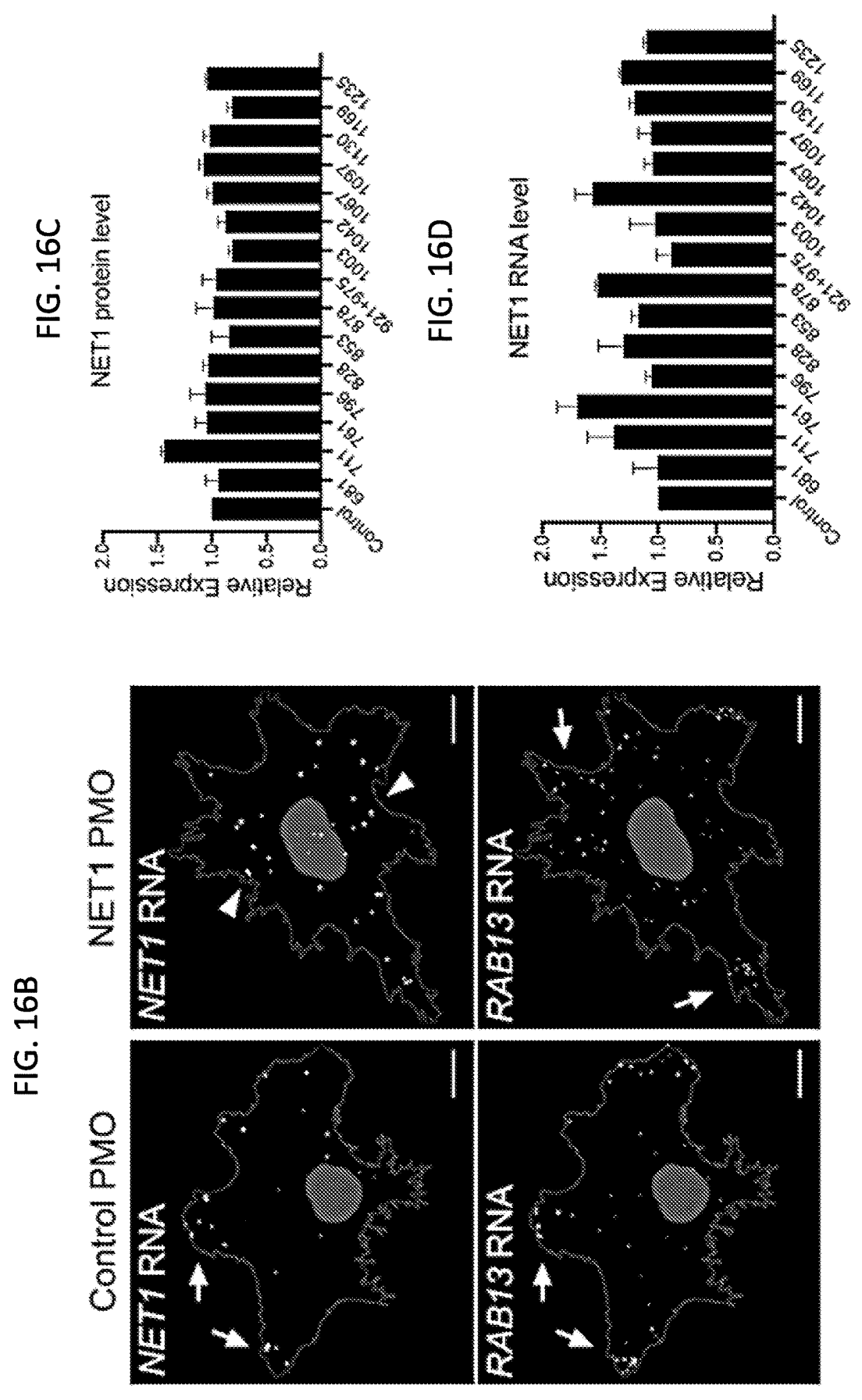

FISH images of cells treated with the indicated control or NET1 (921+975; SEQ ID NO: 9+SEQ ID NO: 10) PMOs are shown in FIG. 16B. NET1 RNA becomes perinuclear in cells treated with NET1 PMOs, while RAB13 remains localized at protrusions.

Total Net1 protein levels in PMO-treated cells was evaluated by Western blot. As shown in FIG. 16C, no significant difference in Net1 protein was detected in PMO-treated versus control-treated cells. In addition, total Net1 RNA levels in control and PMO-treated cells were analyzed by RT-ddPCR. As shown in FIG. 16D, no significant differences in RNA levels were observed.

Figure 16E:
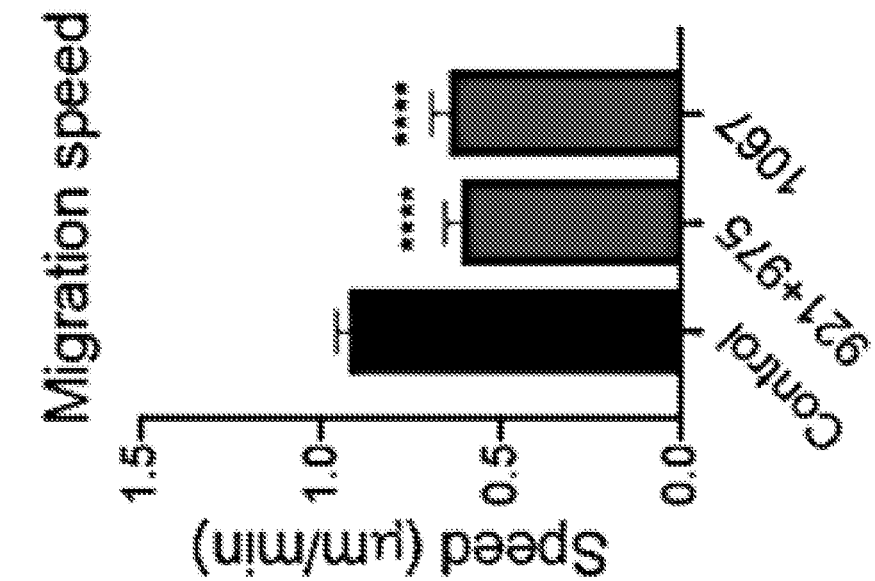
Figure 16F:
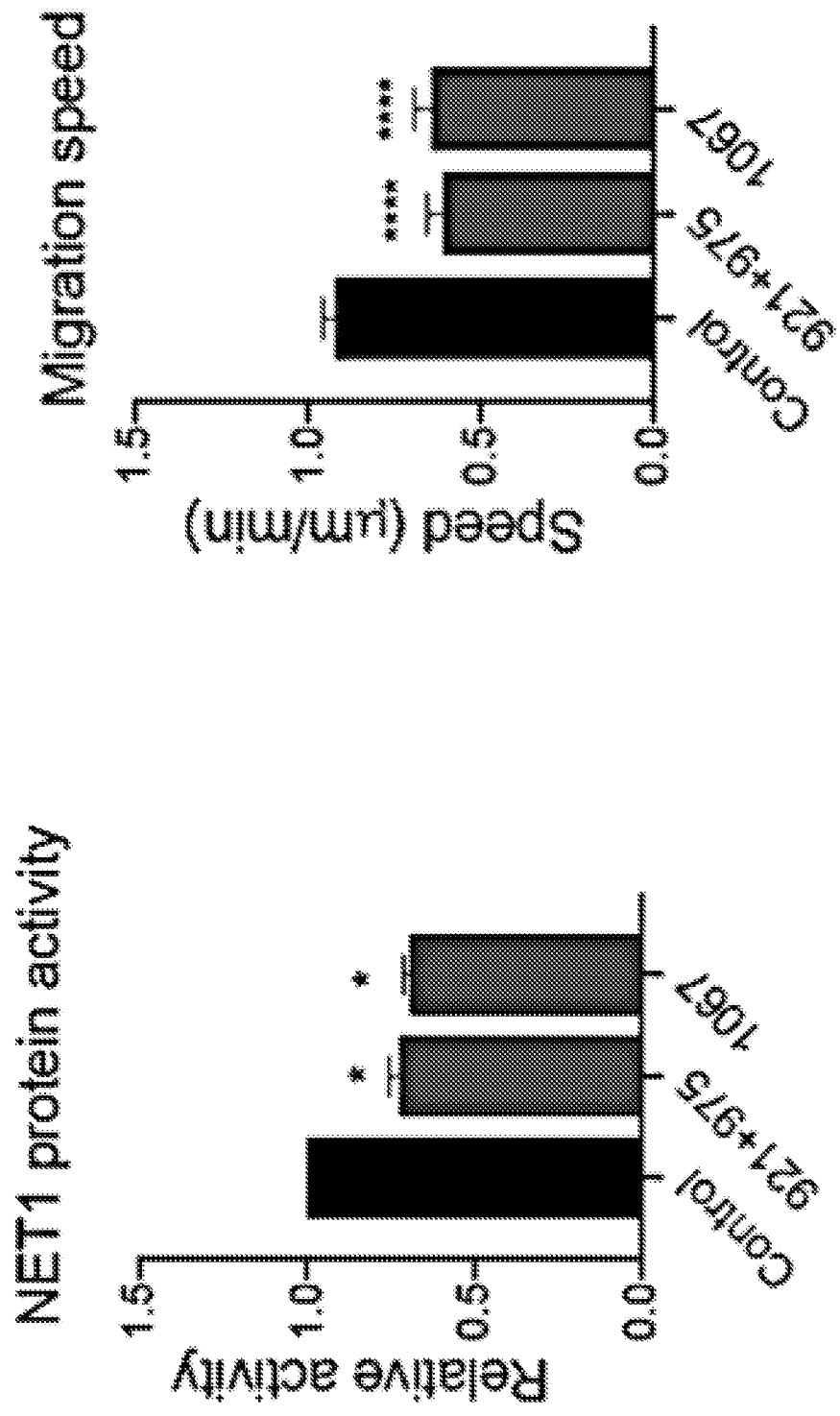

Cells treated with control or NET1 PMOs were analyzed to assess the level of active NET1, through binding to a nucleotide-free RhoA mutant that exhibits high affinity for GEFs. As shown in FIG. 16E, mislocalization of NET1 RNA leads to reduced NET1 protein activity. Control and Net1 PMO-treated cells were also tracked over time to assess the speed of their migration. As shown in FIG. 16F, mislocalization of NET1 RNA led to reduced migration speed.

```
HsNET1-761:
                                    (SEQ ID NO: 30)
5'-CTTGGTTTCACTTGGTAAAATTAAT-3'

HsNET1-921:
                                    (SEQ ID NO: 9)
5'-TCCCTCTTGCATTTCAGACAACACT-3'

HeNET1-975:
                                    (SEQ ID NO: 10)
5'-GACAAAACTACTCTCTTTTCCTCTC-3'

HsNET1-1067:
                                    (SEQ ID NO: 31)
5'-TTCTACAACTTACTACACGCCCTCA-3'

HsNET1-1097:
                                    (SEQ ID NO: 32)
5'-AAGGCAAATAAGTCCACGTCCCCTC-3'
```

Example 11

In Vivo Use of RAb13 and Net1 Antisense Oligonucleotides to Treat Metastasis

Figure 15:
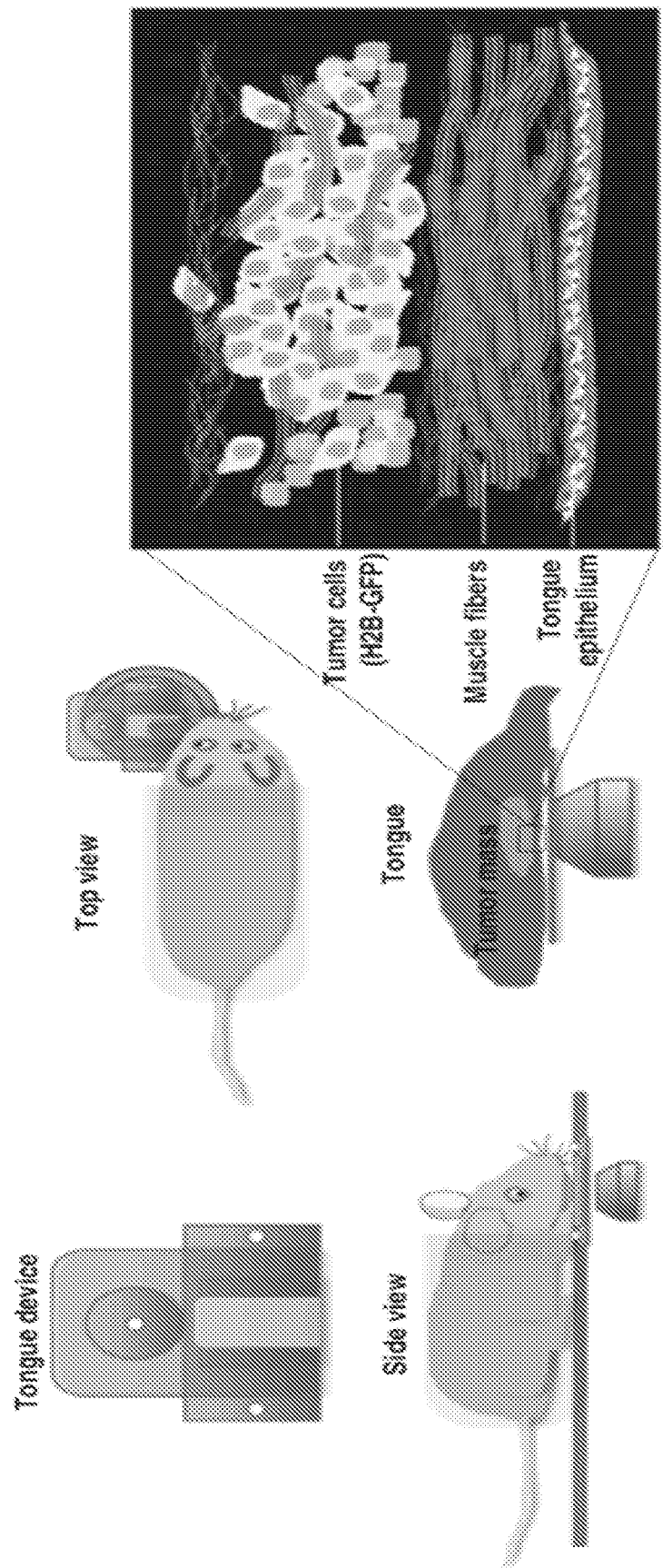
FIG. 15: Intravital imaging of the tongue cancer model. Schematic drawings of the tongue holding device, animal set up for intravital imaging, and primary tumor mass growing in the tongue (from Amornphimoltham et al. (2013). Clin. Cancer Res. 19(6), 1375).

The ability of the ASOs for Rab13 and Net1 provided herein (e.g., SEQ ID NOS: 7, 8, 9, 10, 14, 15, 17, 18, 31, 30 and/or 32) to reduce in vivo cell invasion and metastasis can be assessed as follows. A tongue xenograft tumor mouse model can be used (FIG. 15). Specifically, Hela-03 cells (adenocarcinoma) are submucosally injected in the lateral anterior of the tongue of immunocompromised, nude mice. To assess the efficacy and duration of ASO delivery, Hela-03 cells expressing a destabilized form of GFP (green fluorescent protein) having exhibits a half-life of ca. 2 hrs is used. Commercially available ASOs that block GFP translation can be delivered. Successful uptake of these ASOs will reduce GFP fluorescence within a few hours, which can be detected in live animals using intravital microscopy. Imaging over time can be used to assess the duration of the ASO effect. Additionally, this system can be used to assess different delivery methods (e.g., local injection or systemic delivery; delivery of naked ASOs or dendrimer conjugates) as well as to perform a dose titration for assessing optimal dosage. After establishing such parameters, the effect of antisense oligos on in vivo Rab13 and Net1 RNA distribution will be assessed by in situ hybridization of tissue sections, as well as their effect on short-term cell invasion into the surrounding tissue using intravital microscopy.

Example 12

Delivery of Antisense Oligonucleotides in an In Vivo Tumor

Figure 17:
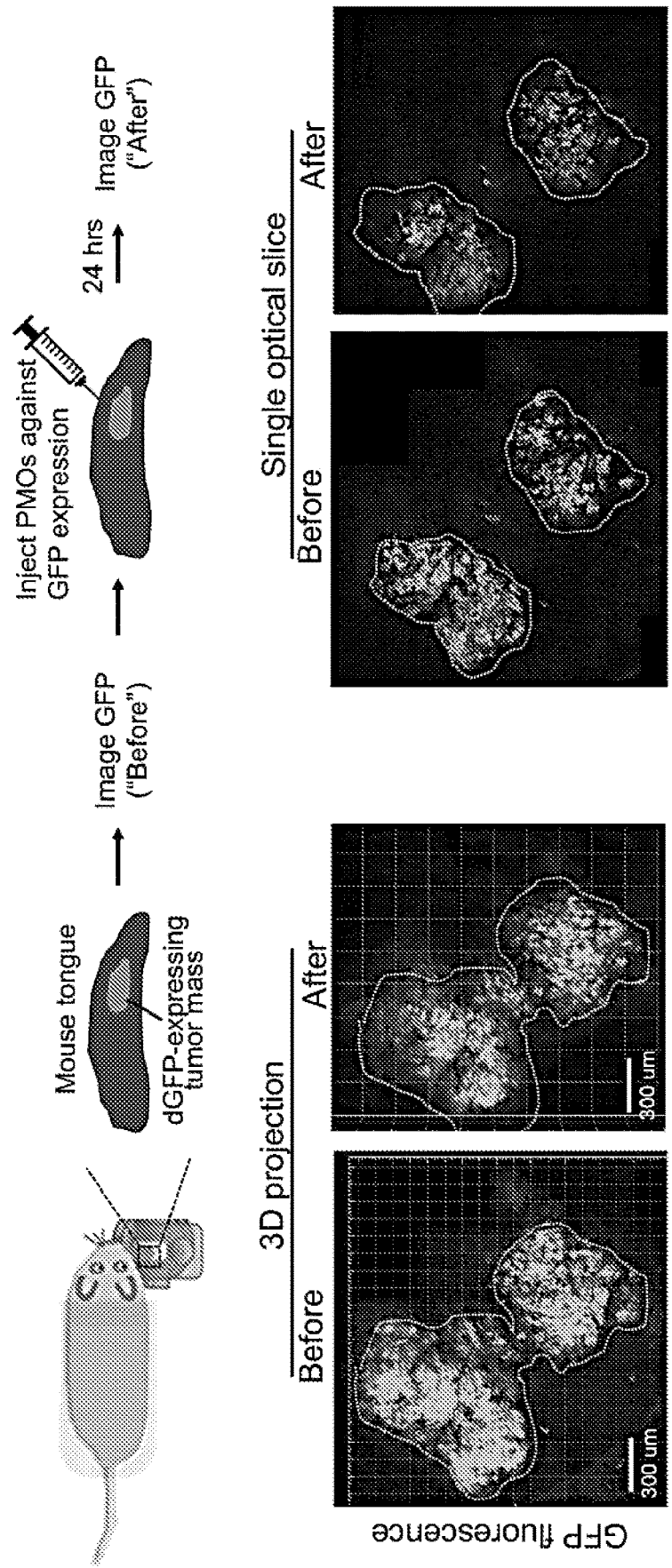
FIG. 17: Delivery of antisense oligos in an in vivo tumor. The schematic (top) depicts a method for assessing ASO delivery in a tumor mass. HeLa-03 adenocarcinoma cells, expressing destabilized GFP, are injected in the tongue of an immunocompromised mouse. Once a visible tumor mass is established, intravital imaging is used to obtain a fluorescence image of the tumor mass. Vivo-PMOs that block GFP translation are then locally injected into the tumor. After 24 hours, GFP fluorescence of the same region is recorded. The bottom image panels show GFP fluorescence of a tumor mass before and after PMO injection. A 3D projection of multiple imaging sections (left) or a single optical slice (right) are shown. Reduction of fluorescence indicates that there is PMO uptake. GFP reduction is mostly noticeable at the periphery of the tumor.

FIG. 17 (top panel) provides a schematic depiction of a strategy for assessing ASO delivery in a tumor mass. HeLa-03 adenocarcinoma cells, expressing destabilized GFP, are injected in the tongue of an immunocompromised mouse. Once a visible tumor mass is established, intravital imaging is used to obtain a fluorescence image of the tumor mass. Vivo-PMOs that block GFP translation are then locally injected into the tumor. After 24 hours, GFP fluorescence of the same region is recorded. The bottom image panels of FIG. 17 show GFP fluorescence of a tumor mass before and after PMO injection. A 3D projection of multiple imaging sections (left) or a single optical slice (right) are shown. Reduction of fluorescence indicates that there is PMO uptake. In this study, GFP reduction was mostly noticeable at the periphery of the tumor.

REFERENCES

Barry et al., (2015). J Cell Biol, 209, 163-80.
Basu et al., (2011). EMBO J, 30,3714-28.
Berkovits, B. D. and Mayr, C. (2015). Nature, 522, 363-7.
Besse, F. and Ephrussi, A. (2008). Nat Rev Mol Cell Biol, 9, 971-80.0
Buxbaum et al., (2015). Nat Rev Mol Cell Biol, 16, 95-109.
Colak et al., (2013). Cell, 153, 1252-65.
Fazal et al., (2019). Cell, 178, 473-490 e26.
Feltrin et al., (2012). PLoS Biol, 10, e1001439.
Gloge et al., (2014). Curr Opin Struct Biol, 24, 24-33.
Gorelik, R. and Gautreau, A. (2014). Nat Protoc, 9, 1931-43.
Havens, M. A. and Hastings, M. L. (2016). Nucleic Acids Res, 44, 6549-63.
Holt et al., (2019). Nat Struct Mol Biol, 26, 557-566.
Hua et al., (2010). Genes Dev, 24, 1634-44.
Ioannou et al., (2015). J Cell Biol, 208, 629-48.
Ioannou, M. S. and Mcpherson, P. S. (2016). J Biol Chem, 291, 9929-37.
Jung et al., (2014). Cell, 157, 26-40.
Kohler et al., (2004). J Cell Biol, 165, 175-80.
Lee, S. H. and Mayr, C. (2019). Mol Cell, 74, 701-712 e9.
Lentz et al., (2013). Nat Med, 19, 345-50.
Leung et al., (2006a). J Lipid Res, 47, 467-75.
Leung et al., (2006b). Nat Neurosci, 9, 1247-56.
Mardakheh et al., (2015). Dev Cell, 35, 344-57.
Marzesco et al., (2002). Mol Biol Cell, 13, 1819-31.
Medioni et al., (2012). Development, 139, 3263-76.
Meignin, C. and Davis, I. (2010). TCurr Opin Cell Biol, 22, 112-9.
Mili et al., (2008). Nature, 453, 115-9.
Moissoglu et al., (2019). Elife, 8.
Morimoto et al., (2005). J Biol Chem, 280, 2220-8.
Muller, M. P. and Goody, R. S. (2018). Small GTPases, 9, 5-21.
Nishikimi et al., (2014). Sci Signal, 7, ra72.
Paquin, N. and Chartrand, P. (2008). Trends Cell Biol, 18, 105-11.
Petrie et al., (2009). Nat Rev Mol Cell Biol, 10, 538-49.
Pfeffer, S. R. (2017). Mol Biol Cell, 28, 712-715.
Rangaraju, V., Tom Dieck, S. and Schuman, E. M. (2017). EMBO Rep.
Ryan, G. L., Watanabe, N. and Vavylonis, D. (2012). Cytoskeleton (Hoboken), 69, 195-206.
Sahgal et al., (2019). et al., J Cell Sci, 132.
Sakane et al., (2012). J Biol Chem, 287, 42455-68.
Sakane et al., (2013). Genes Cells, 18, 810-22.
Scott et al., (2011). J Vis Exp., 58, pii:3525.
Shiber et al., (2018). Nature, 561, 268-272.
Shieh et al., (2015). Science. 350, 678-80.
Stueland, M., Wang, T., Park, H. Y. and Mili, S. (2019). Sci Rep, 9, 8267.
Terai et al., (2006). Mol Biol Cell, 17, 2465-75.
Wang et al., (2017). Nat Commun, 8, 896.
Wong et al., (2017). Neuron, 95, 852-868 e8.
Wu et al., (2011). J Biol Chem, 286, 23511-20.
Yoon et al., (2016). Proc Natl Acad Sci U S A. 113, E6877-E6886.
Zappulo et al., (2017). Nat Commun, 8, 583.

In view of the many possible embodiments to which the principles of the disclosure may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

The invention claimed is:

1. An isolated antisense oligonucleotide (ASO) no more than 28 nucleotides in length, comprising the sequence of any one of SEQ ID NO: 8, SEQ ID NO: 7, SEQ ID NO: 9, SEQ ID NO: 10, SEQ ID NO: 14, SEQ ID NO: 15, SEQ ID NO: 17, SEQ ID NO: 18, SEQ ID NO: 30, SEQ ID NO: 31 and SEQ ID NO: 32, wherein:
the ASO comprises one or more chemical modifications;
a detectable label is covalently attached to the ASO; and/or
a nanoparticle is covalently attached to the ASO.

2. The isolated ASO of elaine-Her claim 1, wherein the sequence of the ASO consists of the sequence of any one of SEQ ID NO: 8, SEQ ID NO: 7, SEQ ID NO: 9, SEQ ID NO: 10, SEQ ID NO: 14, SEQ ID NO: 15, SEQ ID NO: 17, SEQ ID NO: 18, SEQ ID NO: 30, SEQ ID NO: 31 and SEQ ID NO: 32.

3. The isolated ASO of claim 1, wherein the ASO comprises one or more chemical modifications.

4. The isolated ASO of claim 3, wherein the one or more chemical modifications comprises at least one phosphorothioate, at least one 2'-fluoro, at least one 2'-O-methyl, at least one 2'-O-methoxy-ethyl, at least one morpholino, at least one 2',4'-constrained ethyl nucleic acid, and/or at least one locked nucleic acid (LNA).

5. The isolated ASO of claim 1, wherein a detectable label is covalently attached to the ASO.

6. The isolated ASO of claim 1, wherein a nanoparticle is covalently attached to the ASO.

7. The isolated ASO of claim 6, wherein the nanoparticle comprises a polymeric nanoparticle, nanosphere, nanocapsule, liposome, dendrimer, polymeric micelle, or niosome.

8. An in vitro cell comprising the isolated ASO of claim 2.

9. The in vitro cell of claim 7, wherein the cell is a bacterial cell or mammalian cell.

10. A composition comprising one or more isolated ASOs of claim 1, and a pharmaceutically acceptable carrier.

11. A method of treating a metastatic tumor, comprising: administering a therapeutically effective amount of one or more of the isolated ASOs of, claim 1 to a subject with the metastatic tumor, thereby treating the metastatic tumor.

12. The method of claim 11, wherein the method reduces a number of metastases of the metastatic tumor, reduces the size of a metastasis, reduces the volume of a metastasis, or combinations thereof.

13. The method of claim 11, wherein the administering is intratumoral.

14. A method of reducing migration of a cell, comprising: contacting a cell with a therapeutically effective amount of one or more of the isolated ASOs of claim 1, thereby reducing migration of the cell.

15. The method of claim 14, wherein the method reduces a migration speed of the cell, protrusion velocity of the cell, retraction velocity of the cell, or combinations thereof.

16. The method of claim 14, wherein the cell is a metastatic tumor cell.

17. The method of claim 11, wherein the metastatic tumor is a tumor of the breast, lung, colon, pancreas, ovary, uterus, cervix, skin, prostate, bone, central nervous system, kidney, or head and neck.

18. The method of claim 14, wherein the cell is in a subject, and contacting comprises administration to the subject.

19. The method of claim 11, further comprising administering a therapeutically effective amount of an additional anti-cancer agent to the subject.

20. The method of claim 19, wherein the anti-cancer agent comprises a chemotherapeutic, radiation therapy, and/or a biologic.

* * * * *